US012731103B2

(12) United States Patent
Chan et al.

(10) Patent No.: US 12,731,103 B2
(45) Date of Patent: Sep. 8, 2026

(54) EMBEDDED SHIPPING LABEL MANAGEMENT

(71) Applicant: POPOUT, INC., San Francisco, CA (US)

(72) Inventors: Gilbert Chan, San Francisco, CA (US); Robert Tester, Austin, TX (US); Ben Schwartz, Austin, TX (US); Christopher Mosure, Austin, TX (US)

(73) Assignee: POPOUT, INC., San Francisco, CA (US)

( * ) Notice: Subject to any disclaimer, the term of this patent is extended or adjusted under 35 U.S.C. 154(b) by 210 days.

(21) Appl. No.: 18/390,318

(22) Filed: Dec. 20, 2023

(65) Prior Publication Data

US 2024/0211873 A1 Jun. 27, 2024

Related U.S. Application Data

(60) Provisional application No. 63/434,936, filed on Dec. 22, 2022.

(51) Int. Cl.

| | |
|---|---|
| ***G06Q 10/087*** | (2023.01) |
| ***G06Q 10/0834*** | (2023.01) |
| ***G06Q 30/018*** | (2023.01) |

(52) U.S. Cl.
CPC ..... *G06Q 10/087* (2013.01); *G06Q 10/08345* (2013.01); *G06Q 30/018* (2013.01)

(58) Field of Classification Search
CPC .......... G06Q 10/087; G06Q 10/08345; G06Q 30/018
See application file for complete search history.

(56) References Cited

U.S. PATENT DOCUMENTS

| | | | | |
|---|---|---|---|---|
| 7,647,249 | B2 * | 1/2010 | Shroff | G06Q 30/00 705/28 |
| 11,915,279 | B2 * | 2/2024 | Gangadarappa | G06V 30/412 |
| 2011/0246384 | A1 * | 10/2011 | Williams | G06Q 10/0834 705/347 |
| 2022/0188744 | A1 * | 6/2022 | Keyoumarsi | G06Q 10/083 |

* cited by examiner

*Primary Examiner* — Garcia Ade
(74) *Attorney, Agent, or Firm* — Van Pelt, Yi & James LLP

(57) ABSTRACT

An indication to display is received, in the context of a display page associated with a site platform, a shipping label management interface. In response to the indication, an embedded shipping label management element is displayed wherein the embedded shipping label management element is configured to obtain, via a front-end client call to a shipping management service provider with which the embedded shipping label management element is associated, one or more rate quotes to ship an item from a source location to a destination location. Within a display area associated with the embedded shipping label management element, at least a subset of the one or more rate quotes is displayed. Via a user input provided in the context of the embedded shipping label management element, a selection of a selected rate to ship the item is received. A shipping label to ship the item at the selected rate to be printed is caused.

20 Claims, 73 Drawing Sheets

WiX Fulfilly Partner Dashboard Explore Help Upgrade Search... Mia Bali

5/7 Let's set up your site
View All Steps >

Home
Store Products >
Orders ^
Orders
Abandoned Carts
Gift Card >
Subscriptions
Contacts >
Communications 4
Automations
Marketing & SEO >
Analytics & Reports >
Finances >
Channels >
Settings
Apps >
Content Manager
Multilingual
Developer Tools >
Quick Access

Orders

+ Add New Order 163 orders | $8,914 revenue | €294 revenue See sales analytics

View: All orders Search Filter

| | Order | Date | Customer | Payment | Fulfillment | Total |
|---|---|---|---|---|---|---|
| ☐ | #10167 | Feb 22, 2022, 7:58 AM | Nina York | Paid | Unfulfilled | $98.70 |
| ☐ | #10166 | Feb 1, 2022, 10:58 AM | Lenny London | Paid | Unfulfilled | $110.00 |
| ☐ | #10165 | Jan 25, 2022, 3:42 AM | Ausi Aus | **Unpaid** | Unfulfilled | $130.90 |
| ☐ | #10164 | Jan 13, 2022, 3:24 AM | Nina York | **Unpaid** | Unfulfilled | $132.00 |
| ☐ | #10163 | Dec 22, 2021, 11:37 AM | Tom Gilbert | Paid | Fulfilled | $100.00 |
| ☐ | #10162 | Dec 19, 2021, 11:56 AM | Tom York | Paid | Unfulfilled | $100.00 |
| ☐ | #10161 | Dec 2, 2021, 11:32 AM | Nina York | **Unpaid** | Unfulfilled | $37.63 |
| ☐ | #10160 | Nov 30, 2021, 8:34 AM | Nina York | Paid | Partially Fulfilled | $108.19 |

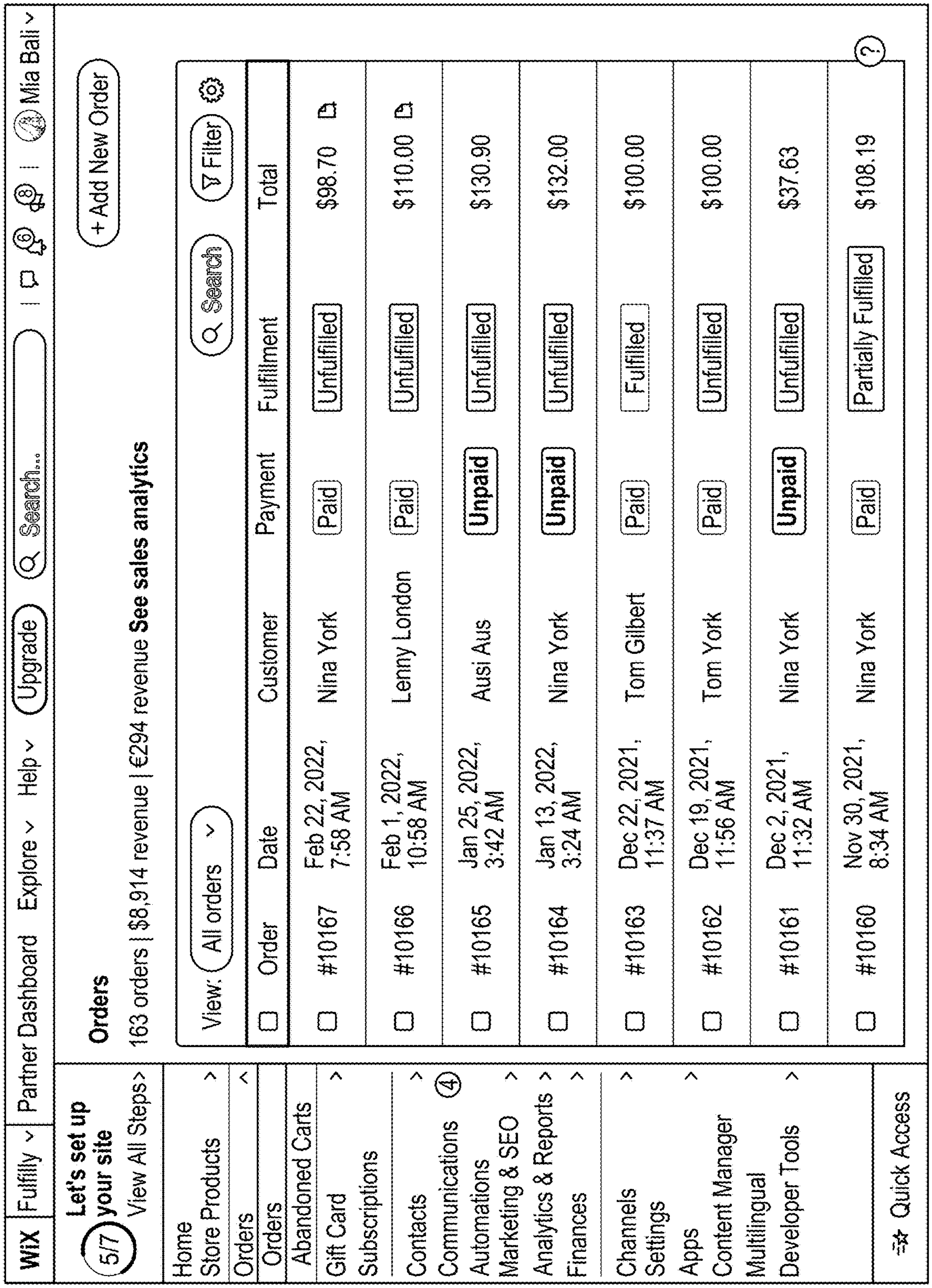

FIG. 3A

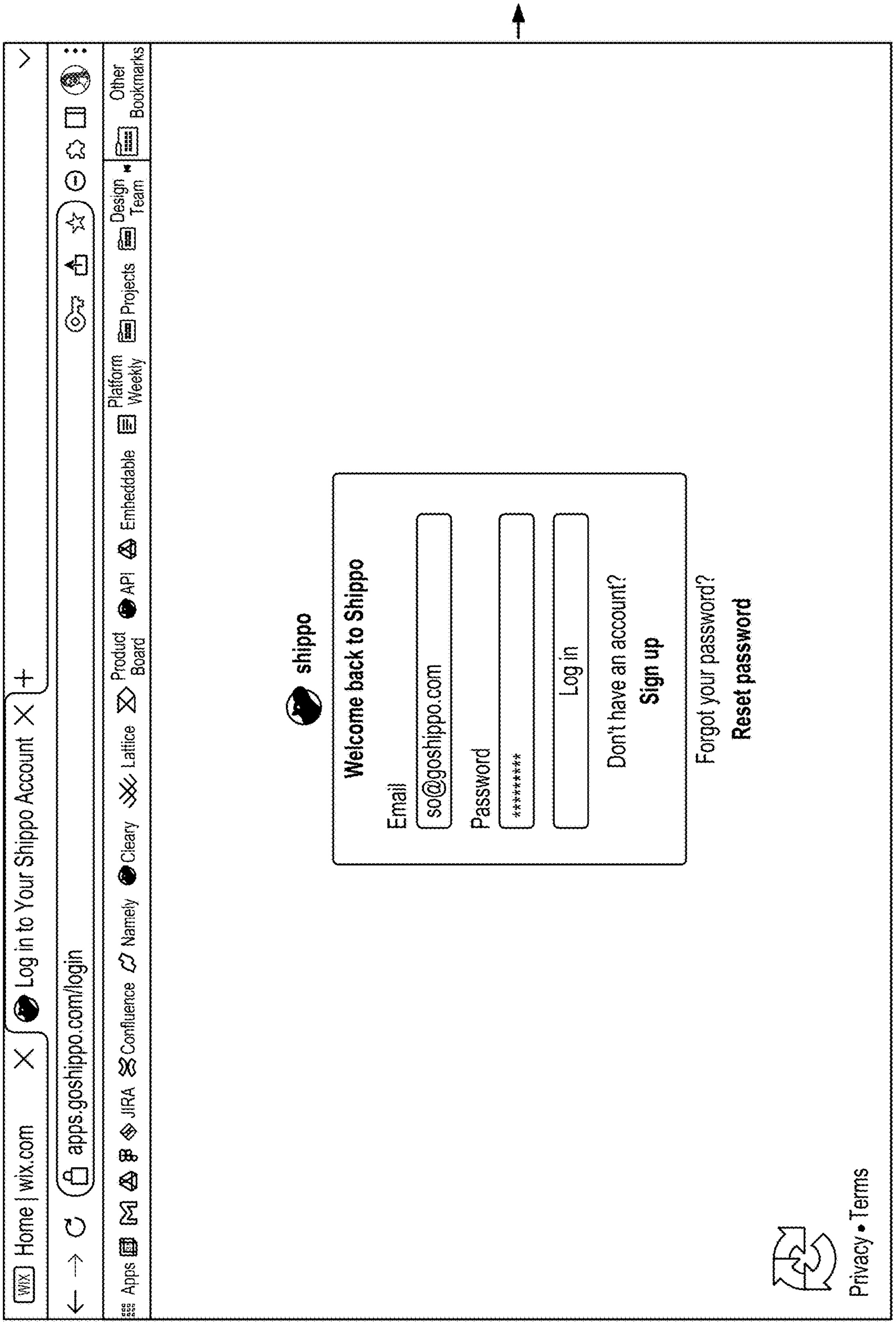
FIG. 4 (Cont. 1)

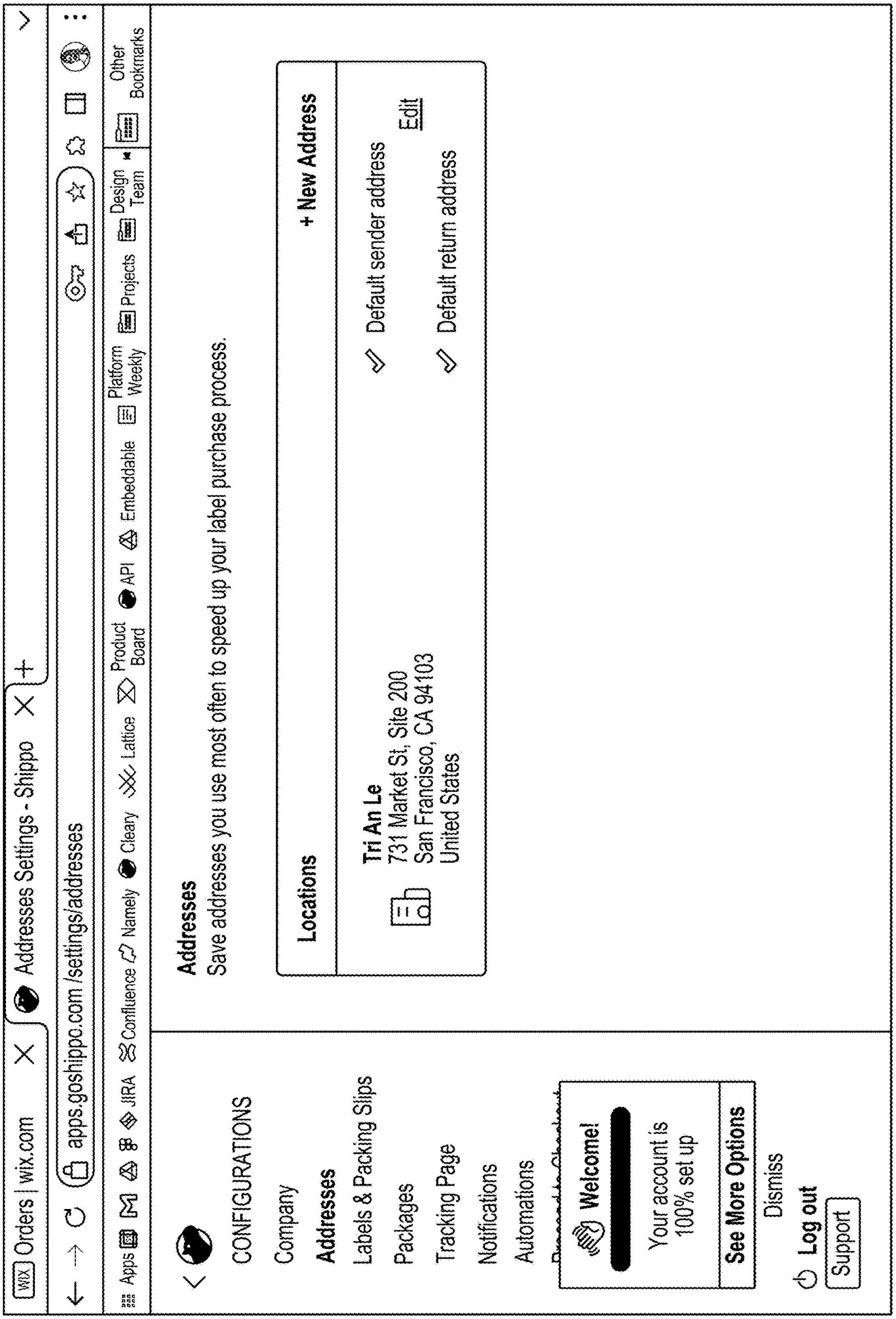
FIG. 4 (Cont. 2)

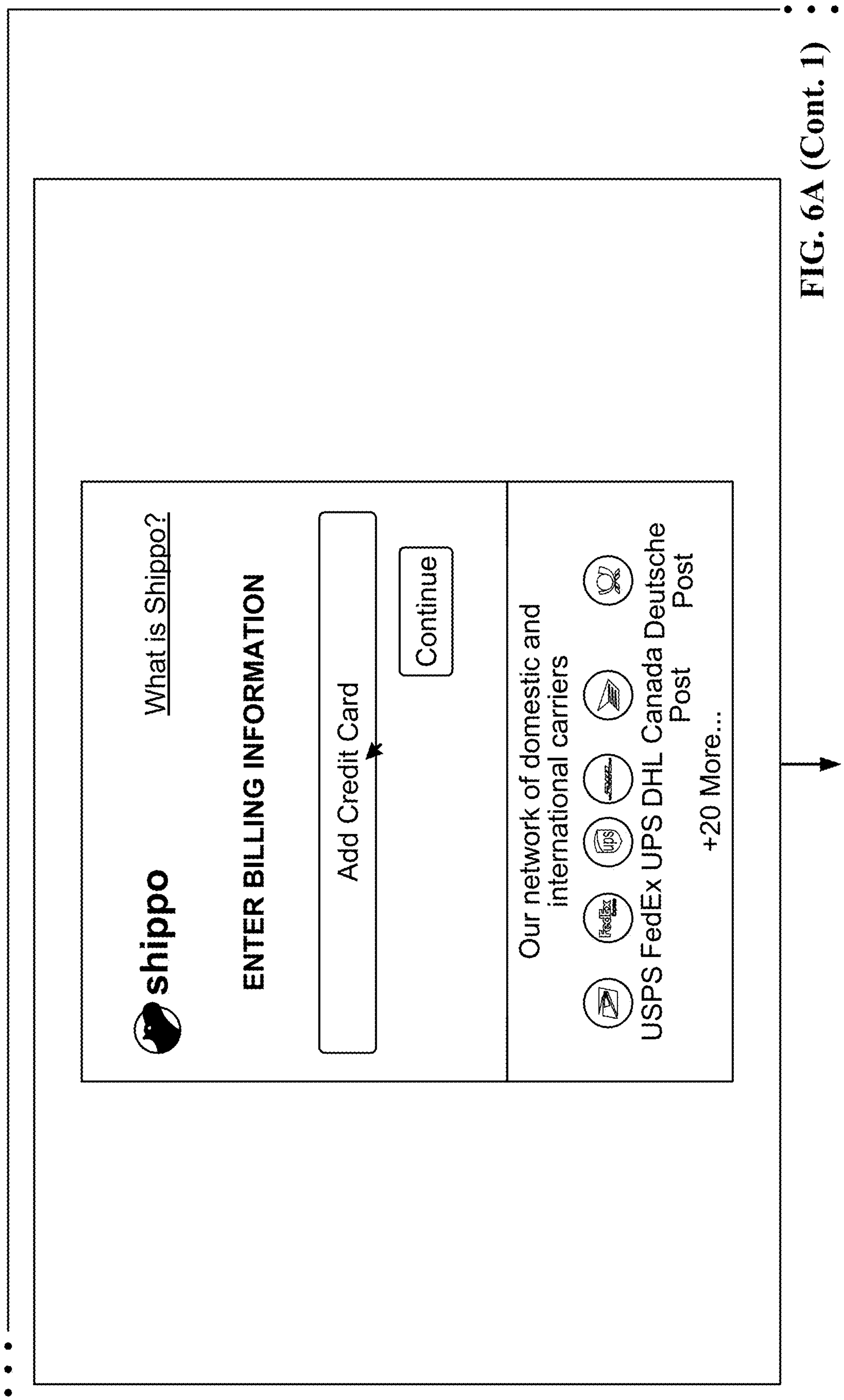
FIG. 6A (Cont. 1)

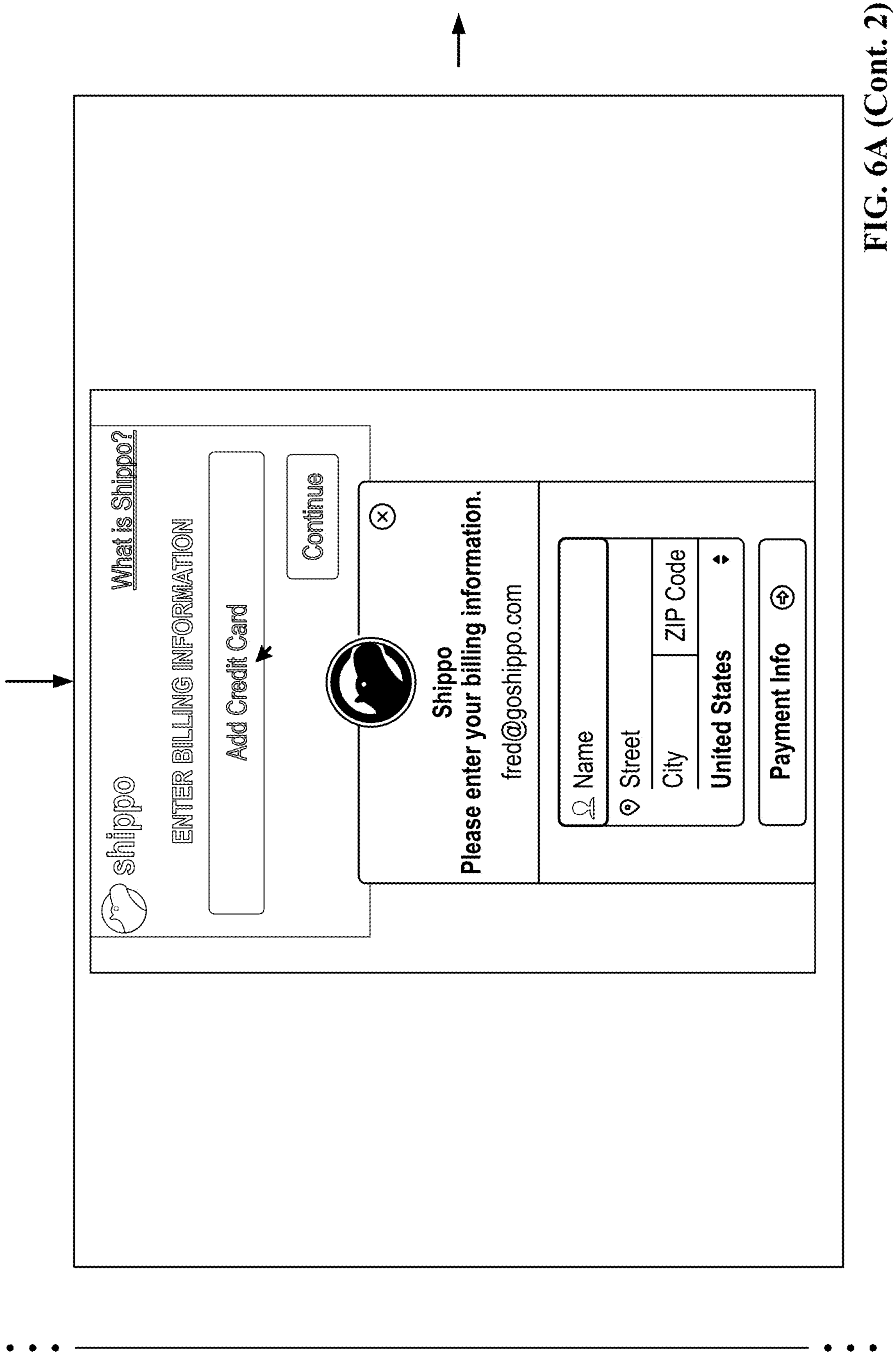
FIG. 6A (Cont. 2)

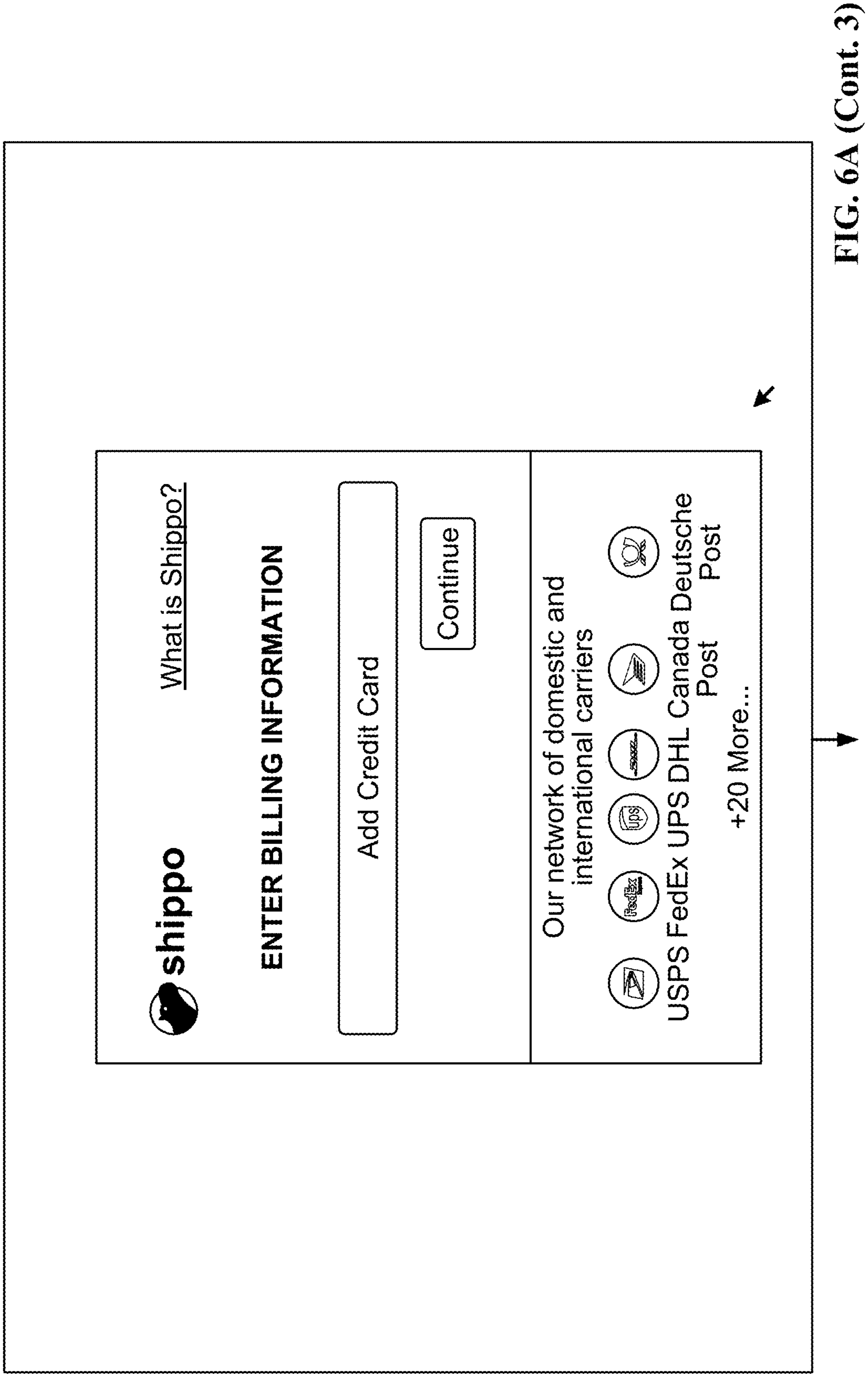
FIG. 6A (Cont. 3)

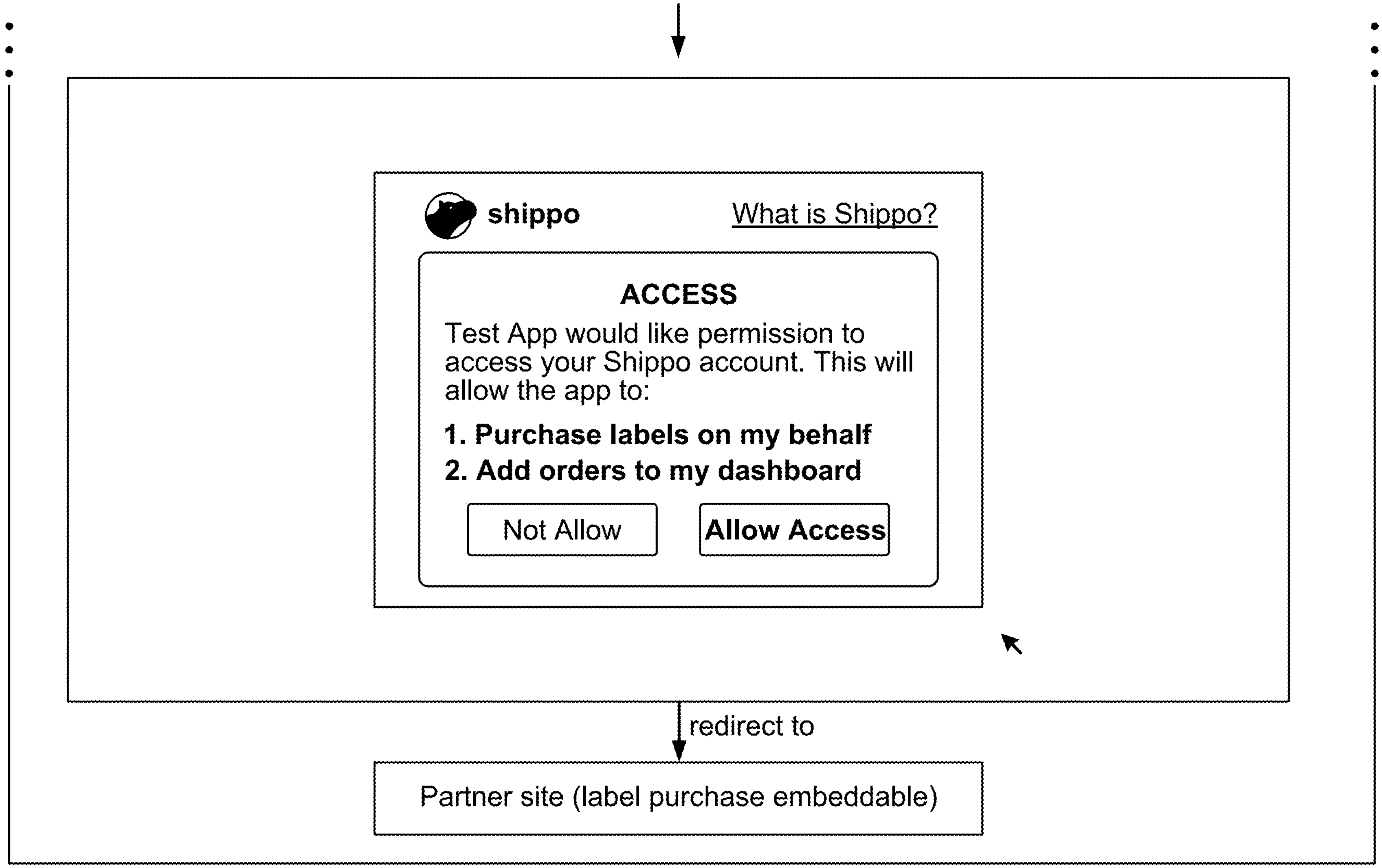
FIG. 6A (Cont. 4)

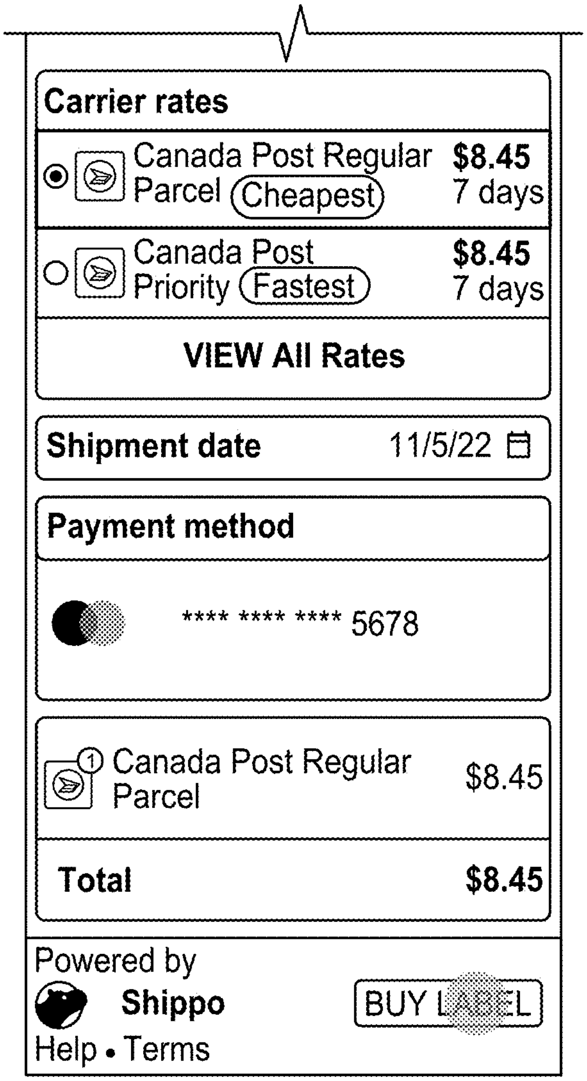
FIG. 6B (Cont. 1)

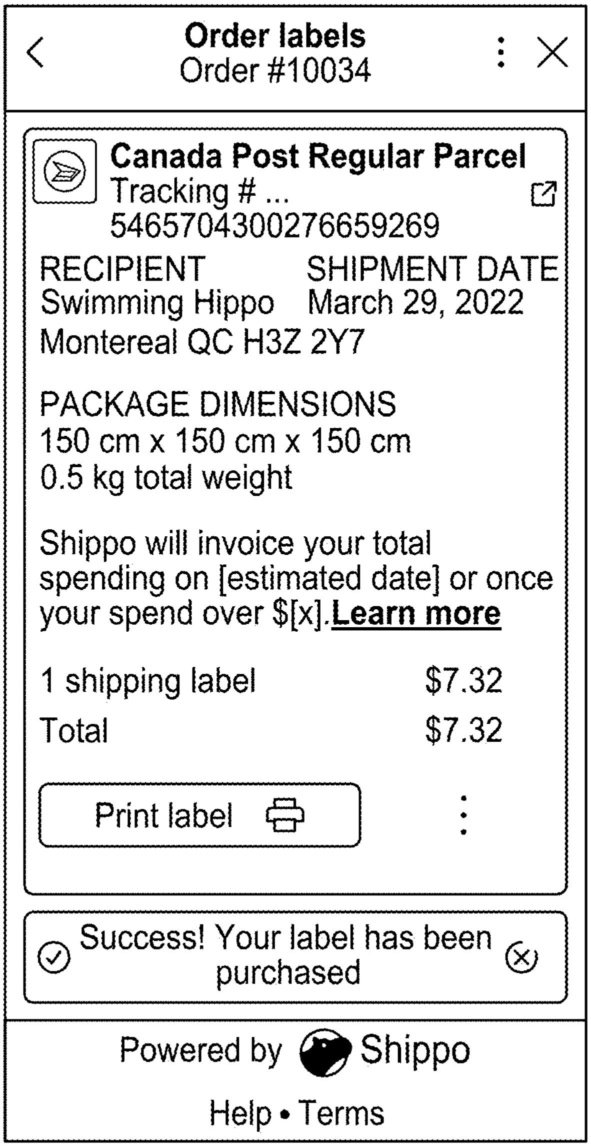
FIG. 6B (Cont. 2)

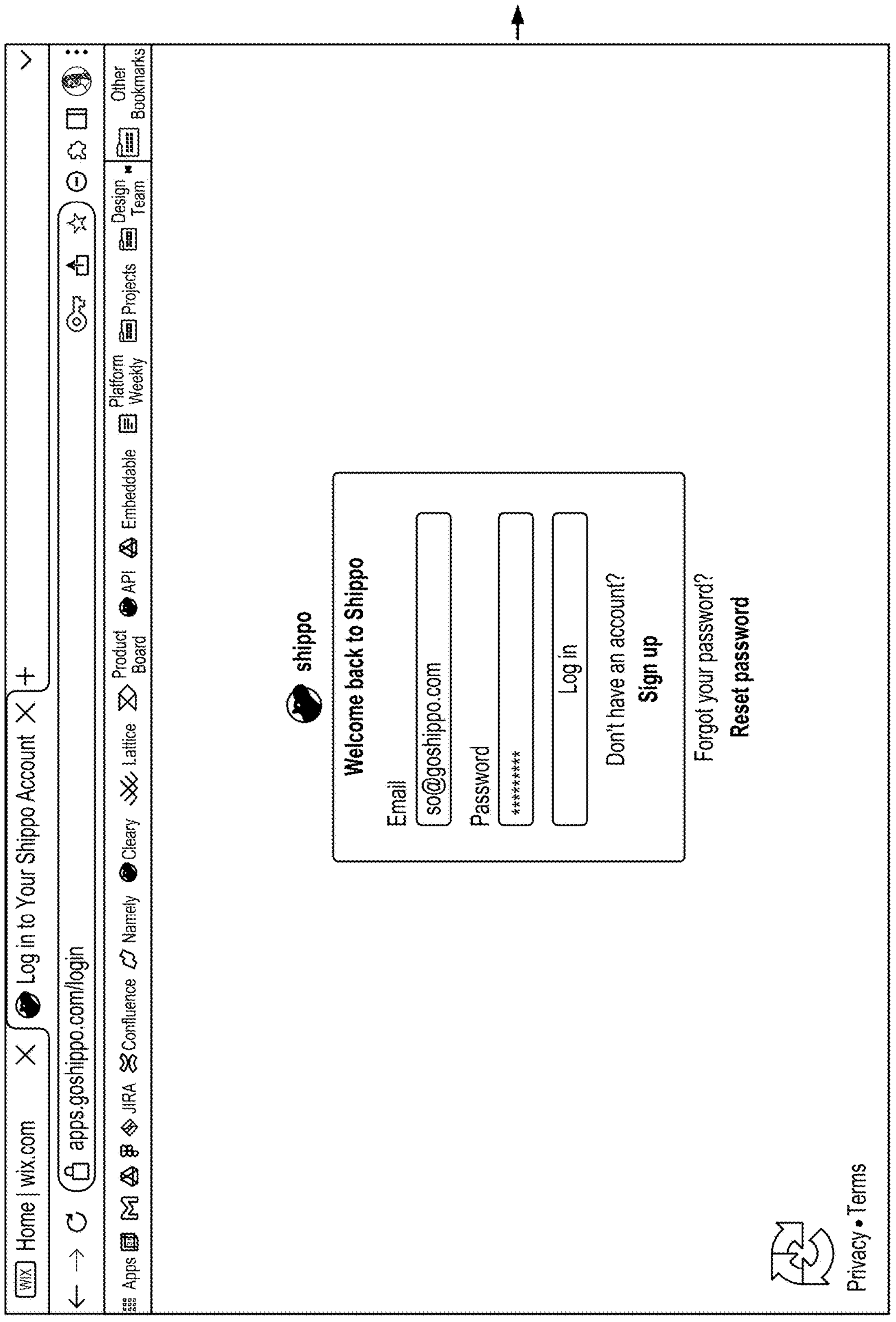
FIG. 6D (Cont. 1)

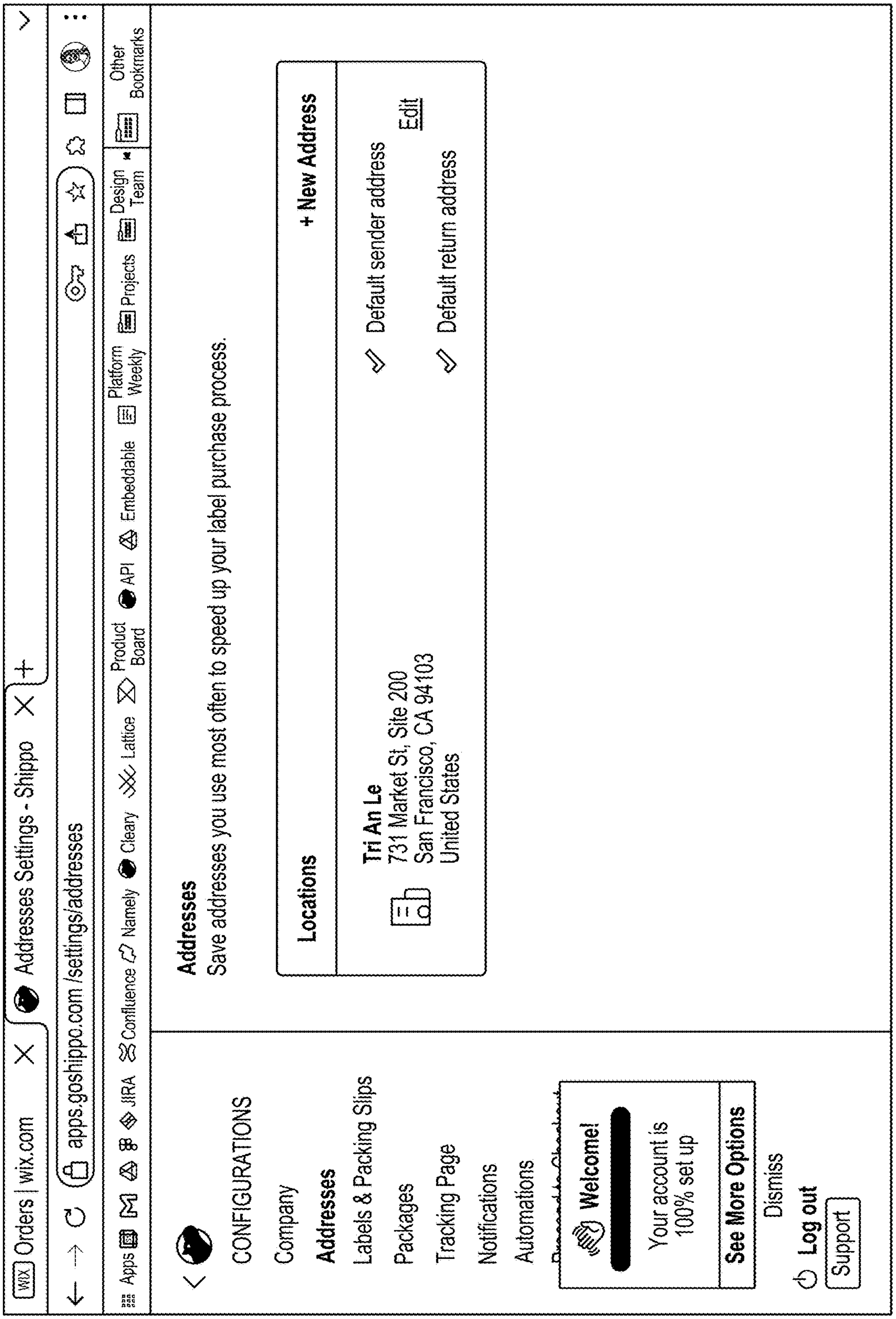
FIG. 6D (Cont. 2)

Channel Sync 702

Embedded Shipping App 704

0.ONBOARDING

WiX | Hippo Home Decor | Explore | Help | Hire a Professional | Upgrade | Search for... | wix-test-store@g...

Home
Store Products
Orders
Orders
Abandoned Carts
Gift Card
Contacts
Communications
Automations
Marketing & SEO
Analytics & Reports
Finances
Channels
Settings
Apps
Quick Access

Orders

36 orders | $1,413 revenue See sales analytics

View: All orders | Manage shipping lable | Search | Filter

| Order | Date | Customer | Payment | Fulfillment | Total |
|---|---|---|---|---|---|
| #10036 | Jan 29, 2021, 1:38 PM | Shan Zhong | Paid | Unfulfilled | $54.00 |
| #10035 | Jan 6, 2021, 3:32 PM | Lambert Kuang | Paid | Fulfilled | $15.00 |
| #10034 | Dec 16, 2020, 12:48 PM | Lambert Kuang | Paid | Unfulfilled | $15.00 |
| #10033 | Nov 20, 2020, 3:44 PM | | Paid | Unfulfilled | $15.00 |
| #10032 New | Nov 20, 2020, 3:44 PM | | Paid | Unfulfilled | $15.00 |
| #10031 New | Nov 20, 2020, 3:44 PM | | Paid | Unfulfilled | $15.00 |
| #10030 New | Nov 20, 2020, 3:44 PM | | Paid | Unfulfilled | $15.00 |
| #10029 New | Nov 20, 2020, 3:44 PM | | Paid | Unfulfilled | $15.00 |

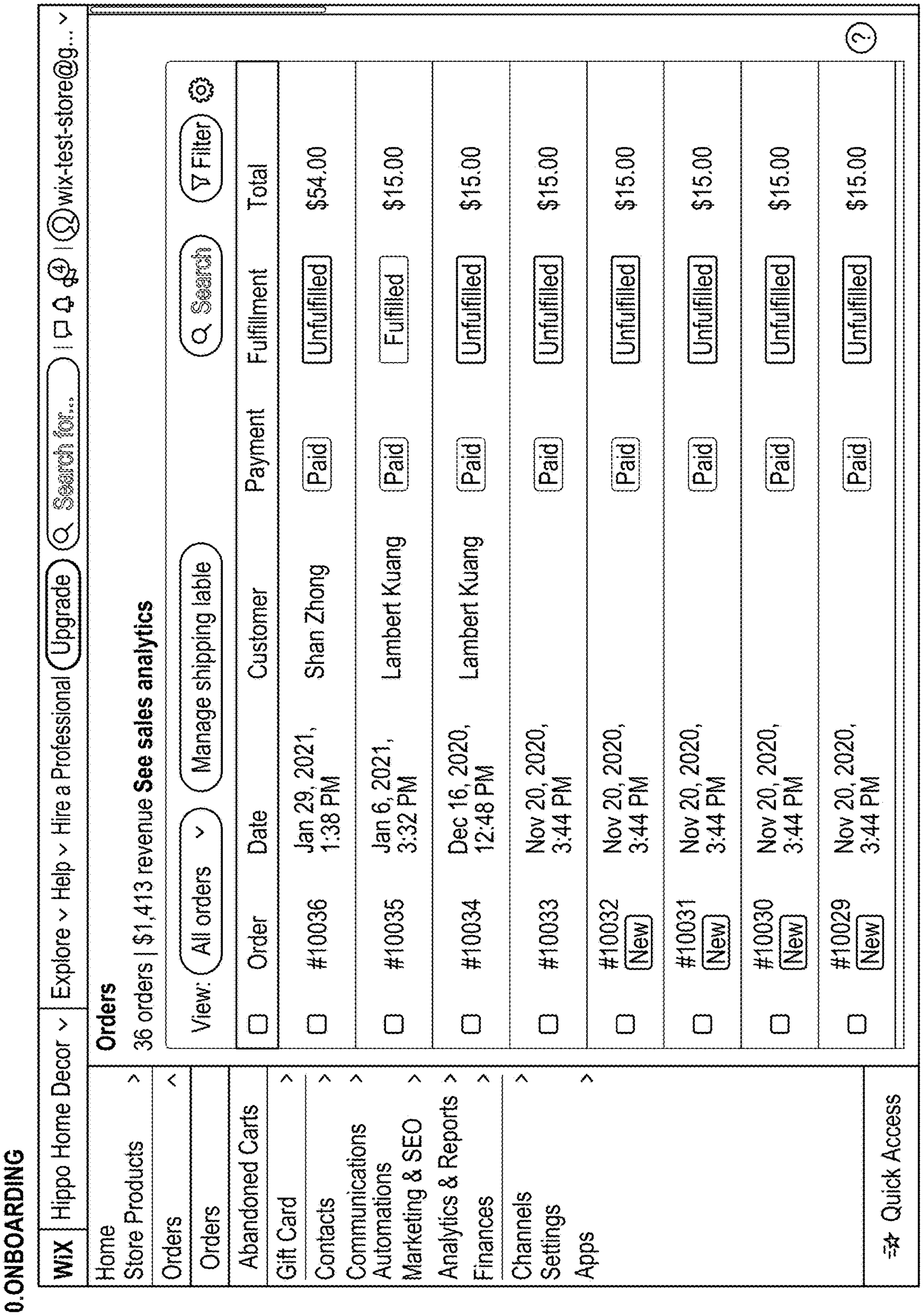

FIG. 9A

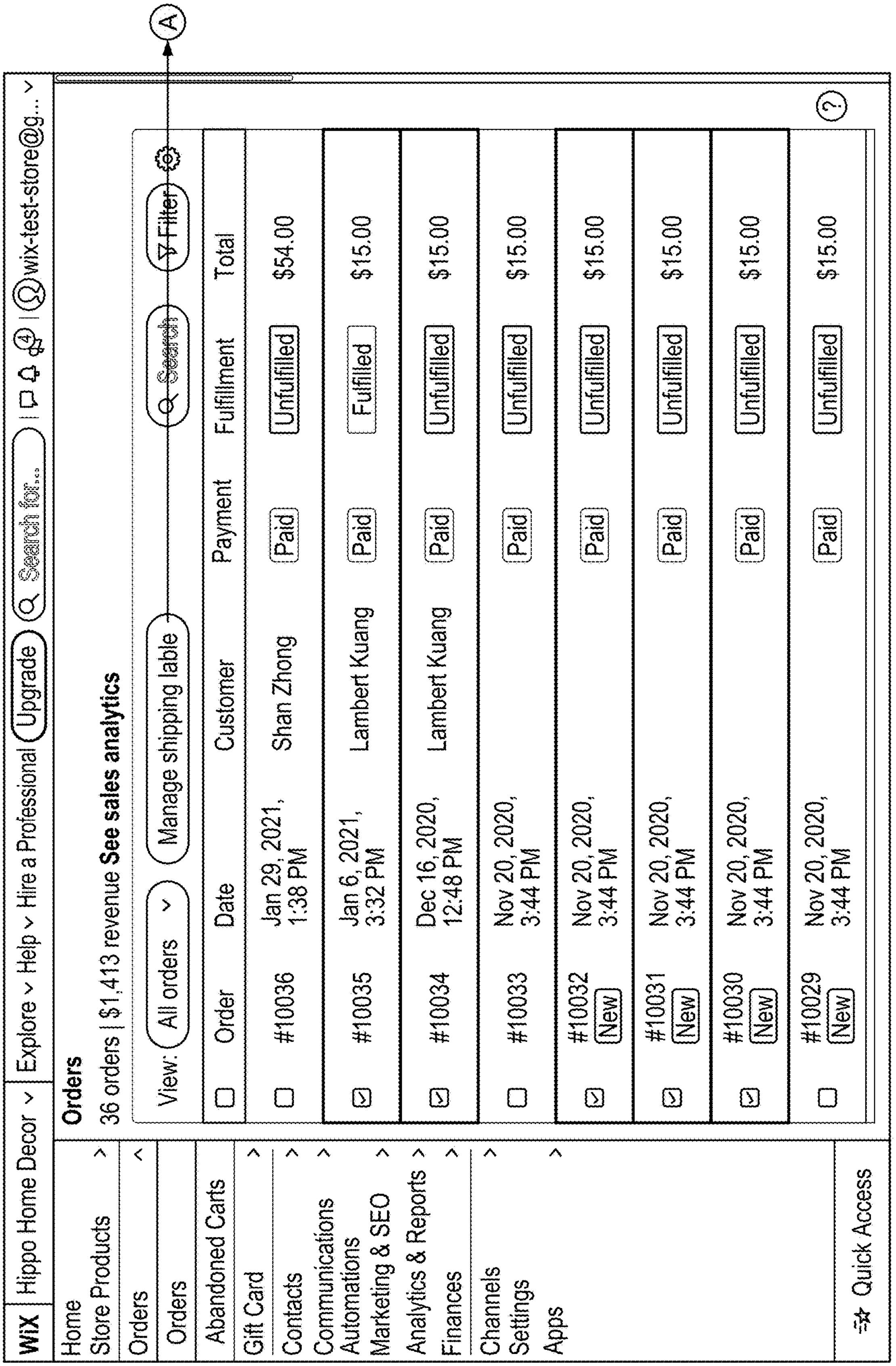

FIG. 9A (Cont. 1)

WiX | Hippo Home Decor ∨ | Explore ∨ Help ∨ Hire a Professional (Upgrade) Search for... | 4 | wix-test-store@g... ∨

Home
Store Products >
Orders ^
Orders
Abandoned Carts
Gift Card >
Contacts >
Communications >
Automations
Marketing & SEO >
Analytics & Reports >
Finances >
Channels >
Settings
Apps >
Quick Access

Orders

36 orders | $1,413 revenue See sales analytics

View: All orders ∨ | Manage shipping lable | Search | Filter | (A)

| ☐ | Order | Date | Customer | Payment | Fulfillment | Total |
| --- | --- | --- | --- | --- | --- | --- |
| ☐ | #10036 | Jan 29, 2021, 1:38 PM | Shan Zhong | Paid | Unfulfilled | $54.00 |
| ☑ | #10035 | Jan 6, 2021, 3:32 PM | Lambert Kuang | Paid | Fulfilled | $15.00 |
| ☑ | #10034 | Dec 16, 2020, 12:48 PM | Lambert Kuang | Paid | Unfulfilled | $15.00 |
| ☐ | #10033 | Nov 20, 2020, 3:44 PM | | Paid | Unfulfilled | $15.00 |
| ☑ | #10032 New | Nov 20, 2020, 3:44 PM | | Paid | Unfulfilled | $15.00 |
| ☑ | #10031 New | Nov 20, 2020, 3:44 PM | | Paid | Unfulfilled | $15.00 |
| ☑ | #10030 New | Nov 20, 2020, 3:44 PM | | Paid | Unfulfilled | $15.00 |
| ☐ | #10029 New | Nov 20, 2020, 3:44 PM | | Paid | Unfulfilled | $15.00 |

FIG. 9A (Cont. 1)

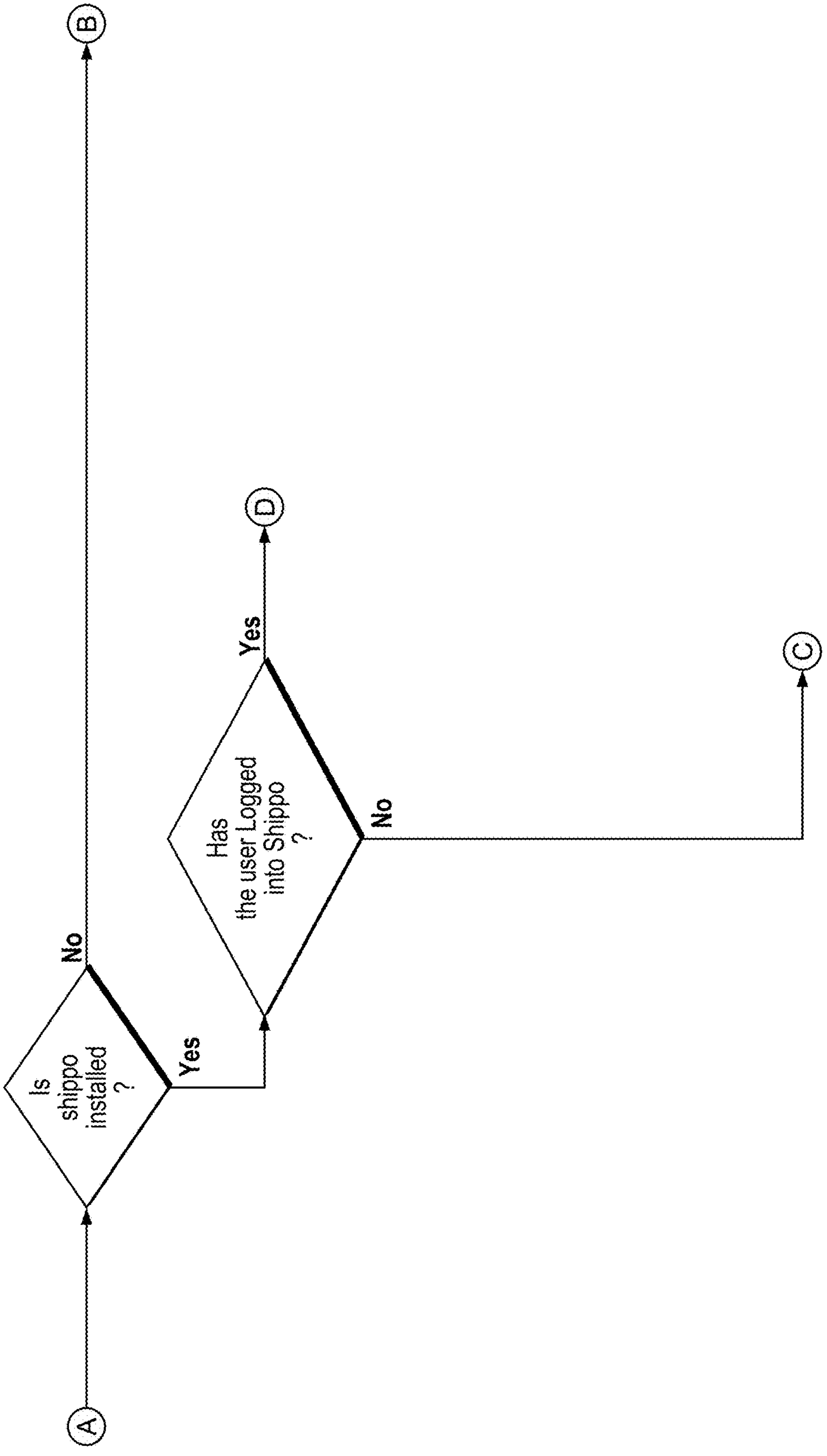
FIG. 9A (Cont. 2)

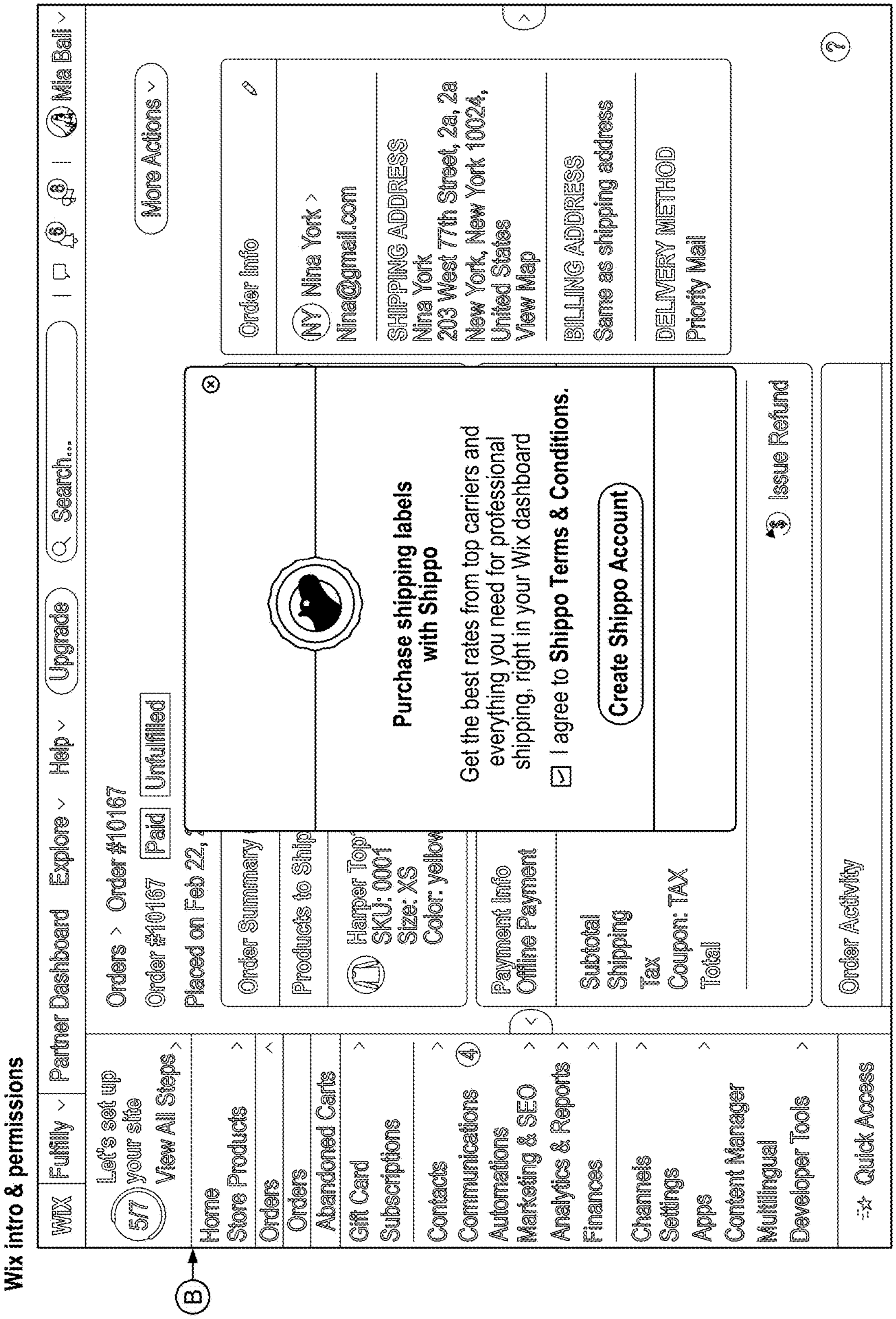
FIG. 9A (Cont. 3)

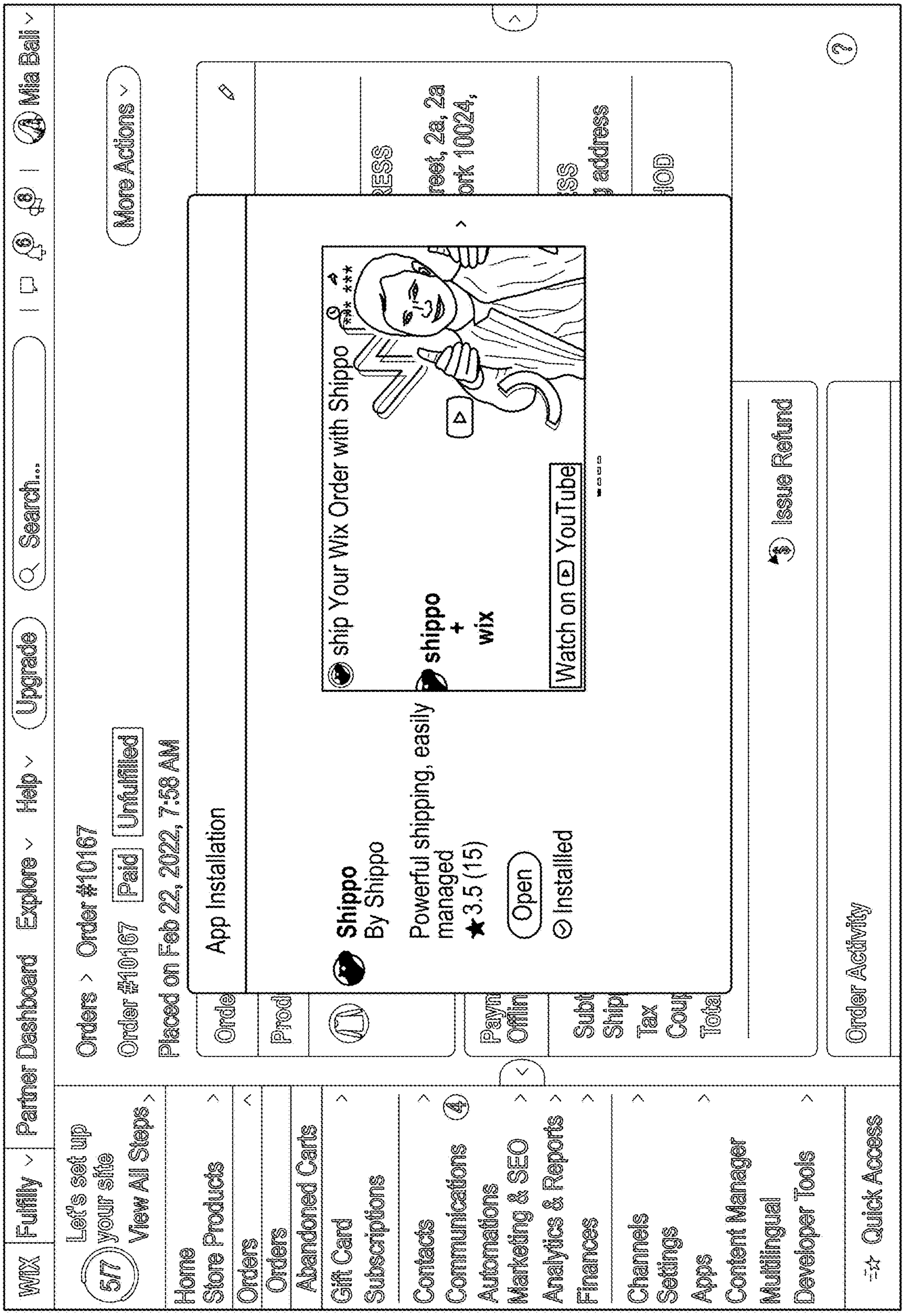
FIG. 9A (Cont. 4)

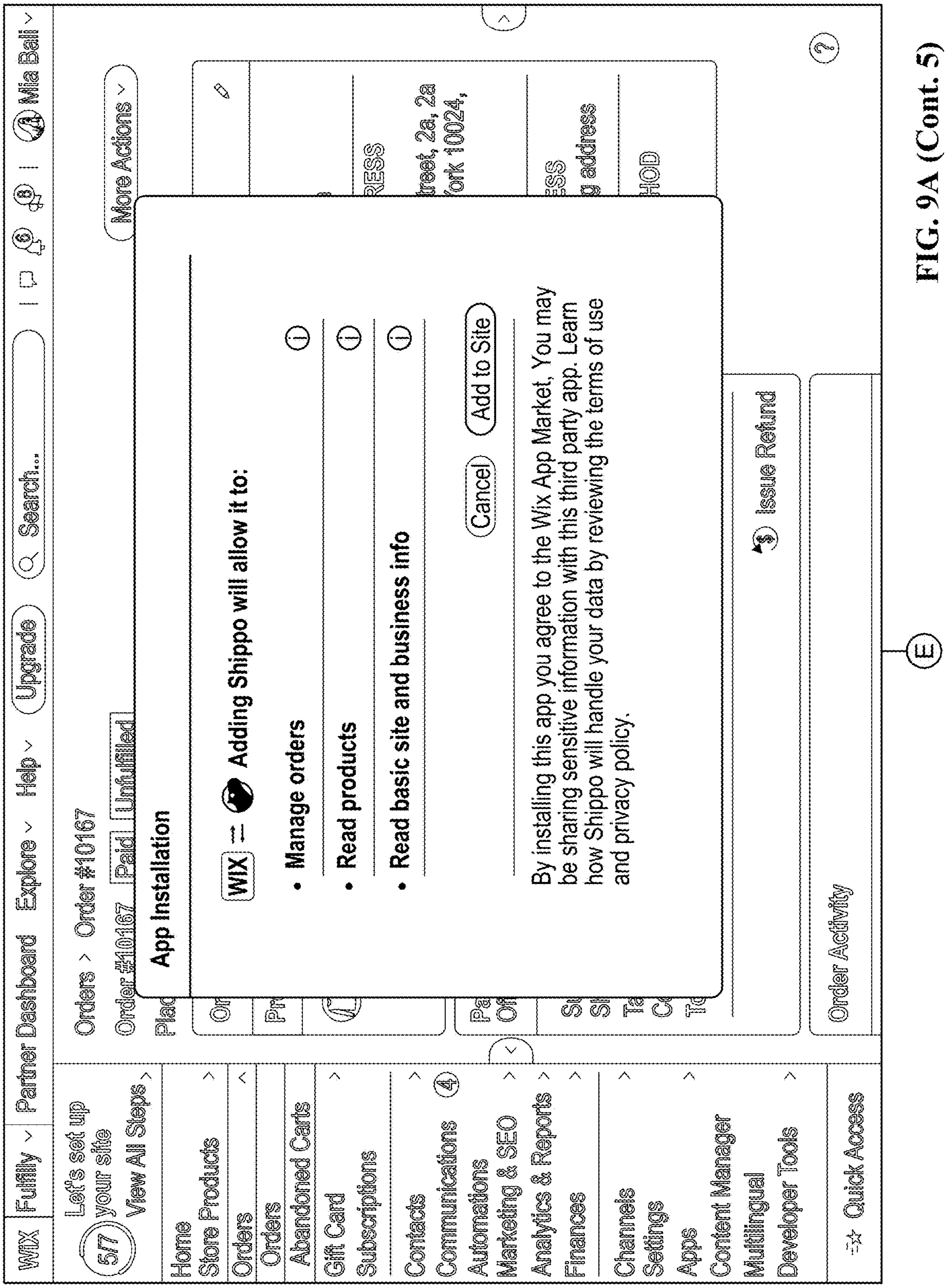
FIG. 9A (Cont. 5)

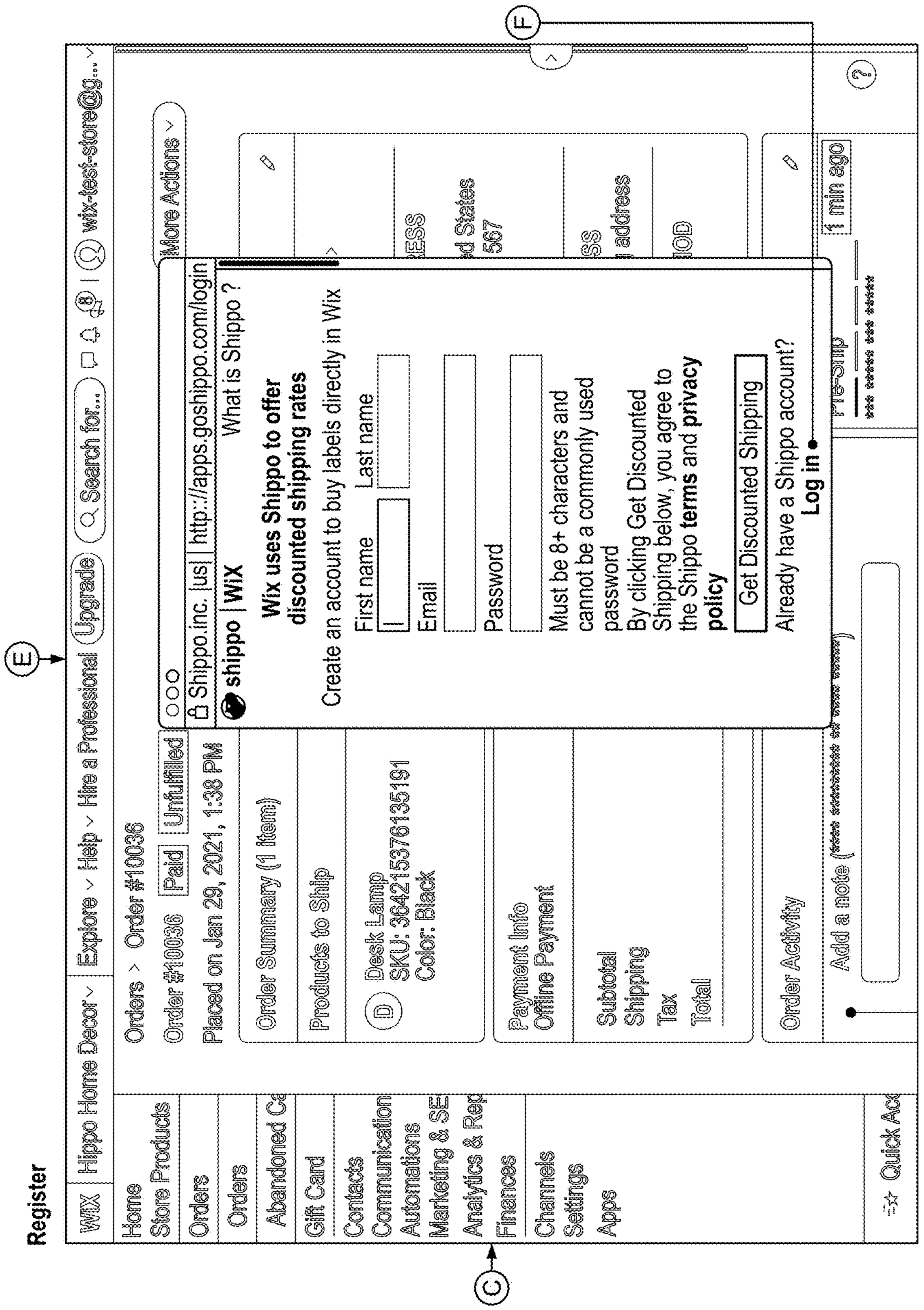
FIG. 9A (Cont. 6)

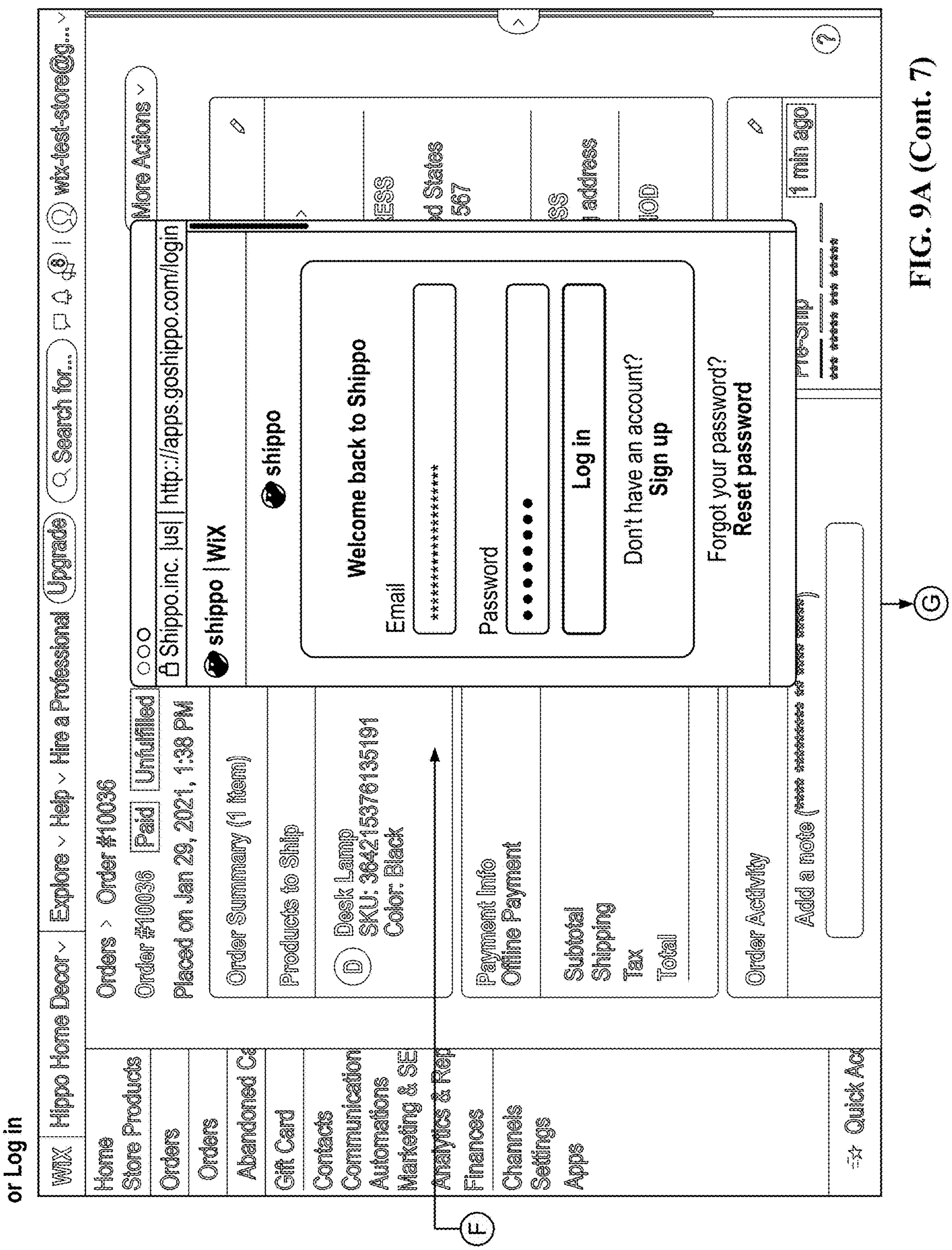
FIG. 9A (Cont. 7)

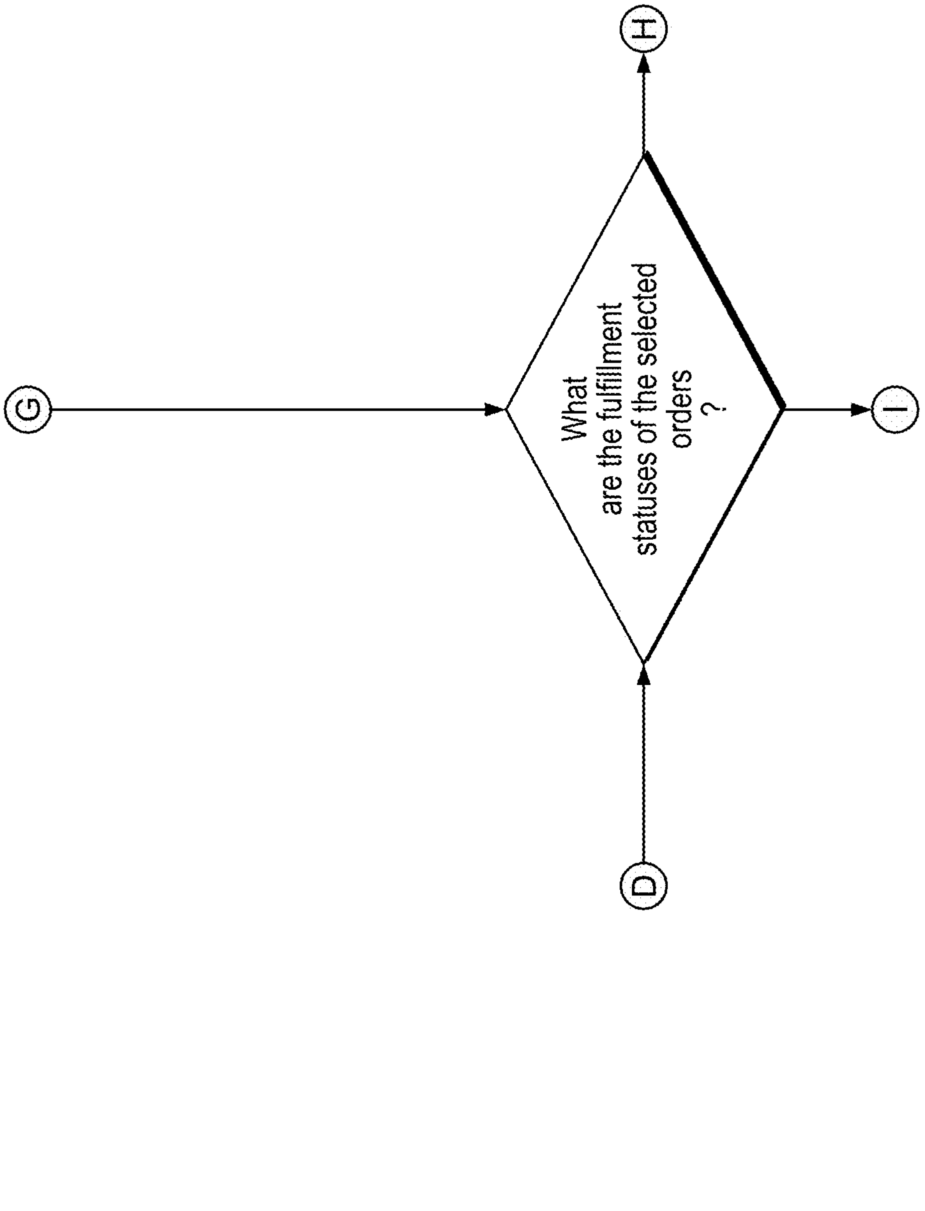
FIG. 9A (Cont. 8)

BOTH FULFILLED & UNFULFILLED SELECTED

WiX | Hippo Home Decor ⌄ | Explore ⌄ Help ⌄ Hire a Professional (Upgrade) | Search for tools, apps, help & more...

Home
Store Products >
Orders ^
Orders
Abandoned Carts
Gift Card >
Contacts >
Communications >
Automations
Marketing & SEO >
Analytics & Reports >
Finances >
Channels >
Settings
Apps >
Quick Access (H) →

Orders

36 orders | $1,413 revenue See sales analytics

View: All orders ⌄ | Manage shipping label (10) | Search | Filter

| ☐ | Order | Date | Customer | Payment | Fulfillment | Total | |
|---|---|---|---|---|---|---|---|
| ☐ | #10036 | Jan 29, 2021, 1:38 PM | Shan Zhong | Paid | Unfulfilled | $54.00 | Ship |
| ☑ | #10035 | Jan 6, 2021, 3:32 PM | Lambert Kuang | Paid | Fulfilled | $15.00 | View |
| ☑ | #10034 | Dec 16, 2020, 12:48 PM | Swimming Hippo | Paid | Unfulfilled | $15.00 | Ship |
| ☐ | #10033 | Nov 20, 2020, 3:44 PM | | Paid | Unfulfilled | $15.00 | Ship |
| ☑ | #10032 New | Nov 20, 2020, 3:44 PM | | Paid | Unfulfilled | $15.00 | Ship |
| ☑ | #10031 New | Nov 20, 2020, 3:44 PM | | Paid | Unfulfilled | $15.00 | Ship |
| ☑ | #10030 New | Nov 20, 2020, 3:44 PM | | Paid | Unfulfilled | $15.00 | Ship |
| ☐ | #10029 New | Nov 20, 2020, 3:44 PM | | Paid | Unfulfilled | $15.00 | Ship |

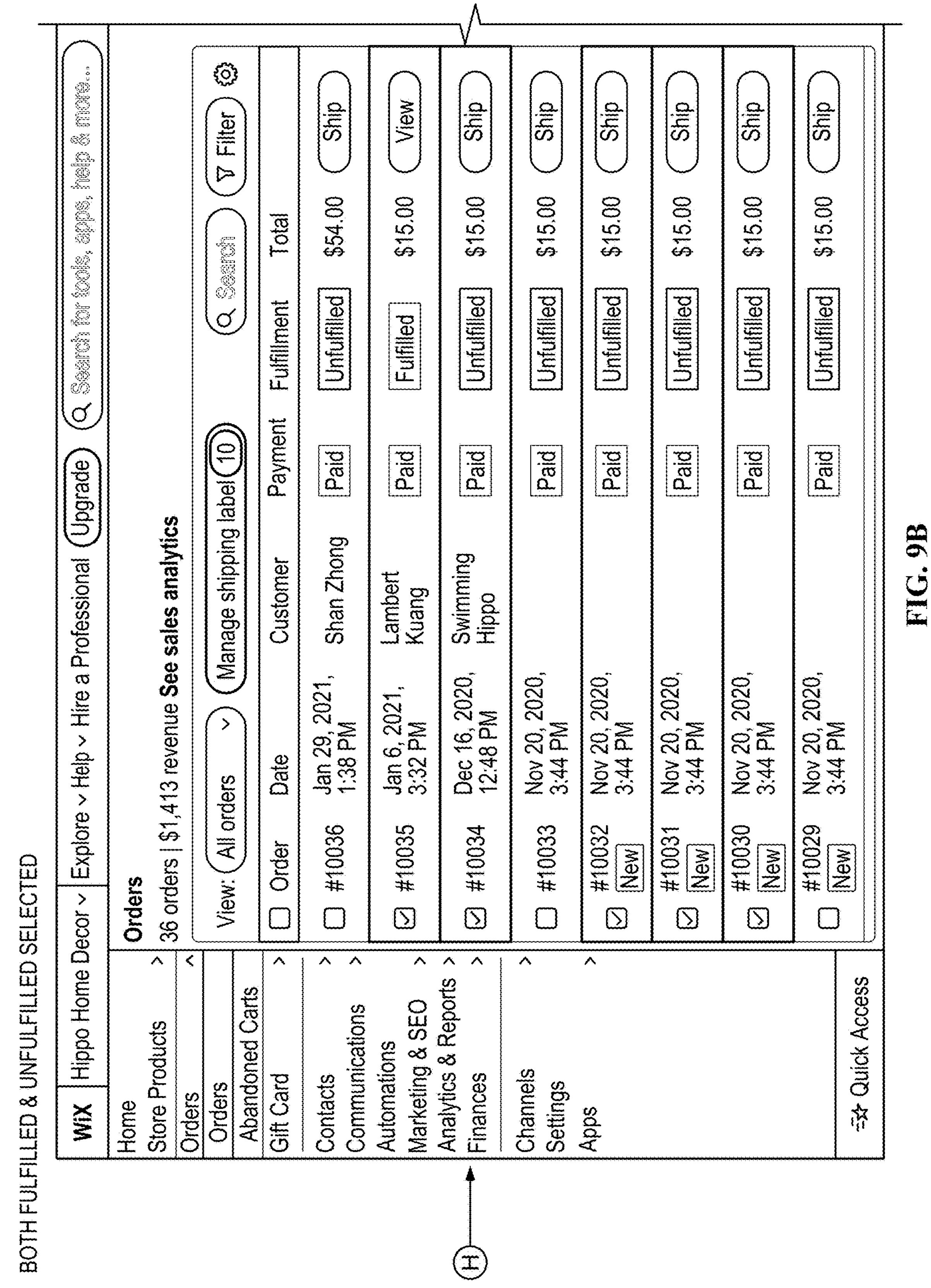

FIG. 9B

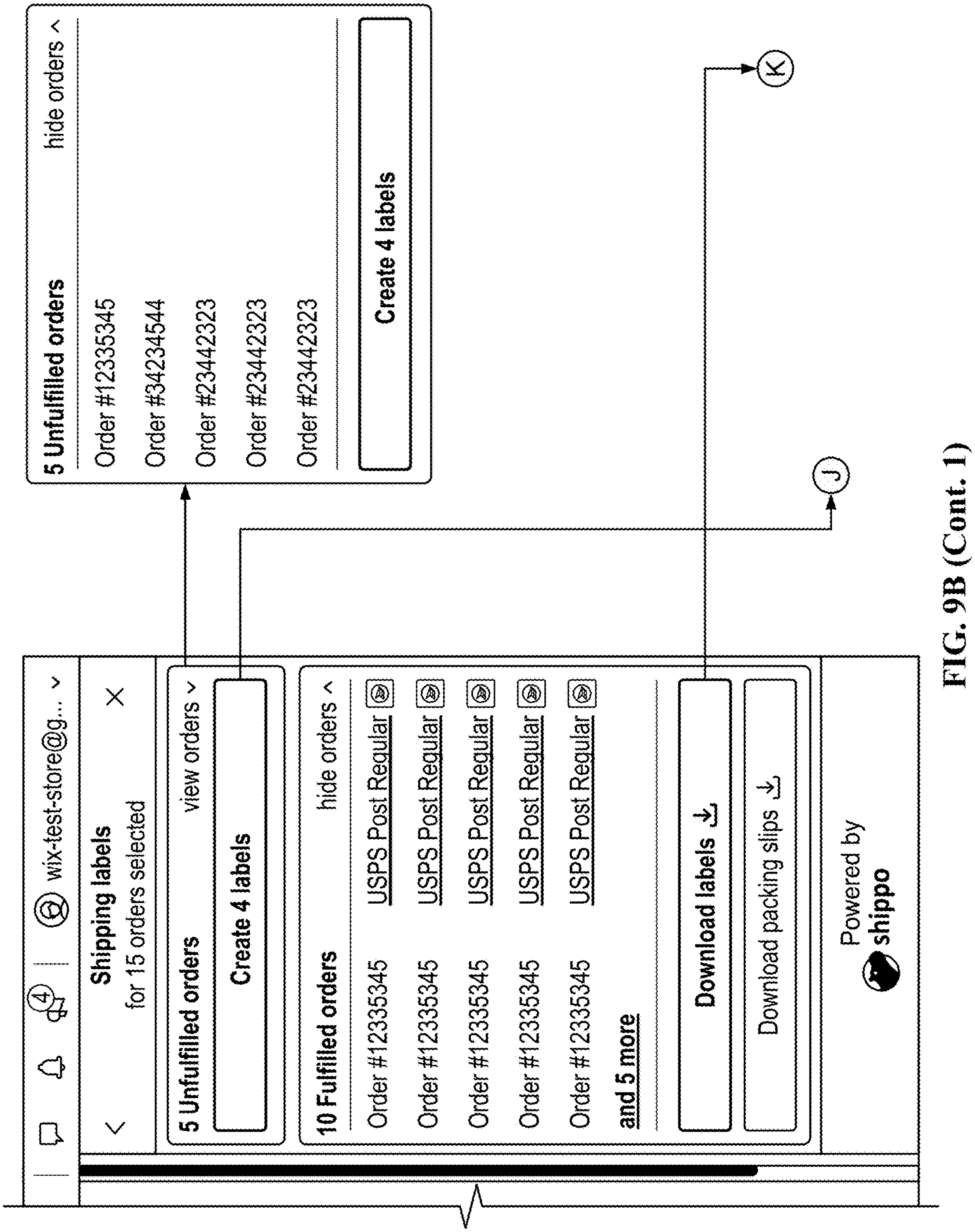
FIG. 9B (Cont. 1)

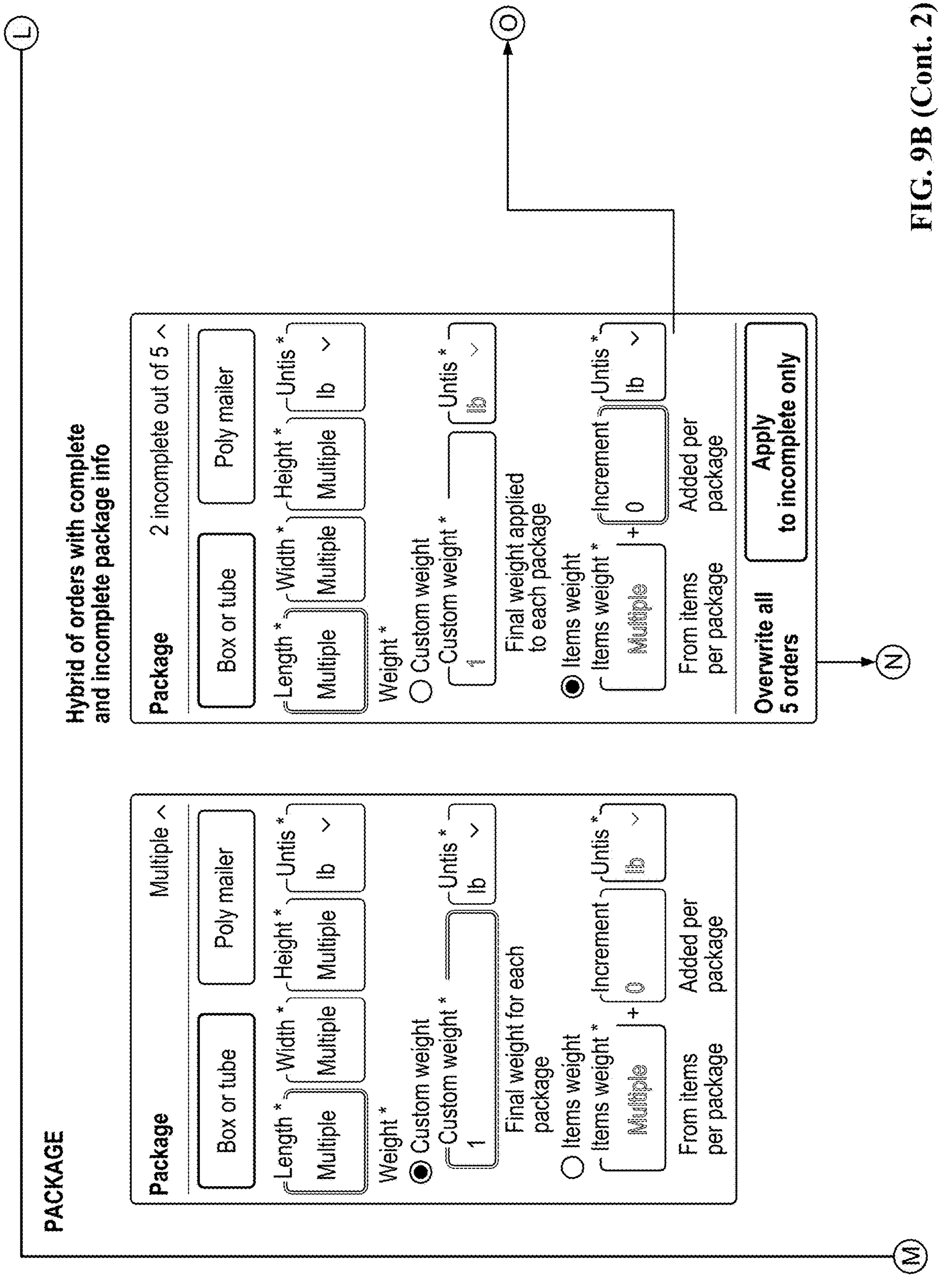
FIG. 9B (Cont. 2)

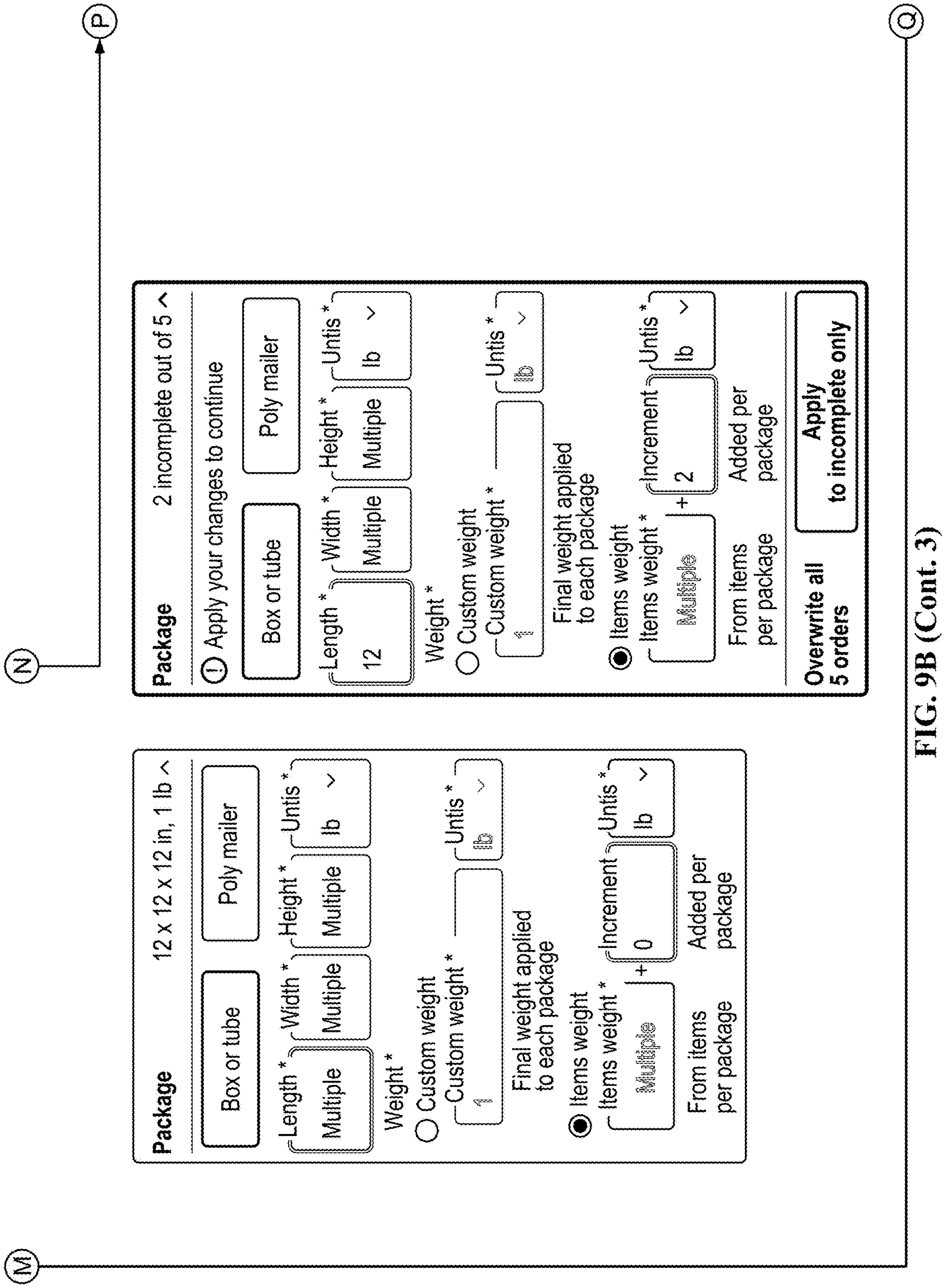
FIG. 9B (Cont. 3)

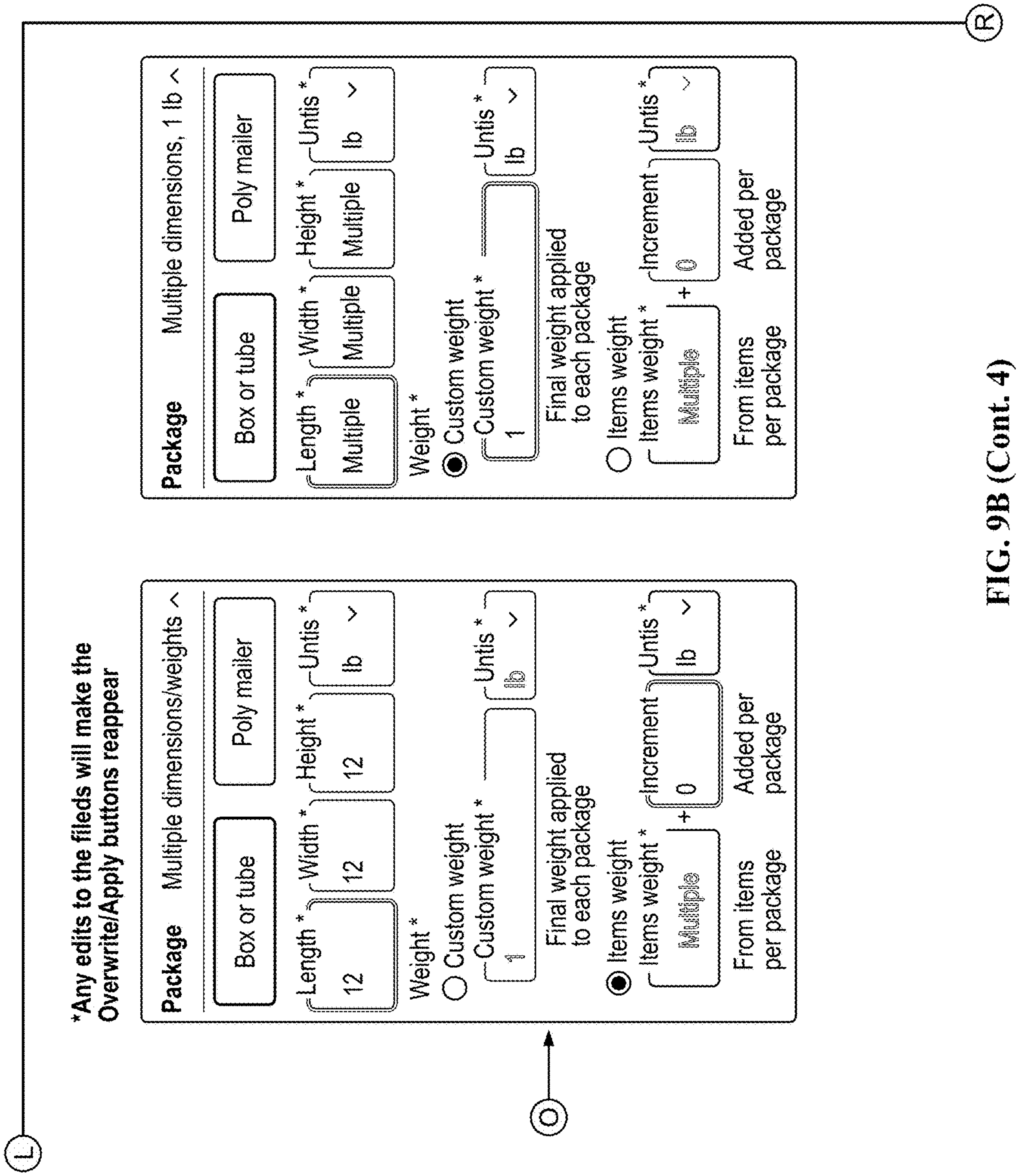
FIG. 9B (Cont. 4)

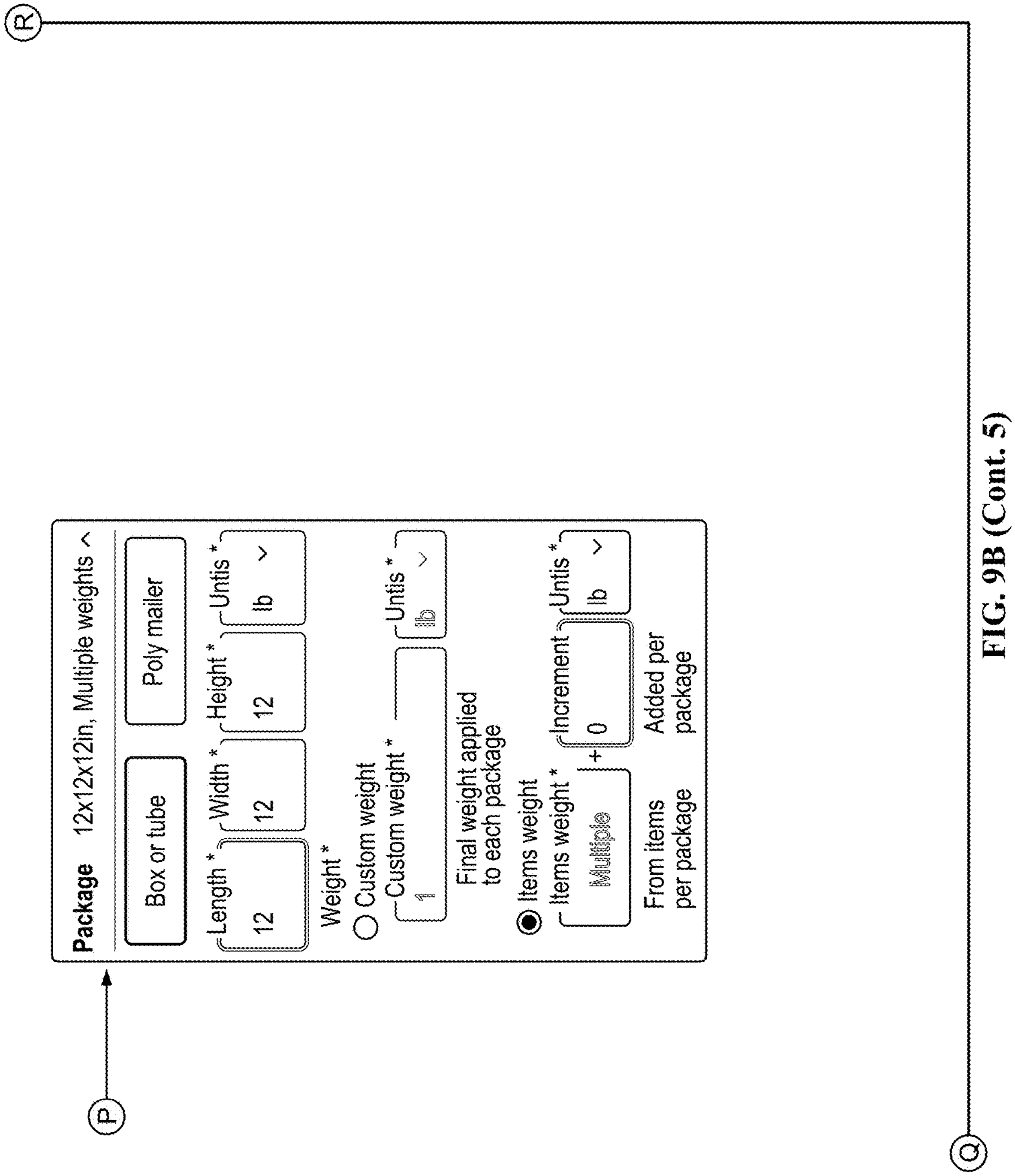
FIG. 9B (Cont. 5)

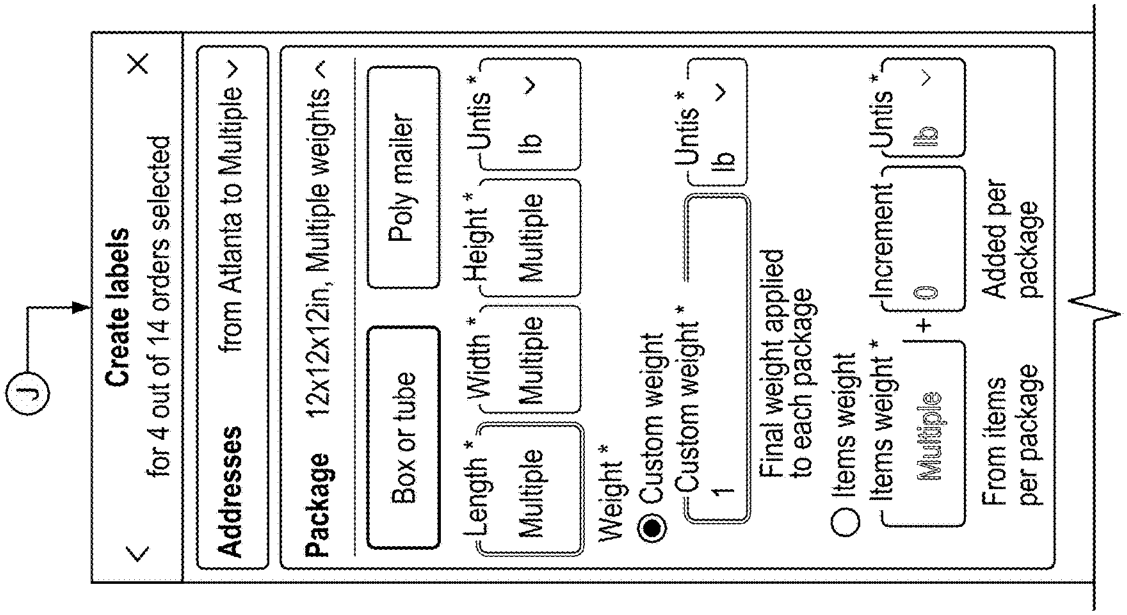
FIG. 9B (Cont. 6)

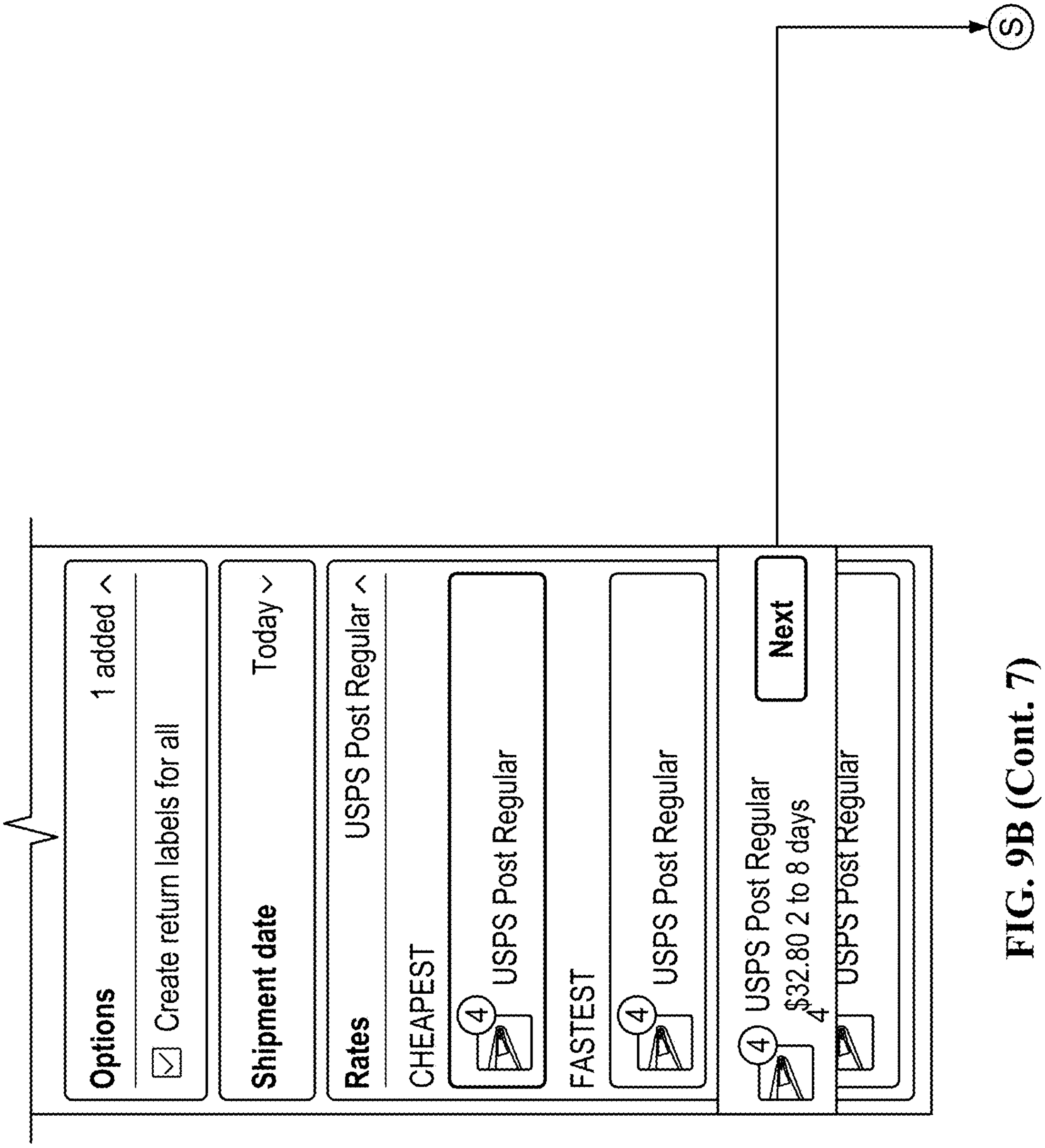
FIG. 9B (Cont. 7)

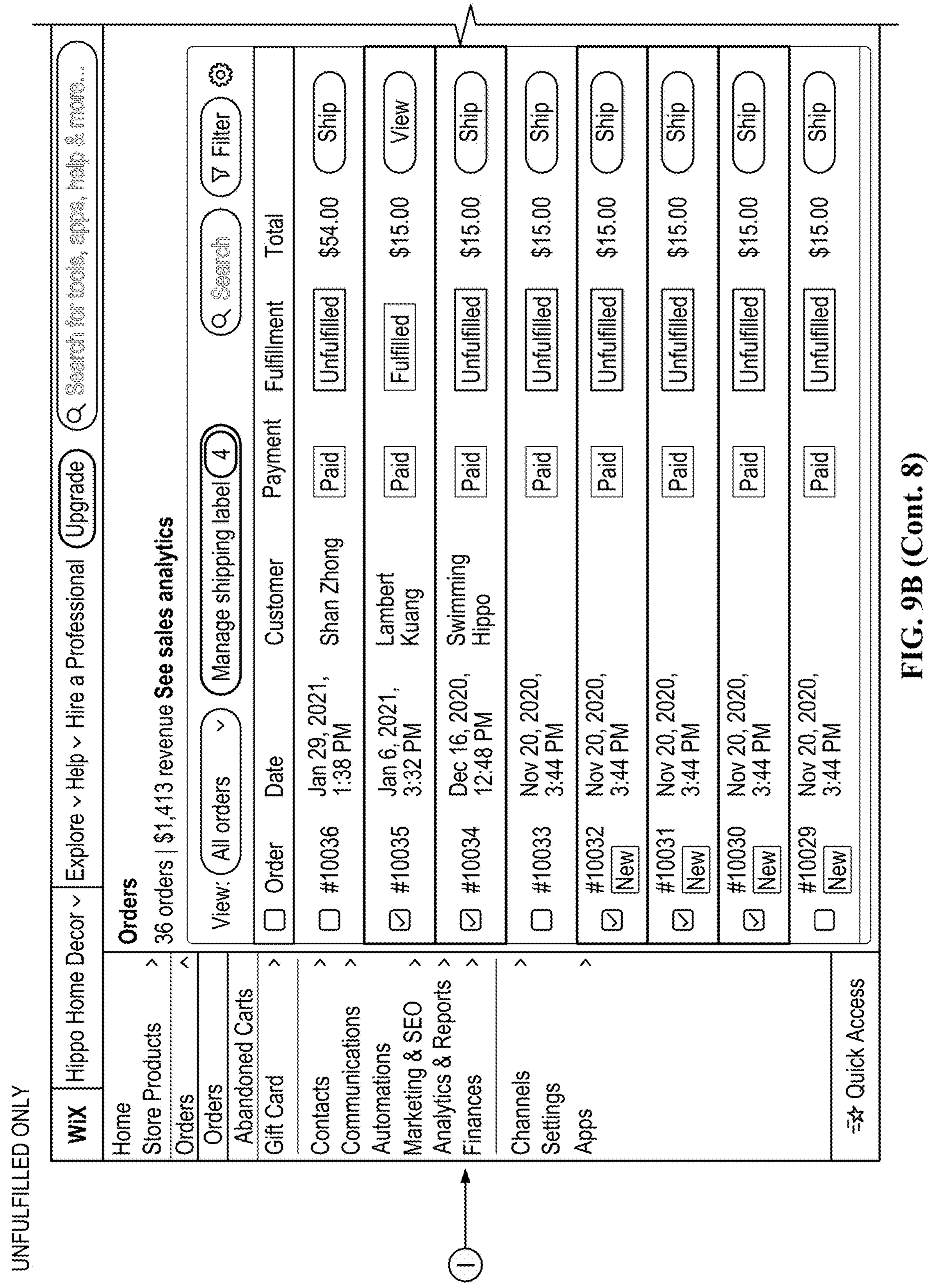

FIG. 9B (Cont. 8)

UNFULFILLED ONLY

WiX | Hippo Home Decor ⌄ | Explore ⌄ Help ⌄ Hire a Professional (Upgrade) Search for tools, apps, help & more...

Home
Store Products
Orders
Orders
Abandoned Carts
Gift Card
Contacts
Communications
Automations
Marketing & SEO
Analytics & Reports
Finances
Channels
Settings
Apps
Quick Access

Orders

36 orders | $1,413 revenue See sales analytics

View: (All orders ⌄) (Manage shipping label (4)) Search Filter

| ☐ | Order | Date | Customer | Payment | Fulfillment | Total | |
|---|---|---|---|---|---|---|---|
| ☐ | #10036 | Jan 29, 2021, 1:38 PM | Shan Zhong | Paid | Unfulfilled | $54.00 | Ship |
| ☑ | #10035 | Jan 6, 2021, 3:32 PM | Lambert Kuang | Paid | Fulfilled | $15.00 | View |
| ☑ | #10034 | Dec 16, 2020, 12:48 PM | Swimming Hippo | Paid | Unfulfilled | $15.00 | Ship |
| ☐ | #10033 | Nov 20, 2020, 3:44 PM | | Paid | Unfulfilled | $15.00 | Ship |
| ☑ | #10032 New | Nov 20, 2020, 3:44 PM | | Paid | Unfulfilled | $15.00 | Ship |
| ☑ | #10031 New | Nov 20, 2020, 3:44 PM | | Paid | Unfulfilled | $15.00 | Ship |
| ☑ | #10030 New | Nov 20, 2020, 3:44 PM | | Paid | Unfulfilled | $15.00 | Ship |
| ☐ | #10029 New | Nov 20, 2020, 3:44 PM | | Paid | Unfulfilled | $15.00 | Ship |

I

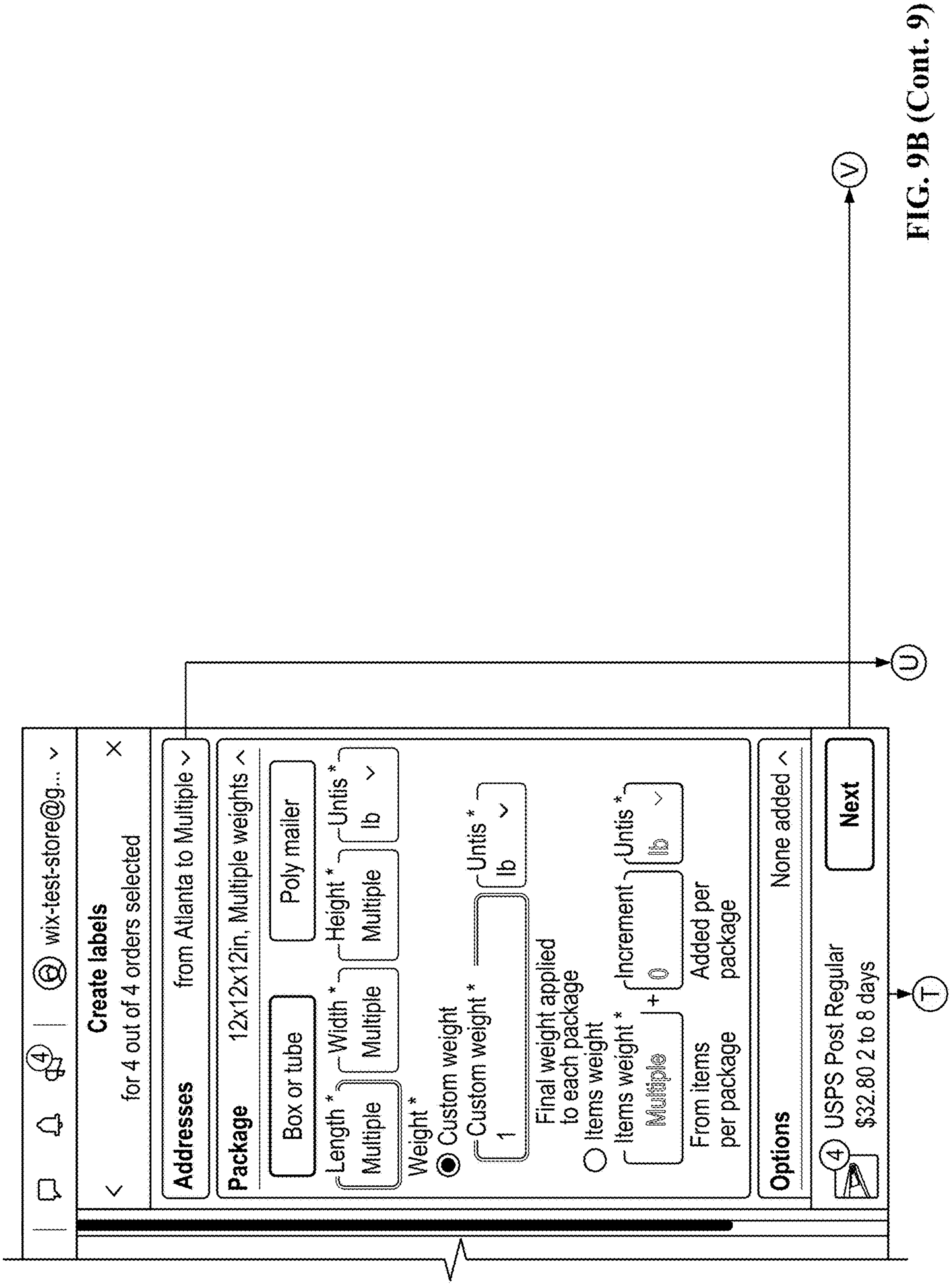
FIG. 9B (Cont. 9)

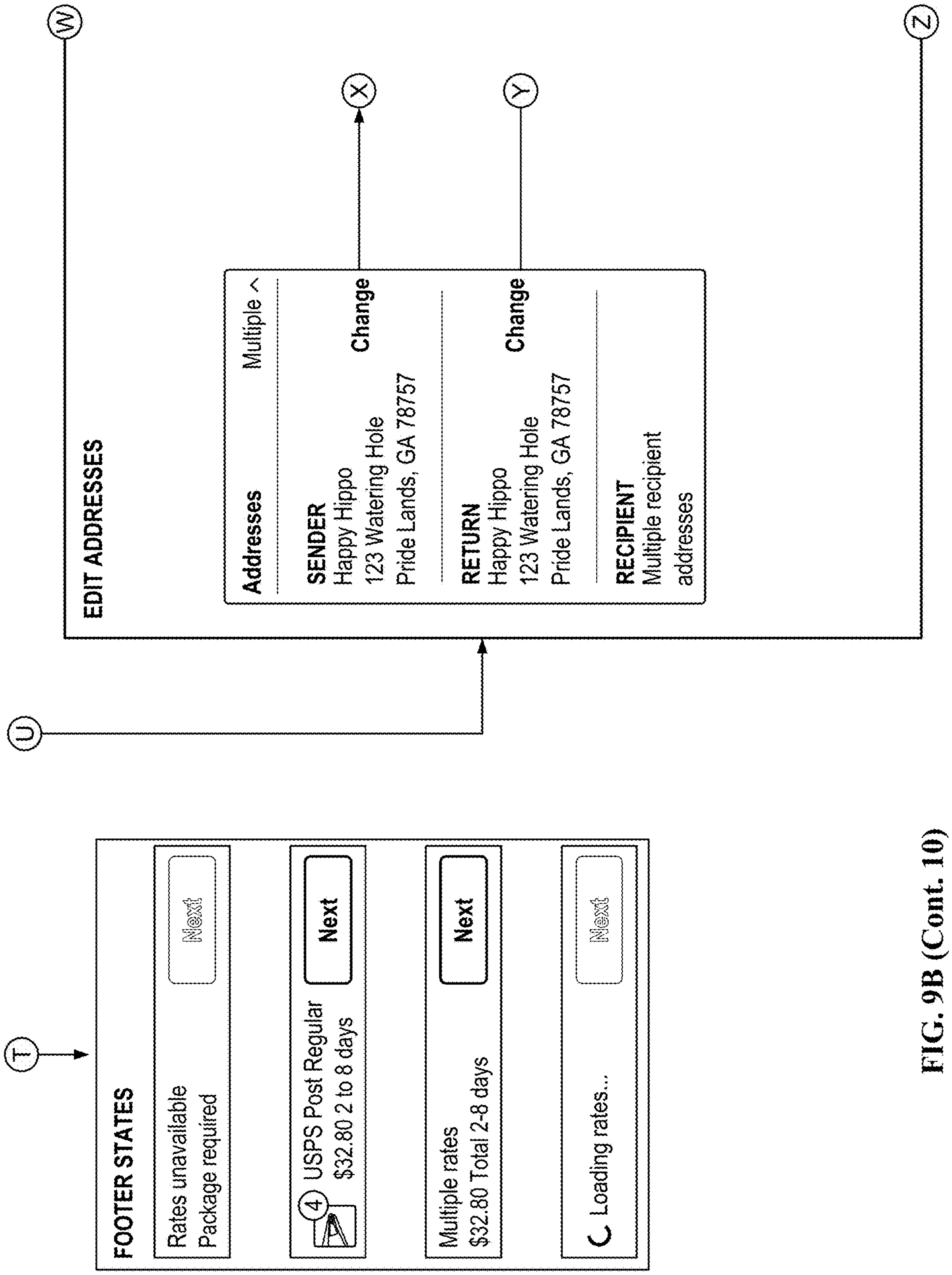
FIG. 9B (Cont. 10)

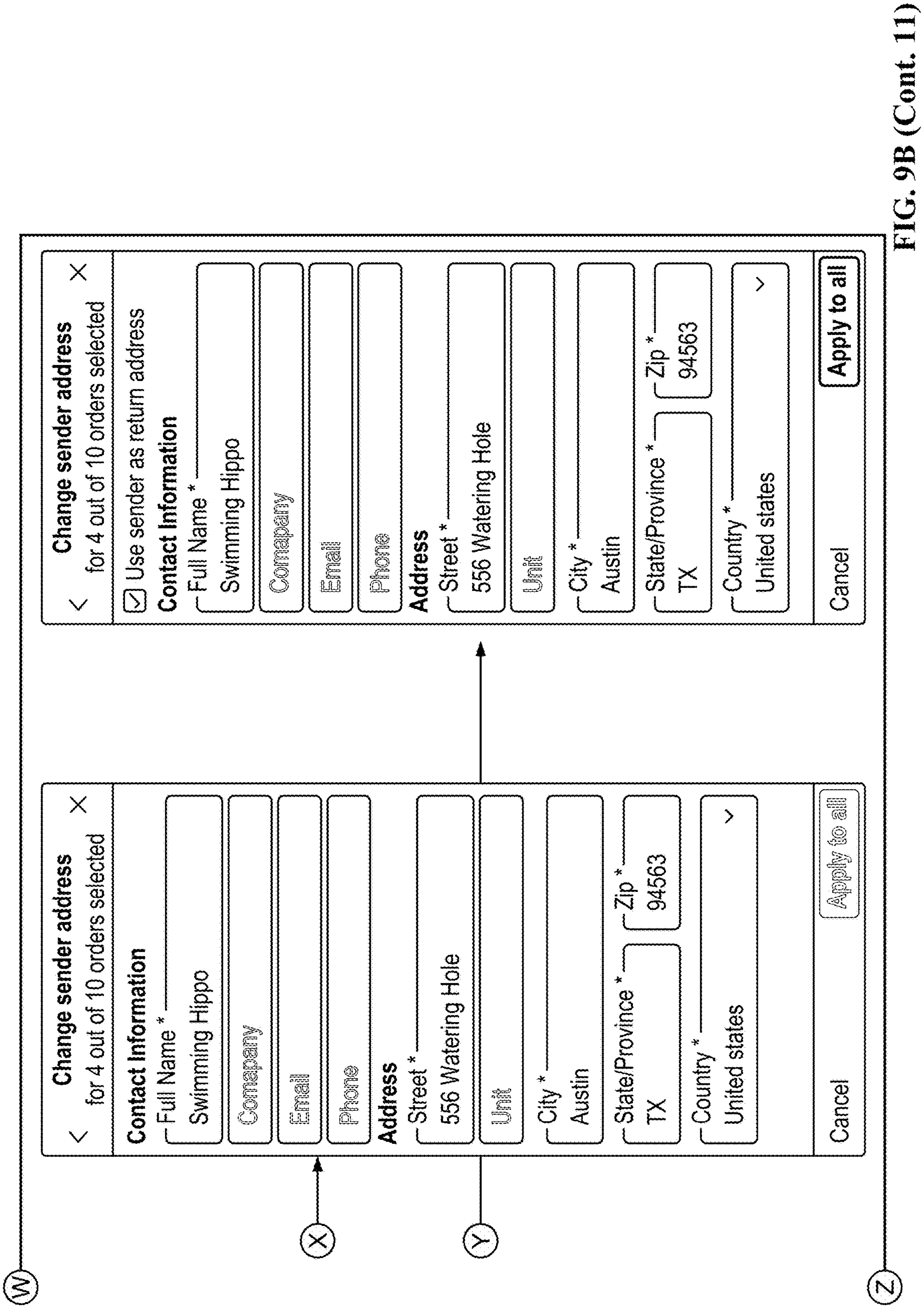
FIG. 9B (Cont. 11)

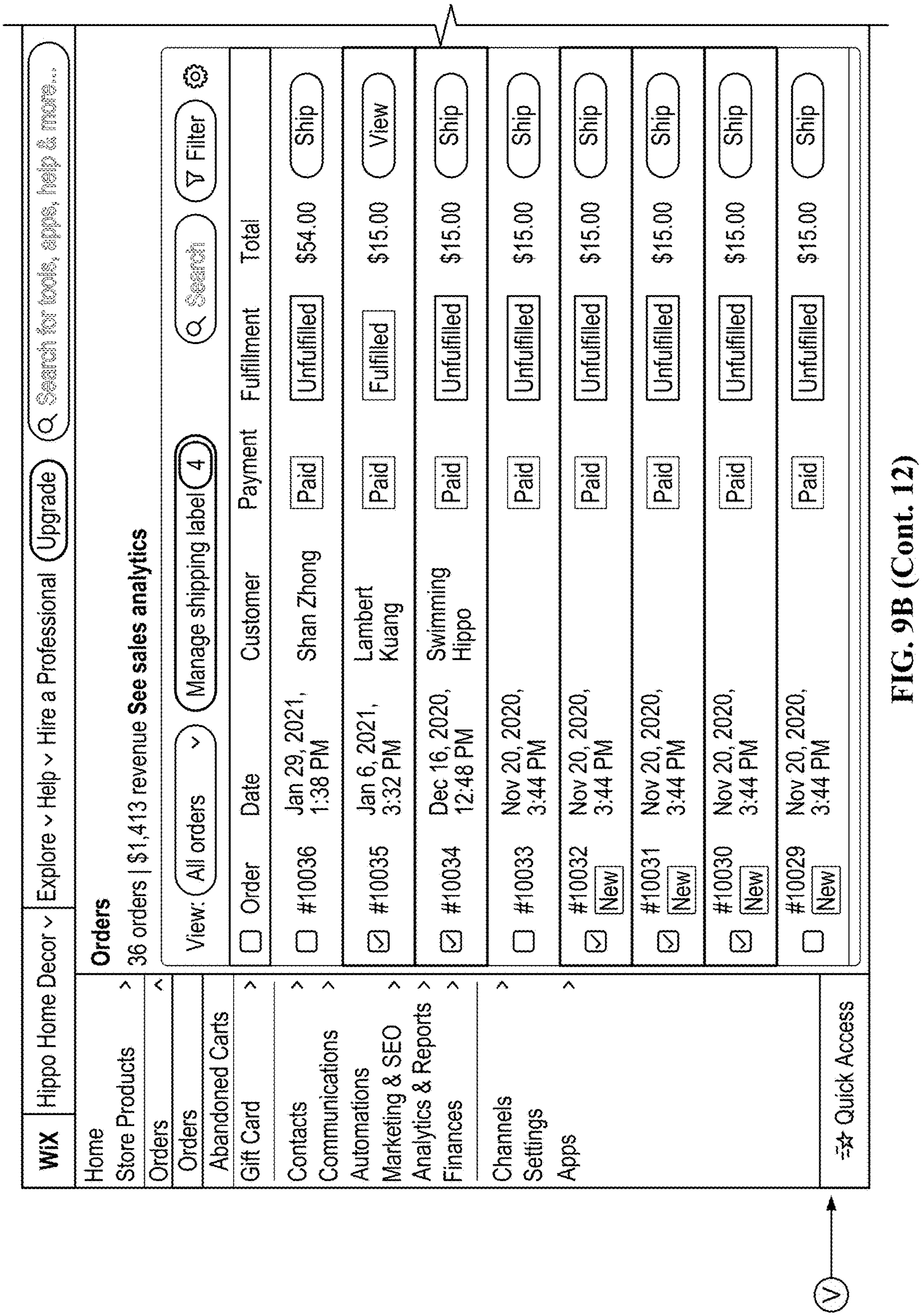

FIG. 9B (Cont. 12)

WiX | Hippo Home Decor ⌄ | Explore ⌄ Help ⌄ Hire a Professional (Upgrade) | Search for tools, apps, help & more...

Home
Store Products >
Orders ^
Orders
Abandoned Carts
Gift Card >
Contacts >
Communications >
Automations
Marketing & SEO >
Analytics & Reports >
Finances >
Channels >
Settings
Apps >
Quick Access

V

Orders

36 orders | $1,413 revenue See sales analytics

View: All orders ⌄ | Manage shipping label (4) | Search | Filter

| ☐ | Order | Date | Customer | Payment | Fulfillment | Total | |
|---|---|---|---|---|---|---|---|
| ☐ | #10036 | Jan 29, 2021, 1:38 PM | Shan Zhong | Paid | Unfulfilled | $54.00 | Ship |
| ☑ | #10035 | Jan 6, 2021, 3:32 PM | Lambert Kuang | Paid | Fulfilled | $15.00 | View |
| ☑ | #10034 | Dec 16, 2020, 12:48 PM | Swimming Hippo | Paid | Unfulfilled | $15.00 | Ship |
| ☐ | #10033 | Nov 20, 2020, 3:44 PM | | Paid | Unfulfilled | $15.00 | Ship |
| ☑ | #10032 New | Nov 20, 2020, 3:44 PM | | Paid | Unfulfilled | $15.00 | Ship |
| ☑ | #10031 New | Nov 20, 2020, 3:44 PM | | Paid | Unfulfilled | $15.00 | Ship |
| ☑ | #10030 New | Nov 20, 2020, 3:44 PM | | Paid | Unfulfilled | $15.00 | Ship |
| ☐ | #10029 New | Nov 20, 2020, 3:44 PM | | Paid | Unfulfilled | $15.00 | Ship |

FIG. 9B (Cont. 12)

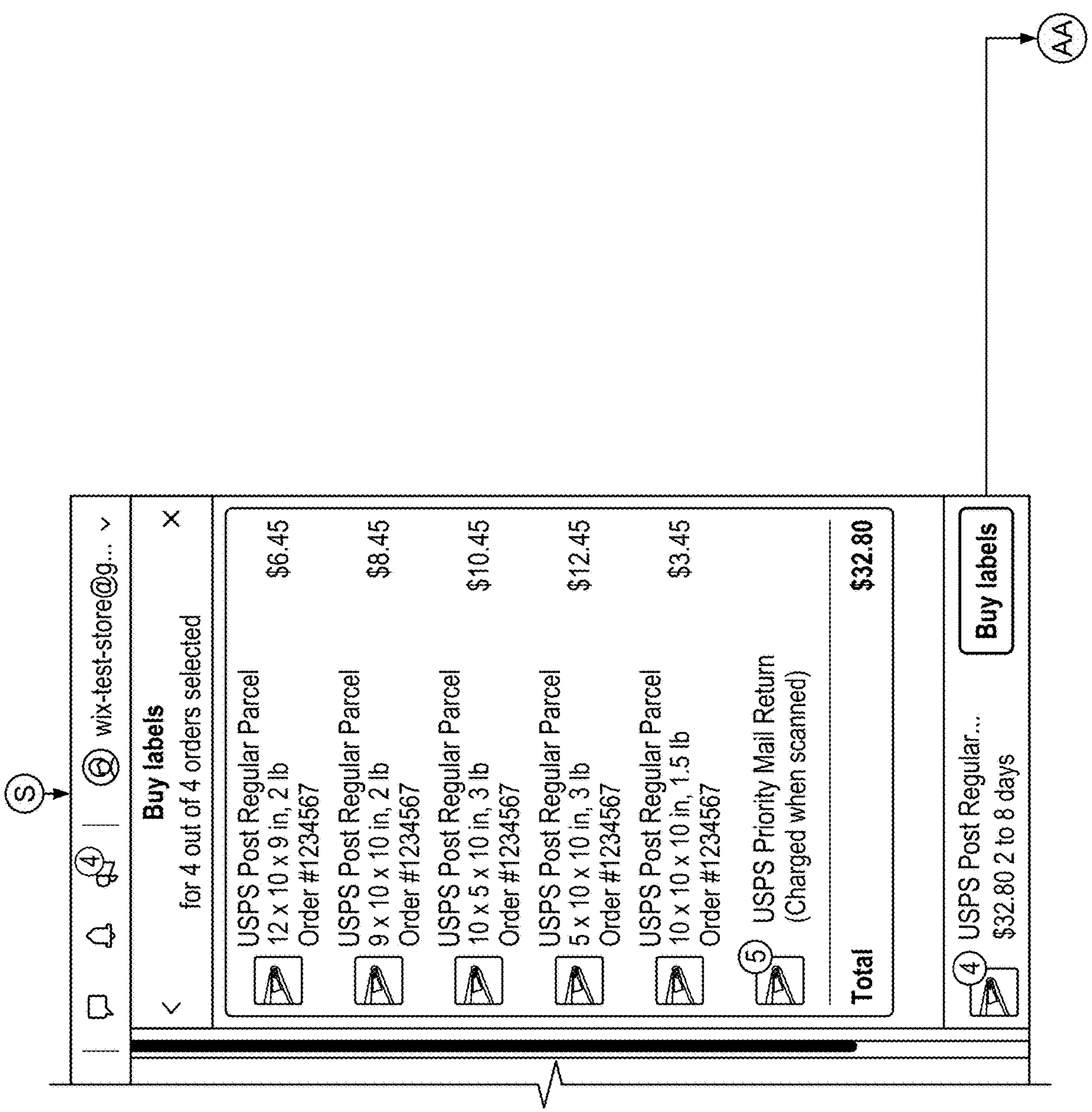
FIG. 9B (Cont. 13)

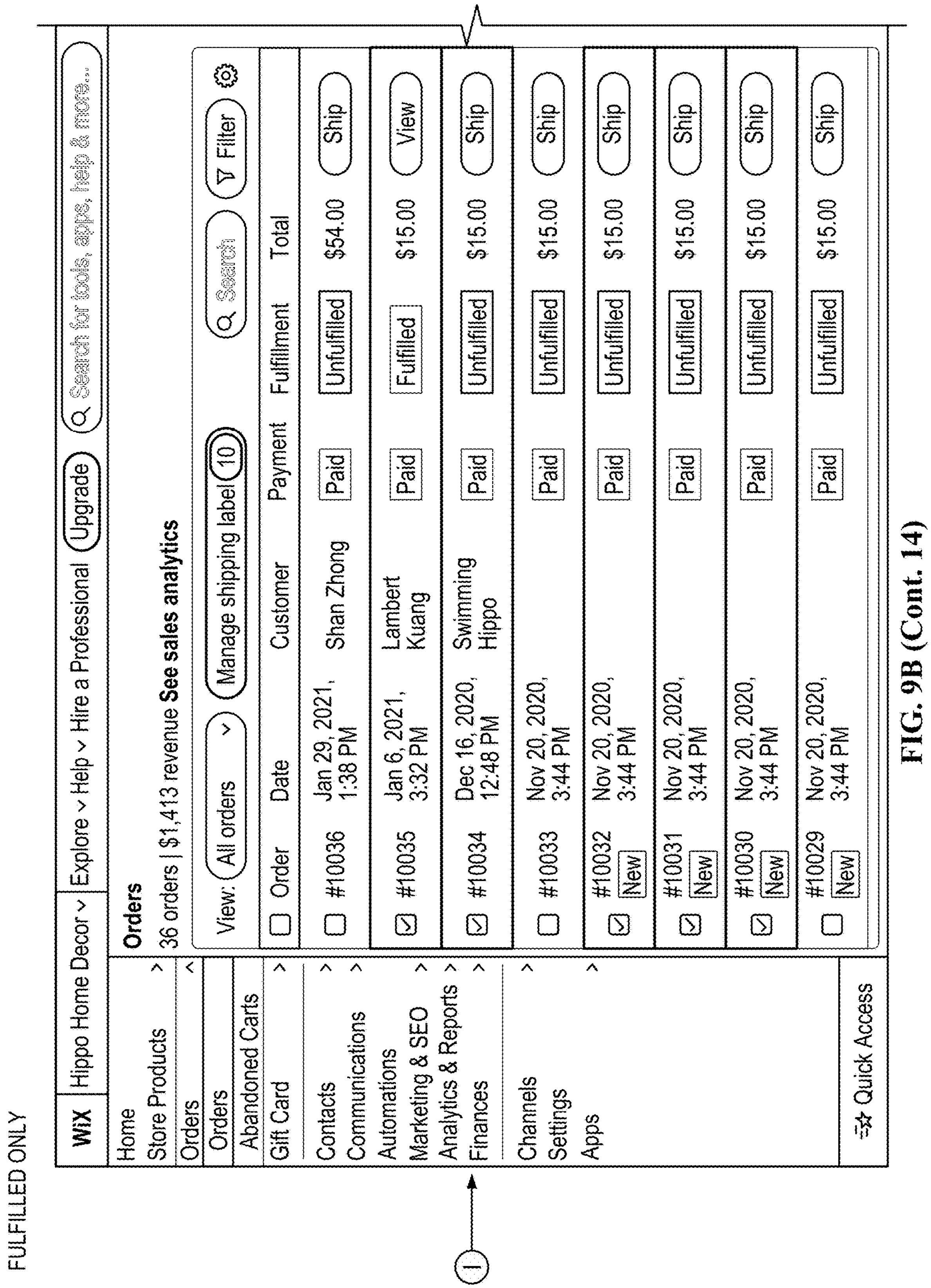

FIG. 9B (Cont. 14)

FULFILLED ONLY

WiX | Hippo Home Decor ⌄ | Explore ⌄ Help ⌄ Hire a Professional (Upgrade) | Search for tools, apps, help & more...

Home
Store Products >
Orders ^
Orders
Abandoned Carts
Gift Card >
Contacts >
Communications >
Automations
Marketing & SEO >
Analytics & Reports >
Finances >
Channels >
Settings
Apps >
Quick Access

Orders

36 orders | $1,413 revenue See sales analytics

View: All orders ⌄ | Manage shipping label (10) | Search | Filter

| ☐ | Order | Date | Customer | Payment | Fulfillment | Total | |
|---|---|---|---|---|---|---|---|
| ☐ | #10036 | Jan 29, 2021, 1:38 PM | Shan Zhong | Paid | Unfulfilled | $54.00 | Ship |
| ☑ | #10035 | Jan 6, 2021, 3:32 PM | Lambert Kuang | Paid | Fulfilled | $15.00 | View |
| ☑ | #10034 | Dec 16, 2020, 12:48 PM | Swimming Hippo | Paid | Unfulfilled | $15.00 | Ship |
| ☐ | #10033 | Nov 20, 2020, 3:44 PM | | Paid | Unfulfilled | $15.00 | Ship |
| ☑ | #10032 New | Nov 20, 2020, 3:44 PM | | Paid | Unfulfilled | $15.00 | Ship |
| ☑ | #10031 New | Nov 20, 2020, 3:44 PM | | Paid | Unfulfilled | $15.00 | Ship |
| ☑ | #10030 New | Nov 20, 2020, 3:44 PM | | Paid | Unfulfilled | $15.00 | Ship |
| ☐ | #10029 New | Nov 20, 2020, 3:44 PM | | Paid | Unfulfilled | $15.00 | Ship |

I

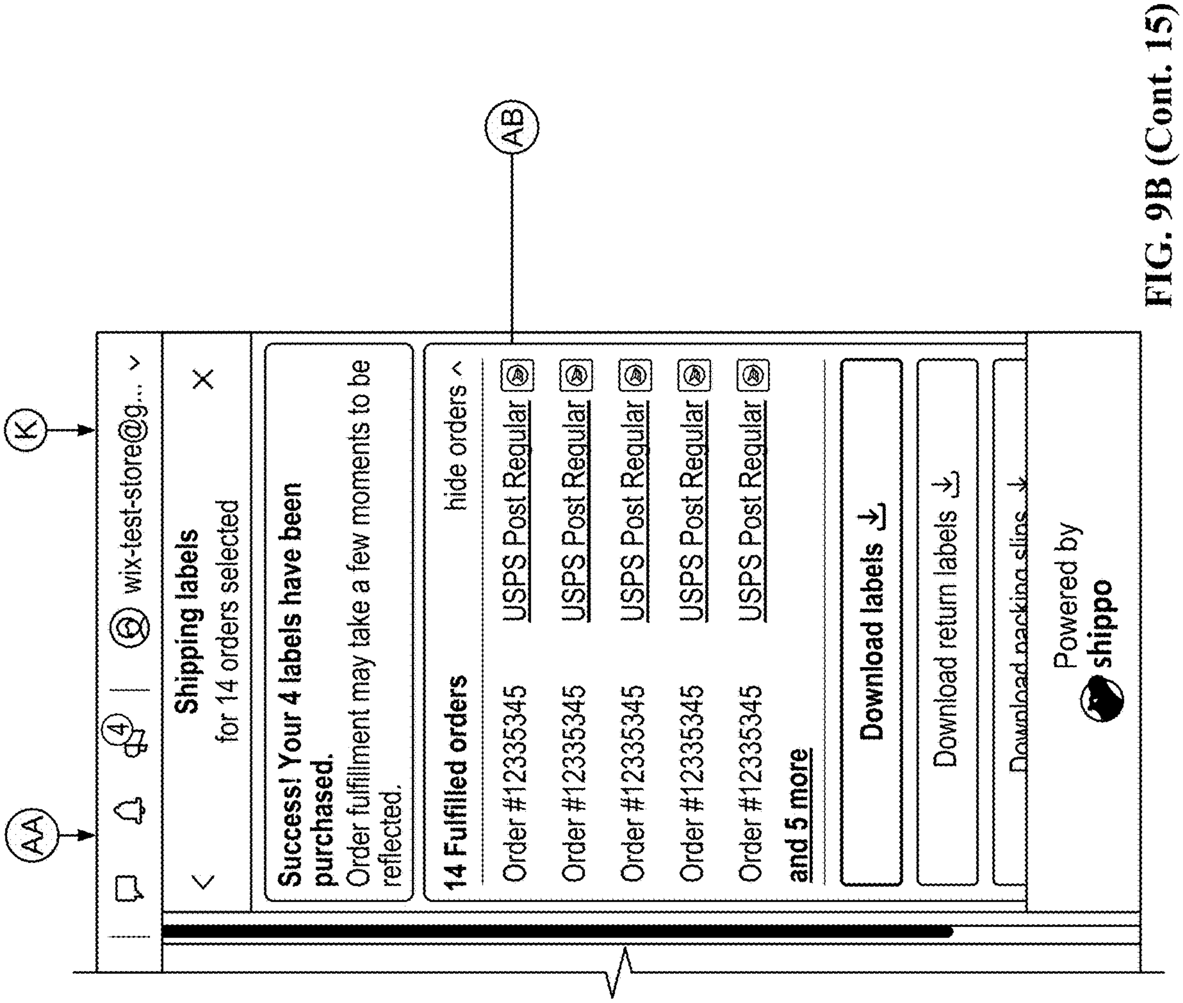
FIG. 9B (Cont. 15)

A

ERROR STATES

ERROR STATES:
-user selects too many orders (past threshold)
-conflicting changes (we can apply this to some but not all orders; when addresses turn crossborder in a way we can't support, a package is too heavy for the service level)
->accept for only the ones that can Shipping labels
105 orders selected Label management for selections over 100 not supported. Deselect at least 5 orders to continue.

Powered by
shippo

B

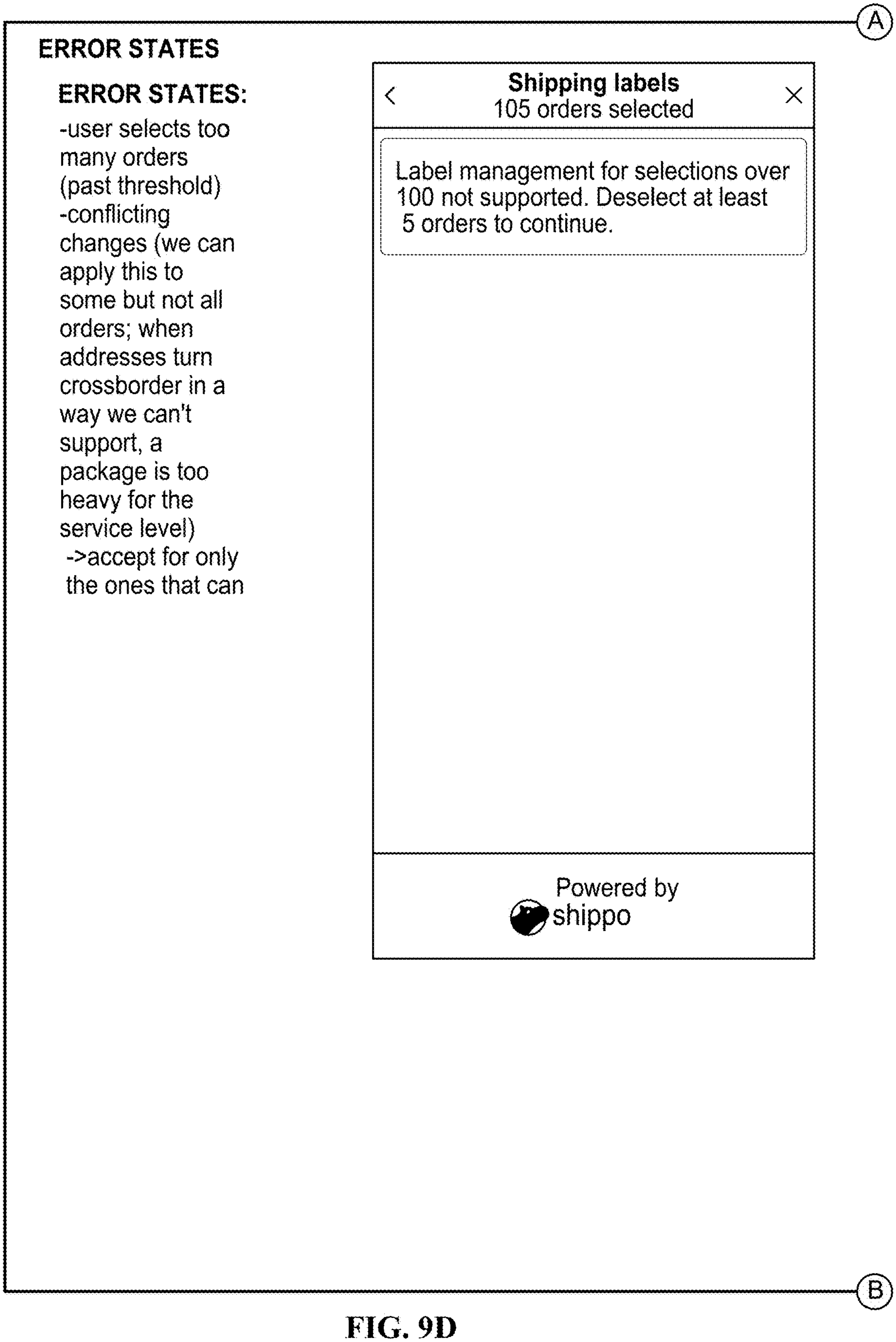

FIG. 9D

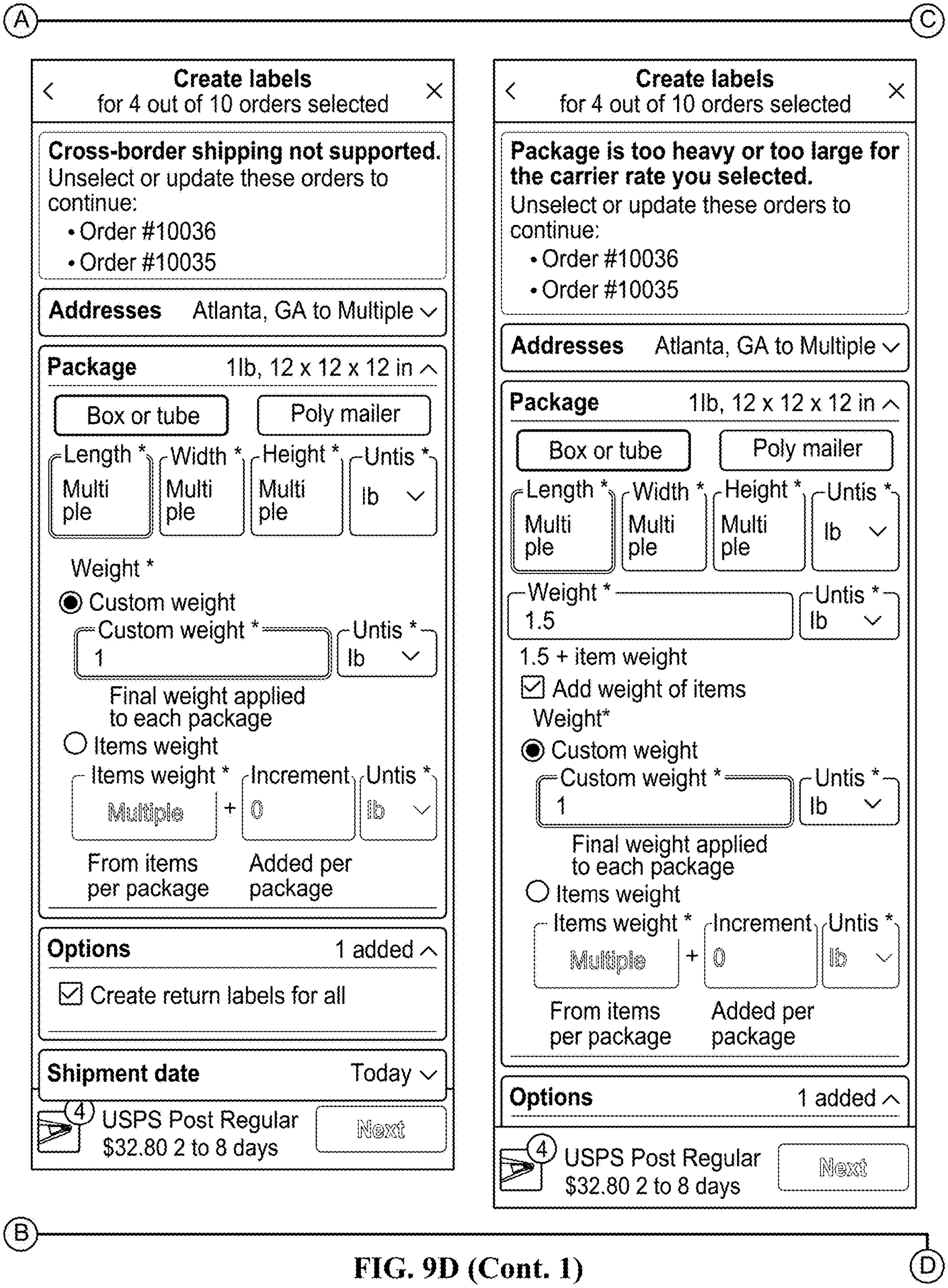
FIG. 9D (Cont. 1)

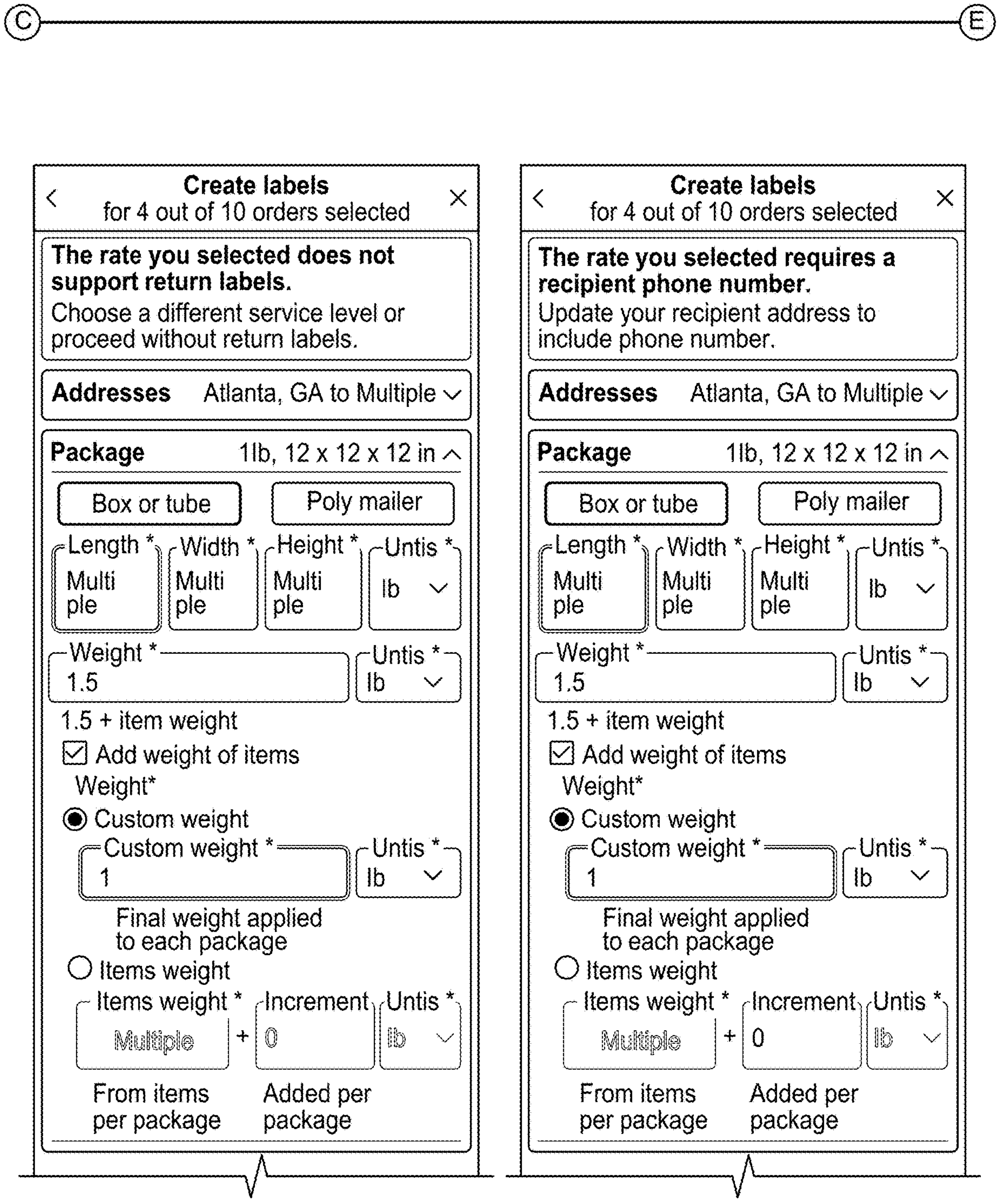

Create labels
for 4 out of 10 orders selected

The rate you selected does not support return labels.
Choose a different service level or proceed without return labels.

Addresses Atlanta, GA to Multiple

Package 1lb, 12 x 12 x 12 in

Box or tube
Poly mailer

Length * Multiple
Width * Multiple
Height * Multiple
Untis * lb

Weight * 1.5
Untis * lb 1.5 + item weight

Add weight of items

Weight*

Custom weight

Custom weight * 1
Untis * lb

Final weight applied to each package

Items weight

Items weight * Multiple + Increment 0
Untis * lb

From items per package
Added per package

Create labels
for 4 out of 10 orders selected

The rate you selected requires a recipient phone number.
Update your recipient address to include phone number.

Addresses Atlanta, GA to Multiple

Package 1lb, 12 x 12 x 12 in

Box or tube
Poly mailer

Length * Multiple
Width * Multiple
Height * Multiple
Untis * lb

Weight * 1.5
Untis * lb 1.5 + item weight

Add weight of items

Weight*

Custom weight

Custom weight * 1
Untis * lb

Final weight applied to each package

Items weight

Items weight * Multiple + Increment 0
Untis * lb

From items per package
Added per package

FIG. 9D (Cont. 2)

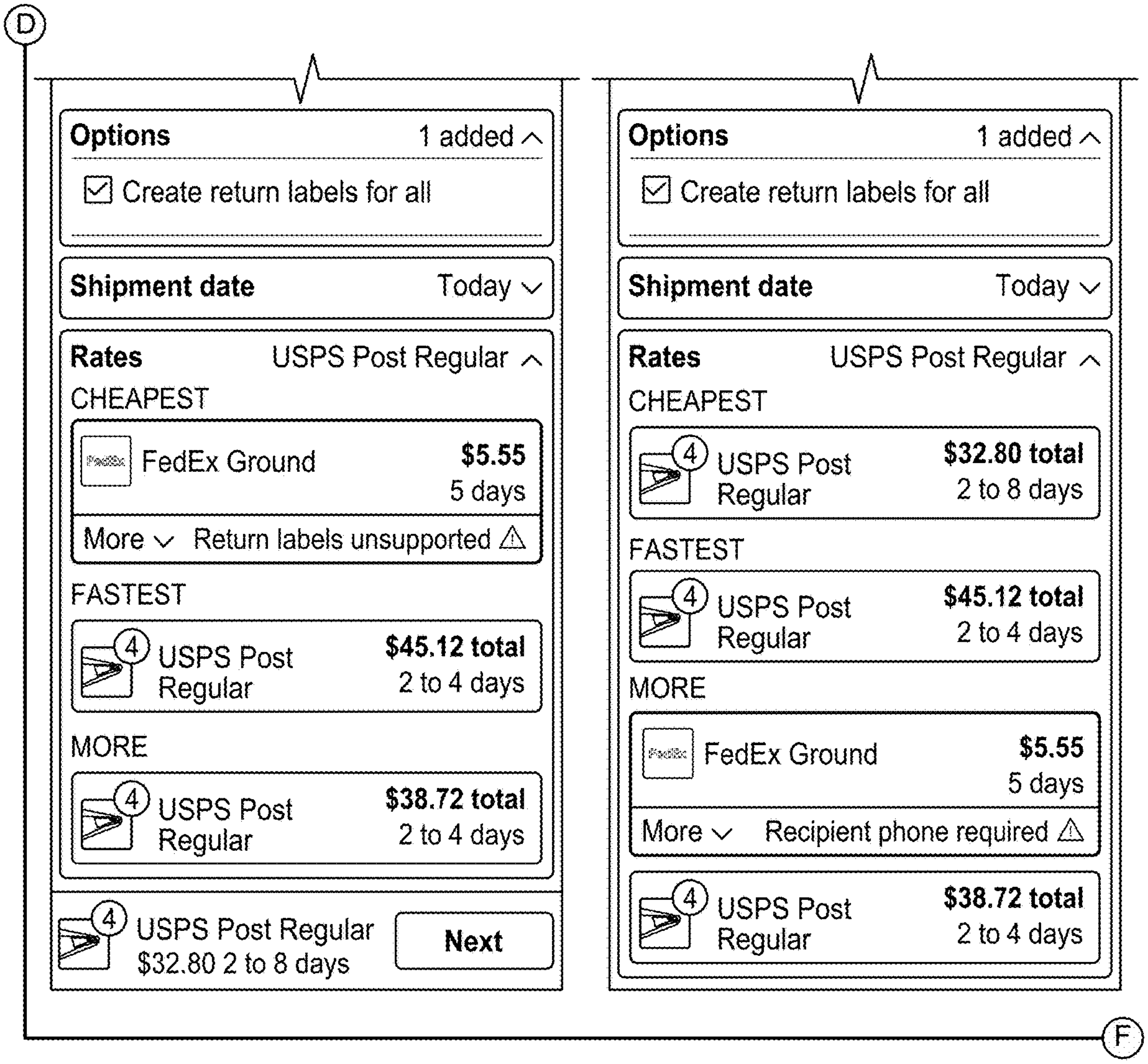
FIG. 9D (Cont. 3)

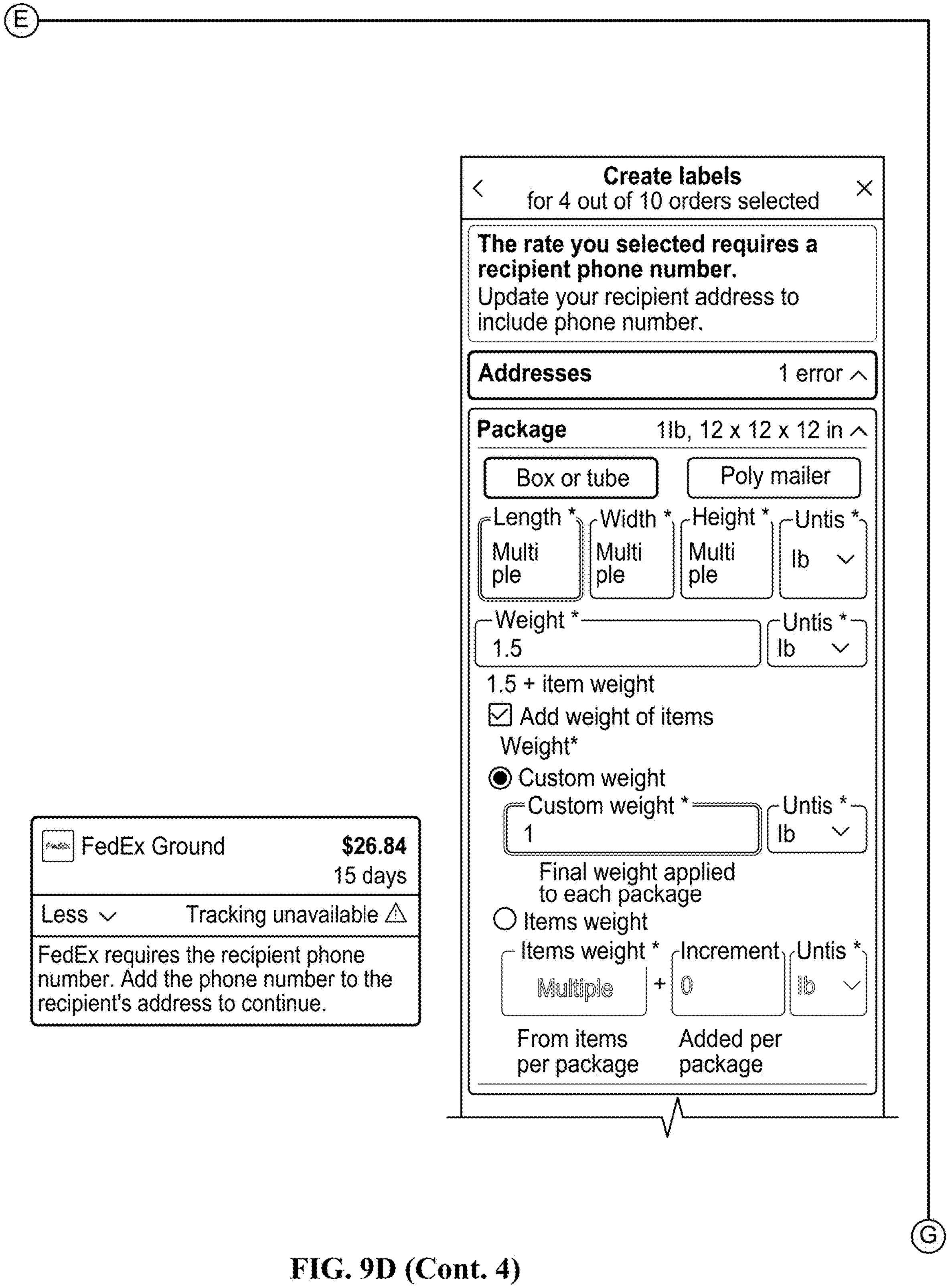
FIG. 9D (Cont. 4)

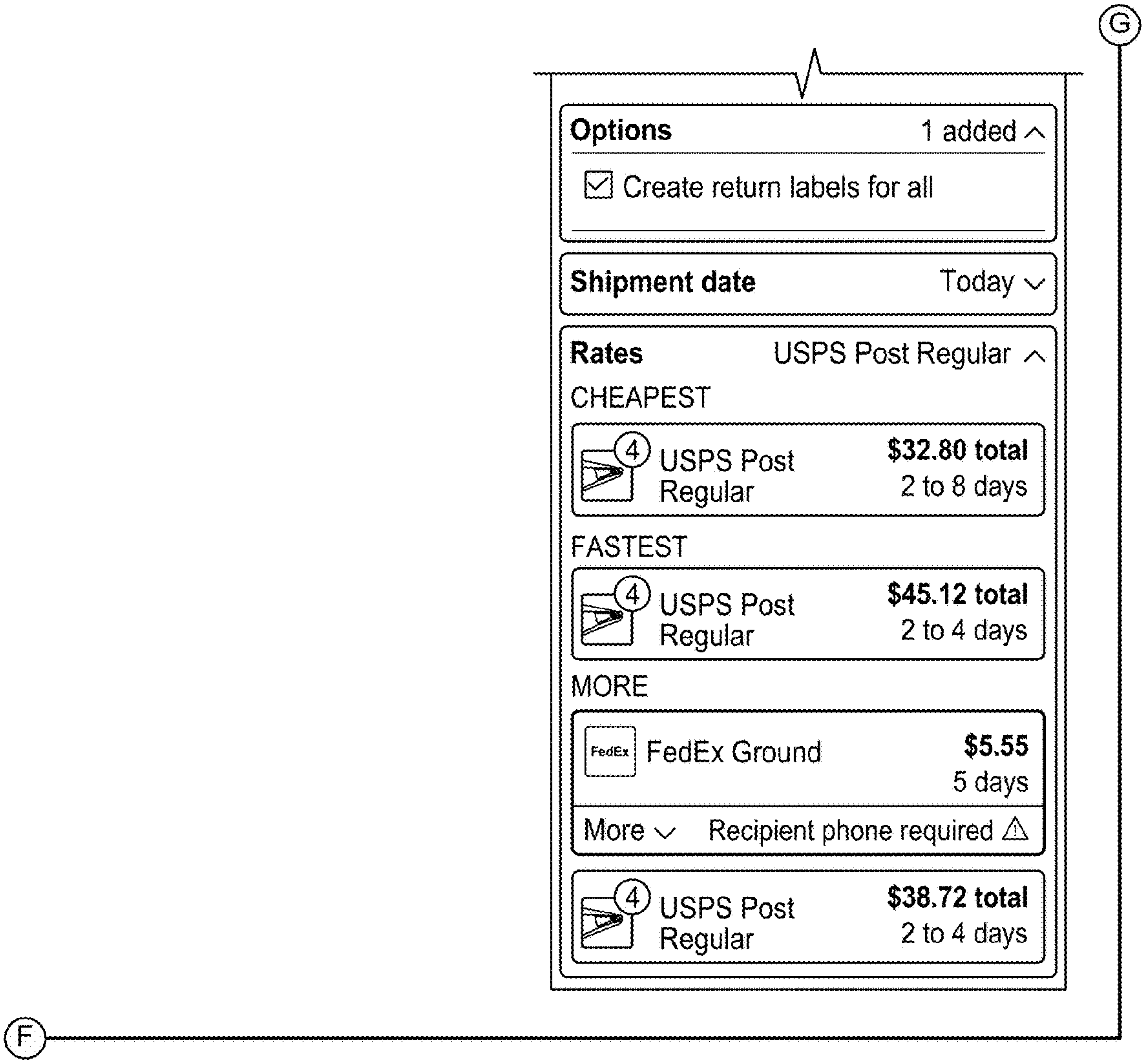
FIG. 9D (Cont. 5)

EMBEDDED SHIPPING LABEL MANAGEMENT

CROSS REFERENCE TO OTHER APPLICATIONS

This application claims priority to U.S. Provisional Patent Application No. 63/434,936 entitled EMBEDDED SHIPPING LABEL MANAGEMENT filed Dec. 22, 2022 which is incorporated herein by reference for all purposes.

BACKGROUND OF THE INVENTION

Sales of goods across computer networks typically involve the shipment of goods. Sales of goods across computer networks may be enabled using a site platform, for example an electronic commerce platform. An electronic commerce platform may not provide a complete service for shipment of goods.

BRIEF DESCRIPTION OF THE DRAWINGS

Various embodiments of the invention are disclosed in the following detailed description and the accompanying drawings.

FIGS. 3A-3K are screenshots illustrating an embodiment of a more detailed workflow using an embeddable shipping label management element including an account setup and a label purchase.

FIG. 5 is a screenshot illustrating an embodiment of shipping label settings using an embeddable shipping label management element.

FIG. 9A is an illustration of an onboarding interface design.

FIG. 9B is an illustration of order selection interface design.

FIG. 9D is an illustration of error states within an interface design.

DETAILED DESCRIPTION

Figure 1:
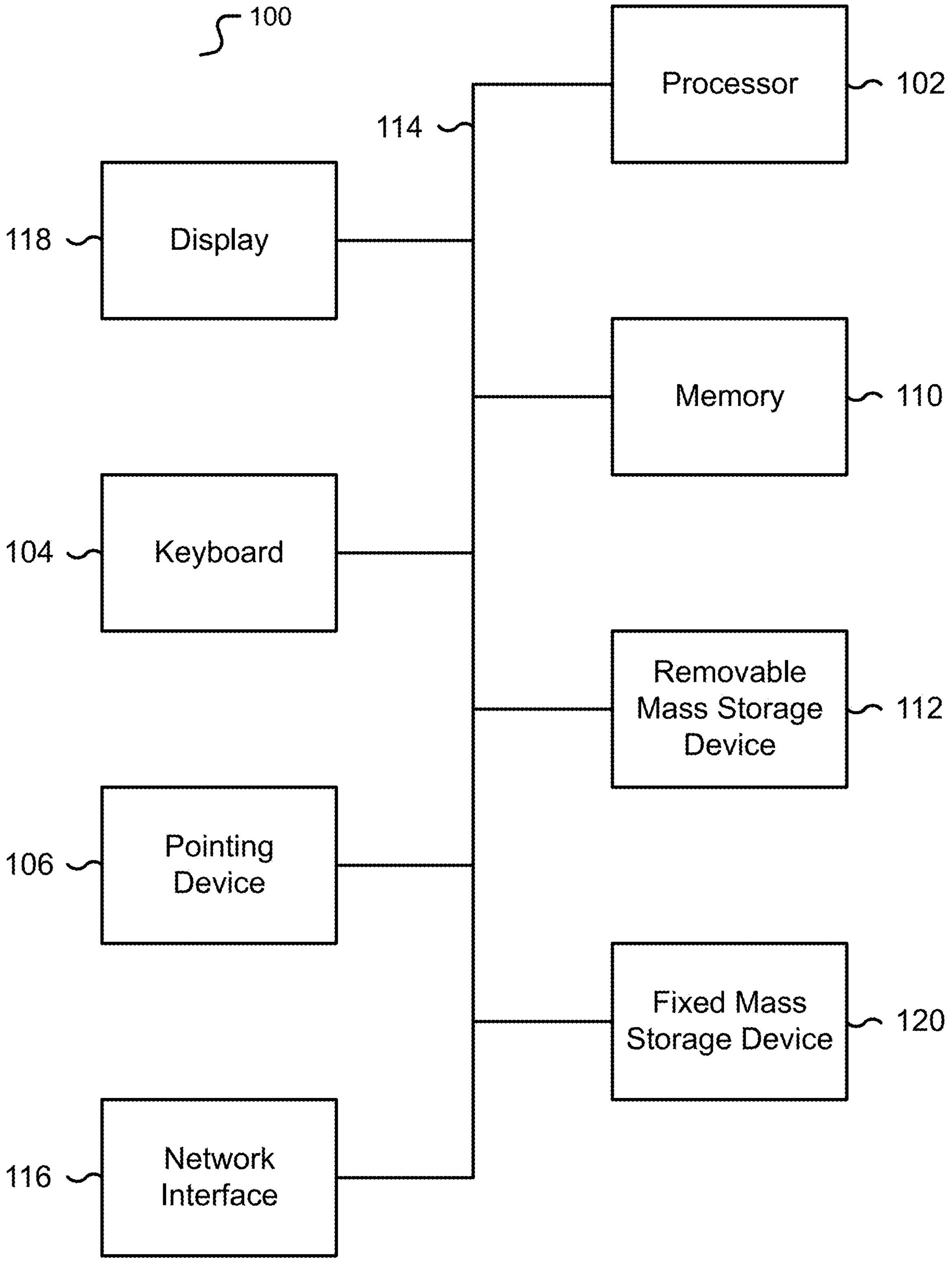
FIG. 1 is a functional diagram illustrating a programmed computer/server system for facilitating an embeddable shipping label management element in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An embeddable shipping label management element for a site platform or merchant is disclosed. As referred to herein a "site platform" is any system that enhances a merchant of goods to facilitate sales via a computer network. Examples of a site platform include an electronic commerce (eCommerce) platform, a MarketPlace, or an ERP (enterprise resource planning) system. As referred to herein a "MarketPlace" is any site that facilitates a website for a merchant to sell online, for example Wix, Shopify, or SquareSpace. Unlike traditional workflows where a platform/merchant directly calls one or more shipping management service provider's server APIs for physical fulfillment services by developing logic, workflows, and/or UI (user interface/user experience) components, a shipping management service provider provides an embedded element such as a window element to the site platform and/or merchant site. As an analogy, in the merchant processing domain for payments, when a consumer pays via Paypal Embedded Checkout or Stripe, the respective processor, Paypal or Stripe, hosts a "mini-page" so no credit card data need be stored, and ensures PCI security compliance on behalf of the platform/merchant without having to have that credit card data pass through the platform/merchant.

Embedded shipping label management is disclosed. Typically, a merchant uses a site platform to build a site such as a web site for physical items for sale to a consumer. One or more buyers may close a sale on the merchant's site and await physical fulfillment. At a fulfillment stage and/or workflow, the merchant reviews all orders awaiting physical fulfillment and begins managing shipping labels for attachment to the physical shipment.

Traditionally, a site platform exposes an application programming interface (API) for a shipping management service provider such as a shipping management service provider server to assist in physical fulfillment, including managing shipping labels. Thus, each site platform and/or merchant is involved in development of logic, workflows, and/or user interface (UI) components comprising observing physical item size information, physical item weight information, physical item packaging, origin/destination address management, customs/tariff information, harmonized commodity description and coding system/harmonized system (HS) coding, Economic Operators Registration and Identification number (EORI number), value added taxes (VAT) information, duties/taxes information, rate prioritization, carrier management, and service level management for physical fulfillment. In this traditional process the site platform and/or merchant expends development and/or runtime computing resources such as processing resources, memory resources, storage resources, and/or network resources, to call these APIs.

Providing an embedded shipping label management element to the site platform or to a merchant site is disclosed. In one embodiment, the embedded element provides one or more services for physical shipping including observing physical item size information, physical item weight information, physical item packaging, origin/destination address management, customs/tariff information, duties/taxes information, rate prioritization, carrier management, and service level management for physical fulfillment. That is, rather than the site platform and/or merchant site directly calling one or more shipping management service provider server APIs for physical fulfillment services by developing logic, workflows, and/or UI components, the shipping management service provider server provides an embedded element such as a window element to the site platform and/or merchant site. This improvement of the embedded element reduces development and/or runtime resources such as computing resources, including processing resources, memory resources, storage resources, and network resources, to efficiently enable secure physical shipping with compliance.

Another improvement is improved compliance. As referred to herein, "compliance" includes any compliance with requirements such as carrier requirements (for example, conforming to carrier logo representation requirement in all user interfaces/user experiences), legal requirements (for example, conforming with the postal service requirement for a written executed agreement to Terms and/or Conditions ("T&C")), customs requirements (for example, filling out forms including HS codes for an international shipment) and/or government/regulatory requirements (for example, first conforming to a requirement not to ship lithium-based batteries in an aircraft, and second conforming to a requirement not to permit e-cigarettes/vapes from being shipped to specific states in the United States.)

One improvement of this improved compliance is that fewer entities, such as the shipping management service provider, are compelled to follow periodic changes in rules/regulatory conditions, so that there is less chance of missing compliance. That is, rather than the site platform and/or merchant site educating themselves on current shipping compliance and developing systems to directly call one or more shipping management service provider server APIs for shipping compliance services by developing logic, workflows, and/or UI components, the site platform and/or merchant site are enabled to rely on the shipping management service provider to provide shipping compliance. In one embodiment, an embeddable shipping label management element merchant may provide customs information for various shipping destination regions in a settings or other configuration.

In one embodiment, the embedded/window element is an iframe HTML (Hyper Text Markup Language) element. The embedded element may be rendered as a modal window, popup modal window, side window, full page, side panel, and/or any other rendered view.

Examples of services provided by the embedded element include:

- Authorization of merchant site, site platform, shipping management service provider server, and/or shipping/fulfillment carrier, including credential/profile management;
- Onboarding and tutorials;
- Launching embedded widget(s);
- Order management, for example by order ID (identifier);
- View order information;
- View/edit shipment information;
- View carriers, service levels, regions, rates;
- Internationalization
- Customs and tariffs;
- Duties;
- Taxes;
- Purchase of shipping label/fulfillment service;
- Download label;
- View invoice;
- Analytics;
- Load/modify/store user shared settings;
- Label format and packaging slips;
- Recent packages and package templates;
- Shipping/fulfillment tracking status;
- Analytics event properties;
- Address management, including address auto complete, default addresses, address validation, address book management, and address error handling;
- Return management authorization including return labels and returns on label purchase;
- Label cancellation;
- Batch orders;
- Order splitting;
- Shipping options;
- Tracking email for buyer;
- Filter and sort rates;
- Order checking; and/or
- Partner analytics.

In one embodiment, the embedded/window element is "grey labeled" which reveals the identity of the shipping management service provider and allows use of a merchant's credentials with the shipping management service provider server. In one embodiment, the embedded/window element is "white labeled" which does not necessarily reveal the identity of the shipping management service provider and does not require an account or credentials with the shipping management service provider server.

In one embodiment, the embedded/window element is web based and/or browser based. In one embodiment, the embedded element is mobile SDK (software development kit) based for mobile apps.

In one embodiment, invoking the embedded element is performed by passing a JSON (Javascript Object Notation) file, JSON blob, and/or other web-based protocol/file. In one embodiment, invoking the embedded element is a front-end client call, rather than a traditional server side/back-end call to the API. That is, the embedded element enables a client such as a user's web browser to interface to/from the shipping management service provider with less or no interface to/from the site platform server, offloading the site platform. In one embodiment, a site platform exposes an order access API to a shipping management service provider, and submits a pointer such as a user and/or order identifier (ID) which the embedded element uses with the order access API to fetch shipment information such as sending/receiving addresses via the site platform. In one embodiment, a site platform transfers to the embedded element shipment information such as sending/receiving addresses directly within a JSON blob or other web-based protocol/file. In one embodiment, the embedded element is hosted on the shipping management service provider server domain.

There are at least three improvements that an embedded element has over a back-end API call. A first improvement is that it reduces development and maintenance effort, including reducing memory, network, and processor resources needed for development and maintenance, for a site platform and/or merchant to integrate shipping and/or fulfillment to their site.

A second improvement is improved compliance. Carriers such as the USPS, UPS, FedEx, and DHL may have annual compliance requirements to ensure proper security authentication or add information fields, to comply with changing government requirements. With a commonly used embedded element, the shipping management service provider may update compliance with a plurality of merchants with a single effort, reducing memory, storage, network, and processor resources needed for compliance effort, as there is no duplication of compliance effort and reduced error between merchants.

A third improvement is an improved merchant/customer experience. A shipping management service provider is focused on a simple and efficient way for users/merchants to process a queue of orders for shipping and/or fulfillment. A site platform or merchant may not have the same level of expertise and experience for shipping and/or fulfillment. An improved merchant/customer experience reduces the amount of time a merchant spends in fulfillment, reducing memory, network, and processor resources for the merchant to process orders, and reduces the errors a merchant makes in fulfillment.

In one embodiment, an embedded element is an embedded component with multiple parts. A first part is the actual component with UIs, buttons, widgets, and interactions, for example a description of what happens in the event a widget is asserted. A second part is a bundle such as a JavaScript bundle that communicates between a site interface and a shipping management service provider server interface, enabling continuity between when a merchant asserts a widget to invoke a workflow/logic, how it is rendered, any communication between site and shipping management service provider, and describing when the action is complete such as printing a label. A third part of the component is how to communicate back to a shipping management service provider APIs. Thus, the parts may include a user interface, the communication protocol with the site, the site interface, the shipping management service provider interface, and/or the communication protocol between site and shipping management service provider.

In one embodiment, the embedded element manages an interface back to the site and/or site platform. For example, a buyer may have ordered a plurality of items that a merchant does not fully physically stock. The merchant may use the embedded element to split an order, generate a label for the physical stocked item. The embedded element may return to the site to describe the split order including describing the new/different order IDs, reporting partial fulfilment, and describing which order IDs were fulfilled and not fulfilled.

Embeddable shipping label management element. In one embodiment, the embeddable shipping label management element permits a site platform to more easily enable shipping into their site with improved efficiencies in required time, required resources, and/or required expertise needed over using shipping management service provider APIs. In one sense, the embeddable shipping label management element extends a shipping management service provider API to offer an improved faster/easier way to integrate shipping directly into a site platform. The embeddable shipping label management element provides a "packaged UI" for physical shipping fulfillment, and examples of site platforms include: P2P (peer to peer) marketplaces such as eBay, Etsy, and Whatnot; eCommerce sites; 3PL (third party logistics) to process high volume and/or batching; xMS (WMS/warehouse management systems, TMS/transportation management systems); and/or any site requiring a plug-and-play solution with improved maintenance and/or zero-maintenance.

In one embodiment, each embeddable shipping label management element may function on its own as a stand alone workflow. In one embodiment, the embeddable shipping label management element is modular to enable easy partner integration, easy merchant onboarding, with customization enabled to preserve established workflows and UI/user experience. A site platform may customize styling, carrier settings, eligibility, and so on. In one embodiment, styling elements include: Container (fill color, corner radius); Header (background color, font color, show/hide drop shadow, title text alignment); Footer (fill color, show/hide drop shadow); Buttons (CTA (call-to-action) fill color, CTA font color, CTA corner radius, Text casing); Cards (fill color, corner radius, border/stroke color, line (dividers) color, selection highlight color); Input Fields (border/stroke color); Fonts (font family); Scroll bar (Color, Corner radius); and/or global menu styling and links, such as: customization such as moving the Help and Terms links from the footer into the global menu; changing the vertical menu icon/kebob replaced by a horizontal menu icon/hamburger; enabling a menu with or without a header label; and/or customizable text styling in the menu.

The embeddable shipping label management element is designed to be a "shared source of truth" so that by repairing, debugging, patching, and/or updating the embeddable shipping label management element synchronizes for all site platforms and/or merchants simultaneously, with the improvement of eliminating duplication in effort and eliminating errors in translating a change to different site platforms/merchants when an API is changed.

Carrier Integration. In one embodiment, the shipping management service provider, site platform and/or merchants together or separately determine carrier configuration and rates displayed. Preferences may be hierarchical, for example the shipping management service provider configuration may take preference over a site platform configuration which may take preference over a merchant configuration.

In one embodiment, when a shipping management service provider and/or site platform updates a configuration, it may occur on the next session/instantiation of the embeddable shipping label management element. Users within a session may not see a change until their active session ends and they return the next time. In one embodiment, site platforms may enable/disable: carriers offered to users/merchants; carrier service levels; carrier supported regions (for example domestic, international, country to country.) In one embodiment, an embeddable shipping label management element user and/or merchant may enable/disable a carrier and/or carrier service labels.

In one embodiment, in order to determine eligibility to request rates: a merchant should be eligible for the site platform configured carriers, for example by completed onboarding and/or T&C; shipment information should be complete and valid; and/or origin/destination addresses should match a selected carrier's offerings (for example a regional carrier may need both origin and destination to be within their region). In one embodiment, while determining relevant rates, before rates are shown to the merchant a site platform blacklist is respected by disabling carriers, service levels, and/or regions on the blacklist. For embeddable shipping label management element merchants/users who have or will use a shipping management service provider site and/or web app, carrier configurations there may be reflected in the embeddable shipping label management element. For each carrier, determination includes: an account type (such as a master account for a shipping management service provider to obtain volume discounts/custom rates and/or a master site platform account to obtain volume discounts/custom rates); onboarding needs such as T&C; service levels; regions including domestic and international; and/or carrier packaging. Custom rates above may include an incentive rate that benefits the shipping management service provider and/or site platform with a sharing margin that still reduces costs for the merchant while adding revenue for the shipping management service provider and/or site platform. This sharing margin may be computed dynamically when calling a carrier API to get the baseline rate and then computing/adding the margin to provide a rates API call with the adjusted rate including sharing margin.

Event Listener. In one embodiment, a shipping management service provider and/or server may communicate back to the partner platform any events that occur within the element as an improvement able to provide a seamless experience for the end merchant, reducing development computing, memory, and network resources for the merchant and/or platform. In one embodiment, when a merchant purchases a label in the embedded element, the shipping management service provider and/or server sends an event to the merchant's client that the merchant may respond to. In one embodiment, the shipping management service provider and/or server is able to send backend API responses between systems to do the same as a server-to-server integration.

In one embodiment, a common event is after a merchant has printed out a label, the shipping management service provider marks fulfillment as complete. Details such as the fact the fulfillment is done/complete, which carrier was used, estimate time of shipment arrival, a tracking number, compliance information, and/or label charge may be sent as part of the event sent from the embeddable shipping label management element/client side. This is an improvement over traditional methods of sending a round trip API from shipping management service provider server to site platform server and then to a client, as it reduces network resources and latency/time required, and increase reliability. In one embodiment, the client side/embeddable shipping label management element is configured to send an API call with event information directly to the site platform server instead, in part to update parts of the site platform UI, with for example information on which carrier was used for the order.

FIG. 1 is a functional diagram illustrating a programmed computer/server system for facilitating an embeddable shipping label management element in accordance with some embodiments. As shown, FIG. 1 provides a functional diagram of a general-purpose computer system programmed to facilitating an embeddable shipping label management element in accordance with some embodiments. As will be apparent, other computer system architectures and configurations can be used for facilitating an embeddable shipping label management element.

Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display and graphics processing unit (GPU) 118.

Processor 102 is coupled bi-directionally with memory 110, which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data, and objects used by the processor 102 to perform its functions, for example, programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown. The processor 102 may also include a coprocessor (not shown) as a supplemental processing component to aid the processor and/or memory 110.

A removable mass storage device 112 provides additional data storage capacity for the computer system 100, and is coupled either bi-directionally (read/write) or uni-directionally (read-only) to processor 102. For example, storage 112 can also include computer-readable media such as flash memory, portable mass storage devices, holographic storage devices, magnetic devices, magneto-optical devices, optical devices, and other storage devices. A fixed mass storage 120 can also, for example, provide additional data storage capacity. One example of mass storage 120 is an eMMC or microSD device. In one embodiment, mass storage 120 is a solid-state drive connected by a bus 114. Mass storages 112, 120 generally store additional programming instructions, data, and the like that typically are not in active use by the processor 102. It will be appreciated that the information retained within mass storages 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a communication interface 116, a touch (or physical) keyboard 104, and one or more auxiliary input/output devices 106 including an audio interface, a sound card, microphone, audio port, audio input device, audio card, speakers, a touch (or pointing) device, and/or other subsystems as needed. Besides a touch screen, the auxiliary device 106 can be a mouse, stylus, track ball, or tablet, and is useful for interacting with a graphical user interface.

The communication interface 116 allows processor 102 to be coupled to another computer, computer network, or telecommunications network using a network connection as shown. For example, through the communication interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification, "network" refers to any interconnection between computer components including the Internet, Bluetooth, WiFi, 3G, 4G, 4GLTE, GSM, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous and/or heterogeneous systems and/or groups of systems together. Additional mass storage devices, not shown, can also be connected to processor 102 through communication interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer/server system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

FIGS. 2A-2H are screenshots illustrating an embodiment of an overview of a workflow using an embeddable shipping label management element. In one embodiment, the system of FIG. 1 is used to facilitate the embeddable shipping label management element.

Figure 2A:
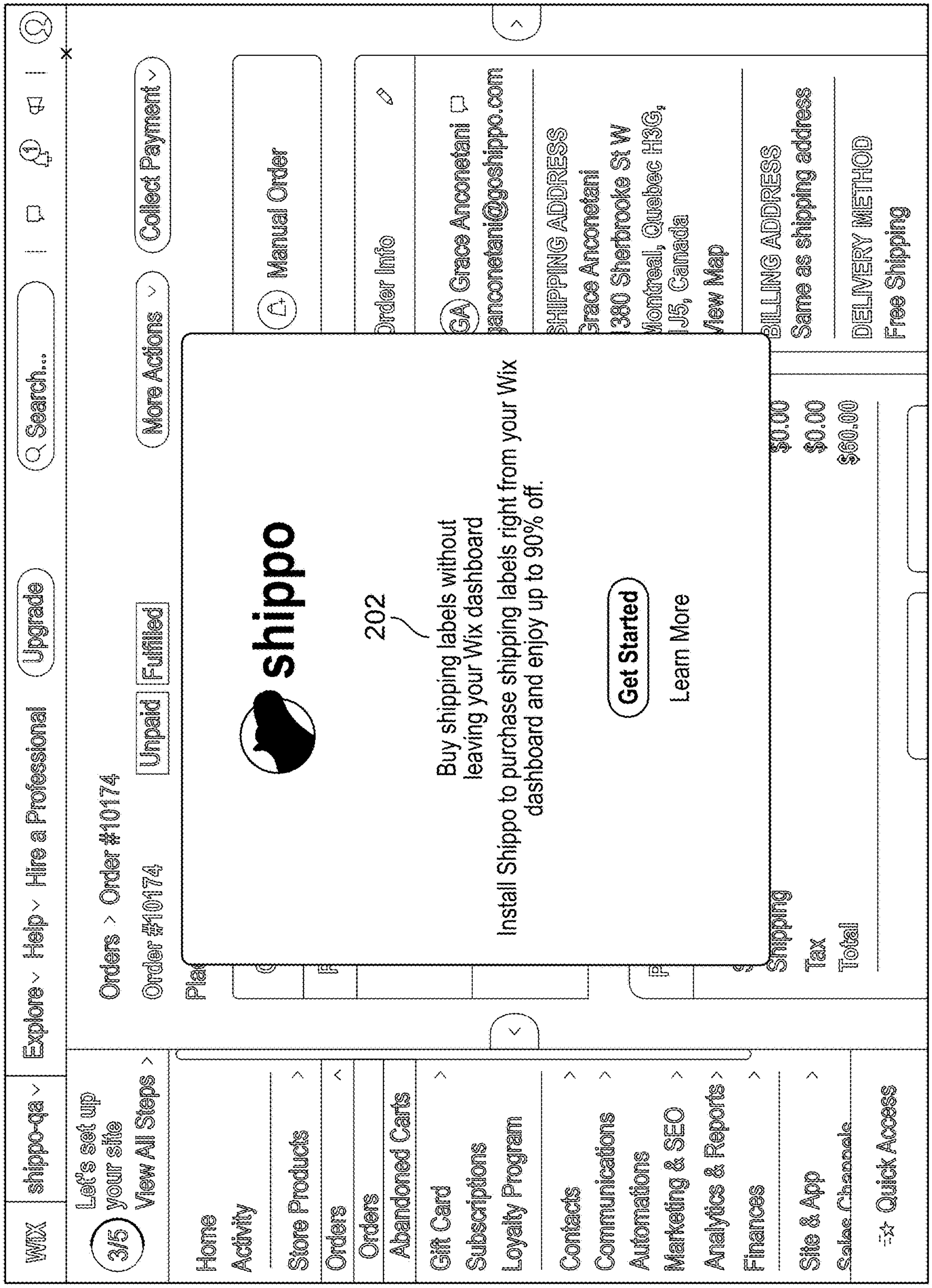
FIGS. 2A-2H are screenshots illustrating an embodiment of an overview of a workflow using an embeddable shipping label management element.
Figure 2B:
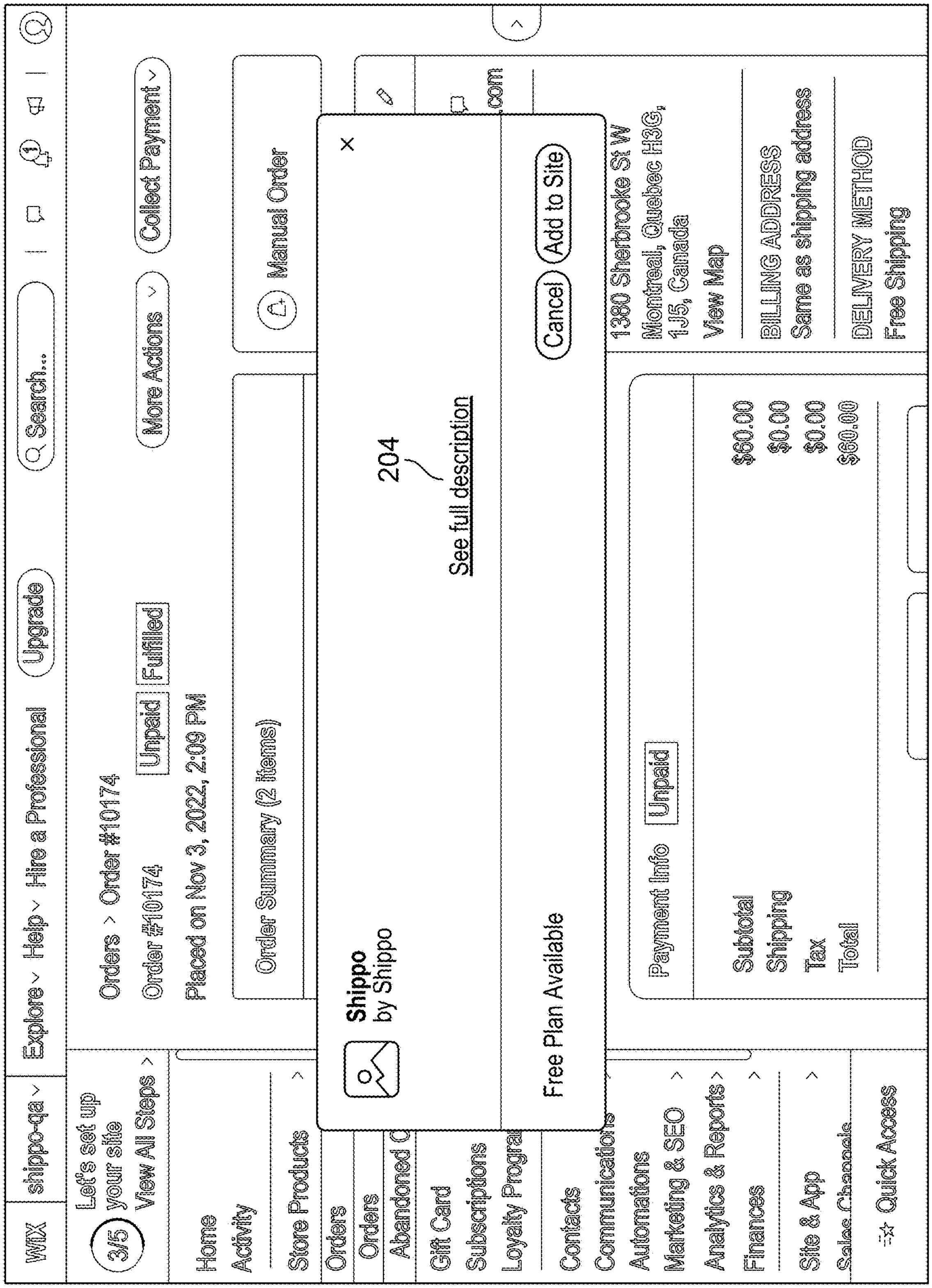
Figure 2C:
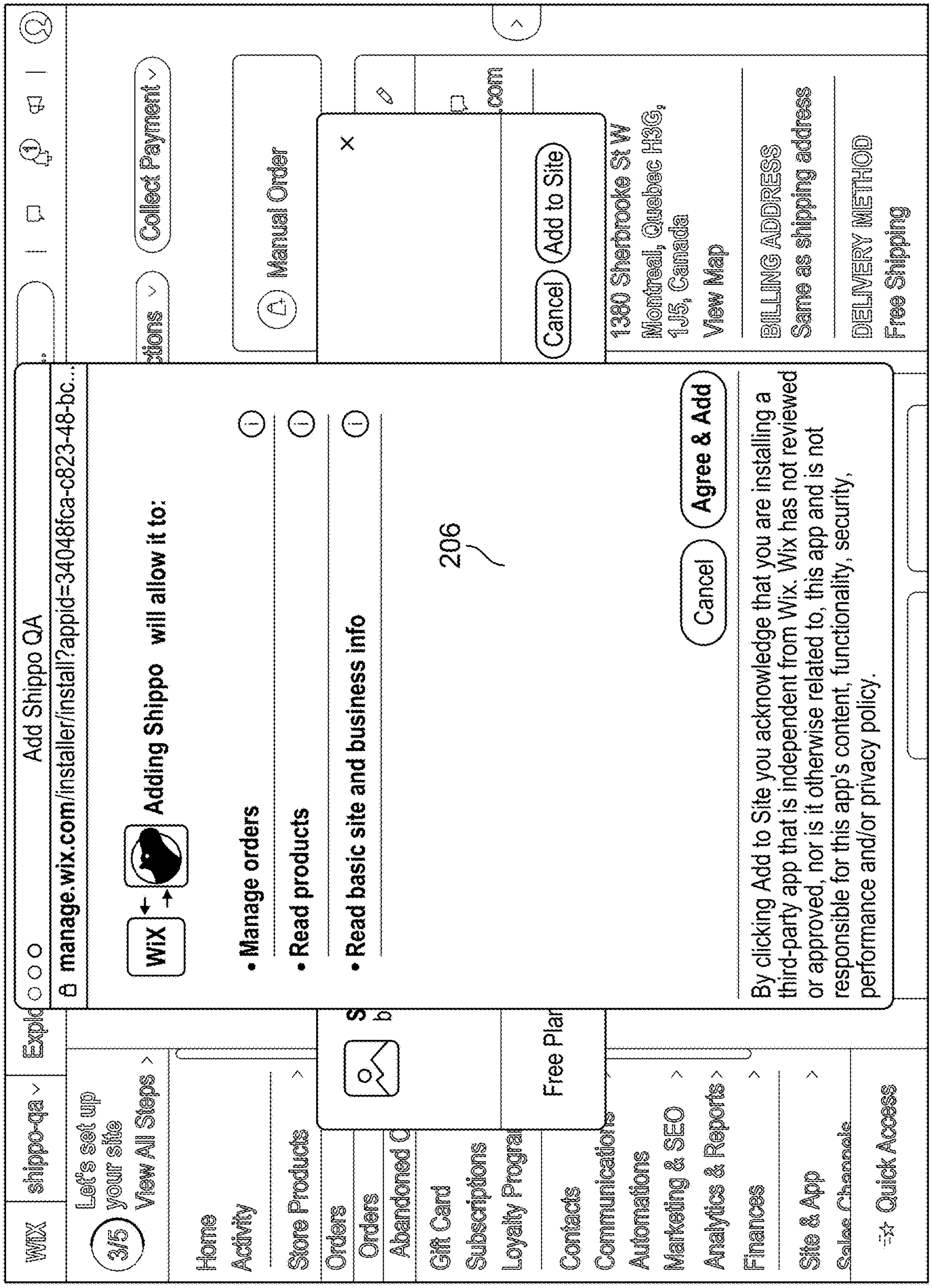
Figure 2D:
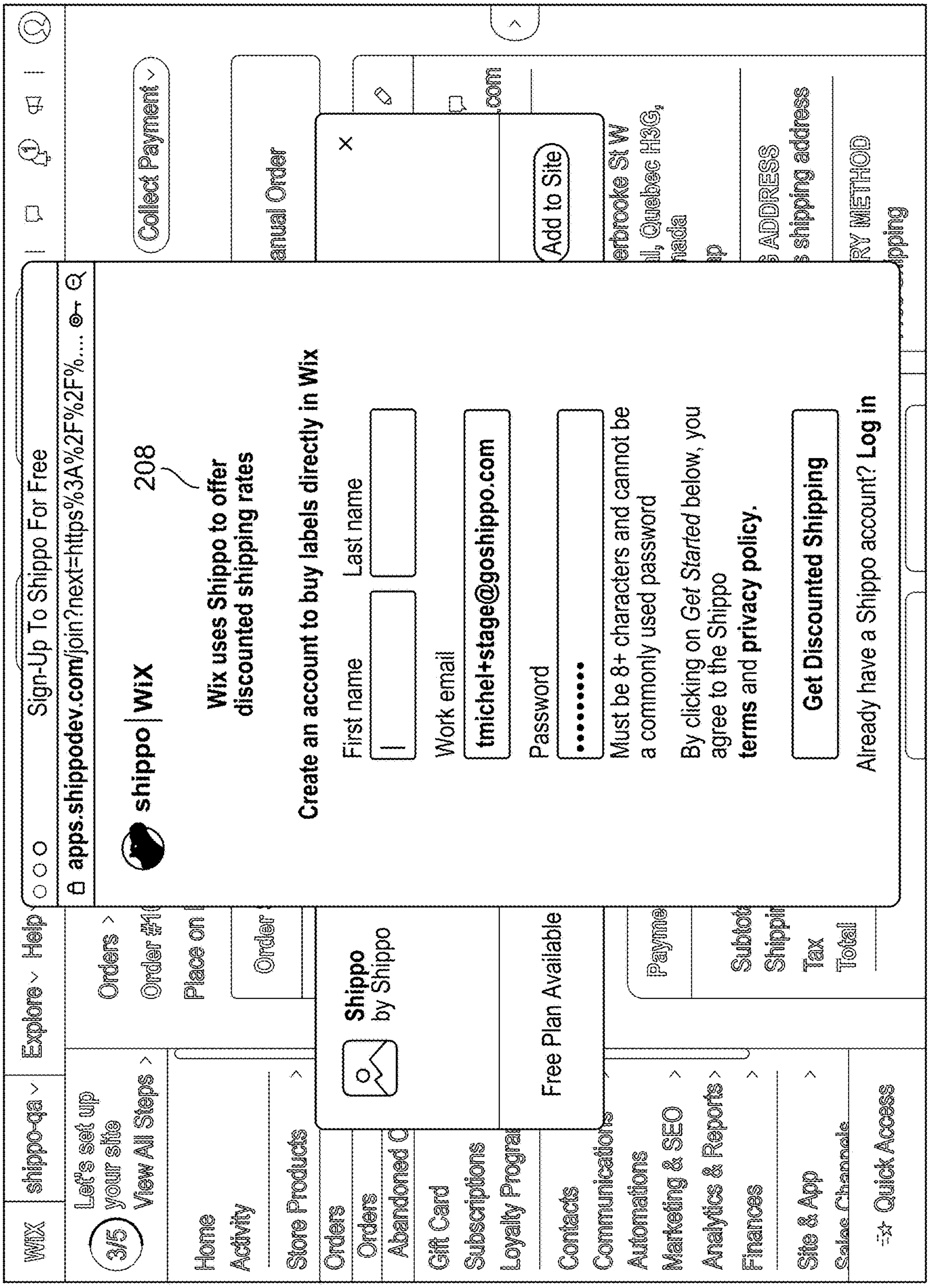

In the examples of FIGS. 2A-2H, Wix is a site platform and Shippo is a shipping management service provider. In the examples of FIGS. 2A-2D a user of an embeddable shipping label management element is onboarded. In FIG. 2A a typical user of Wix is a merchant with one or more orders for a physical item. To fulfil orders, typically shipment of a physical item is required. In FIG. 2A, a web page element (202), such as a modal window, is used to onboard a user in part to install the embeddable shipping label management element framework from the shipping management service provider. In FIG. 2B, the onboarding of the user/merchant continues by confirming that the embeddable shipping label management element is to be added to the site via a web page element (204), such as a modal window. In FIG. 2C, the onboarding of the user/merchant continues by resolving permissions, notifications, and/or agreements for the embeddable shipping label management element on the site platform via a web page element (206), such as a modal window. In FIG. 2D, the onboarding of the user/merchant continues by establishing or linking a shipping management service provider credential to the site platform user/merchant credential via a web page element (208), such as a modal window.

Figure 2E:
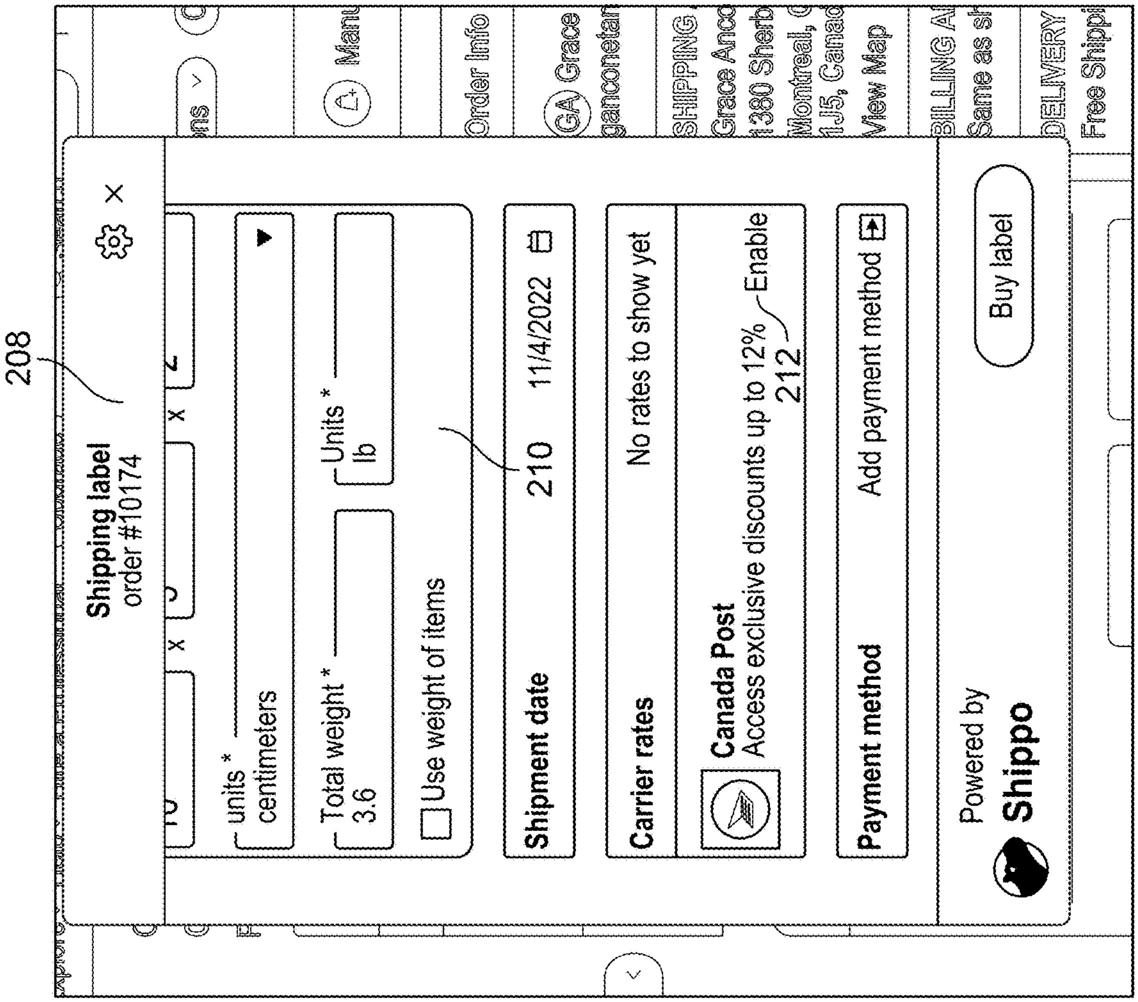

In the examples of FIGS. 2E-2H the user uses the embeddable shipping label management element. In FIG. 2E, for a given order, in this example Order #10174, for a user on the site platform, the user brings up the embeddable shipping label management element (208) and enters and/or confirms 'hydrated' or prefilled shipping data (210) such as boxed item dimensions and weight, destination address, origin address, and/or shipment date. The shipping management service provider may use the embeddable shipping label management element (208) to show available carriers given the shipping data (210) to allow enablement (212) and/or confirm a request for rates.

Figure 2F:
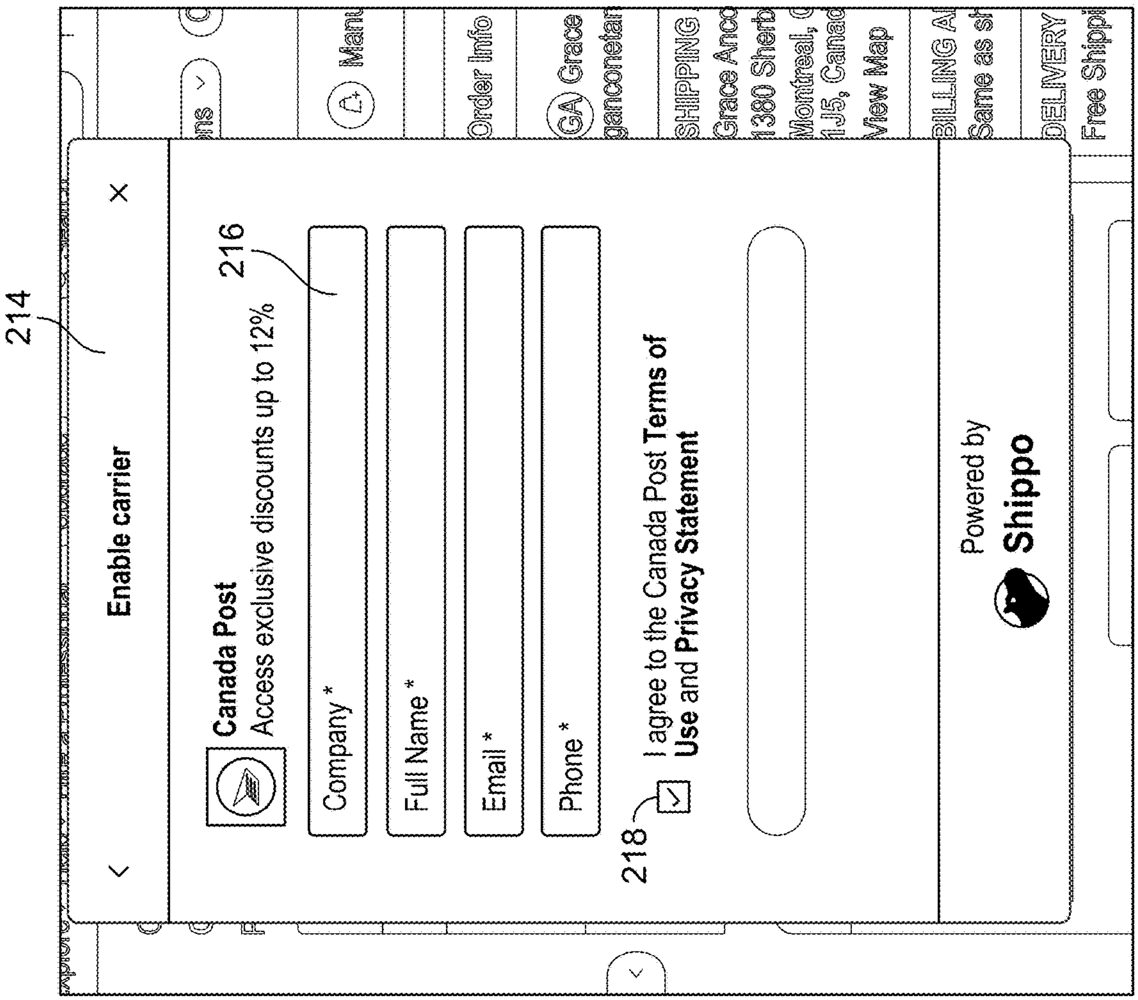
Figure 2G:
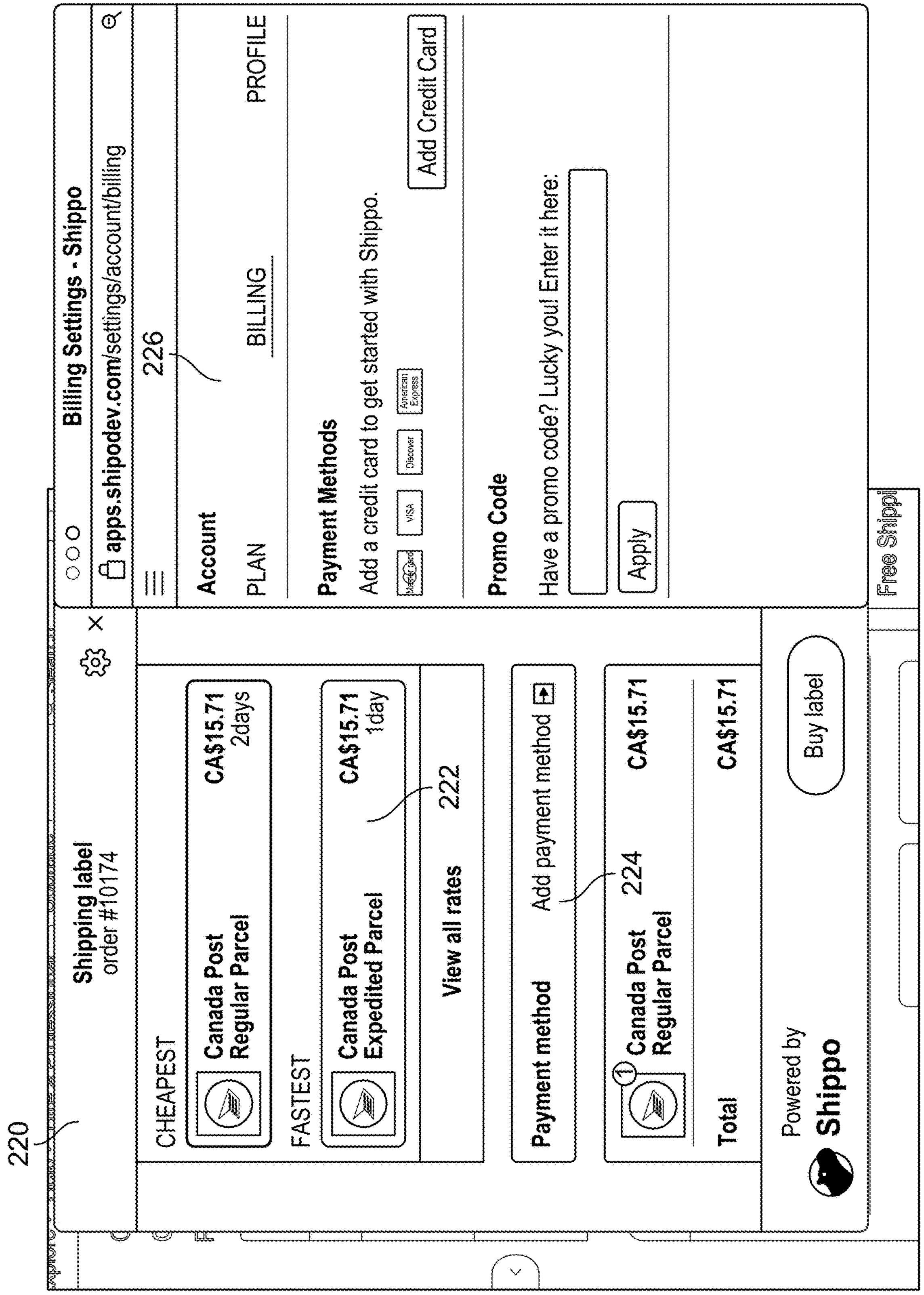
Figure 2H:
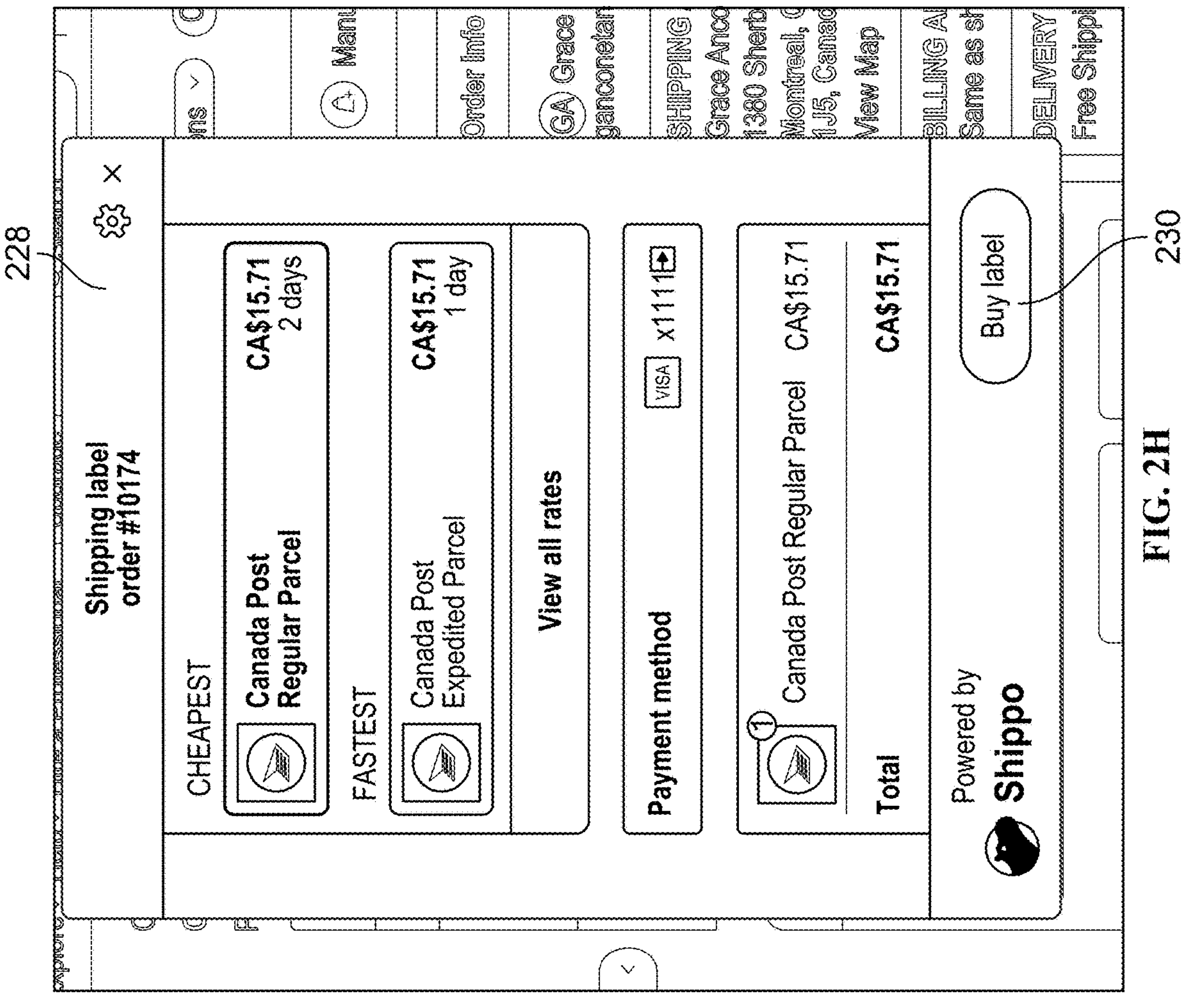

In FIG. 2F, a carrier is enabled for the first time for a user using a web page element (214), for example a modal window, which may be part of the embeddable shipping management element. This includes entry of identity such as company name, personal name, email, and phone number (216) as well as compliance to regulations such as providing the terms of use, T&C, privacy statement, and binding execution to such agreements (218). In FIG. 2G, an enabled carrier may be used to facilitate a shipping label via a web page element (220) such as a modal window, which may be part of the embeddable shipping management element. This includes a review and/or selection of available rates (222) as well as a payment method (224), which may include another web page element (226) or be established within the embeddable shipping label management element (220). In FIG. 2H, an enabled carrier with selected rate may be displayed in a web page element (228), for example a modal window, which may be part of the embeddable shipping management element. A label may then be purchased (230) and/or displayed/printed.

FIGS. 3A-3K are screenshots illustrating an embodiment of a more detailed workflow using an embeddable shipping label management element including an account setup and a label purchase. In one embodiment, the system of FIG. 1 is used to facilitate the embeddable shipping label management element.

Figure 3B:
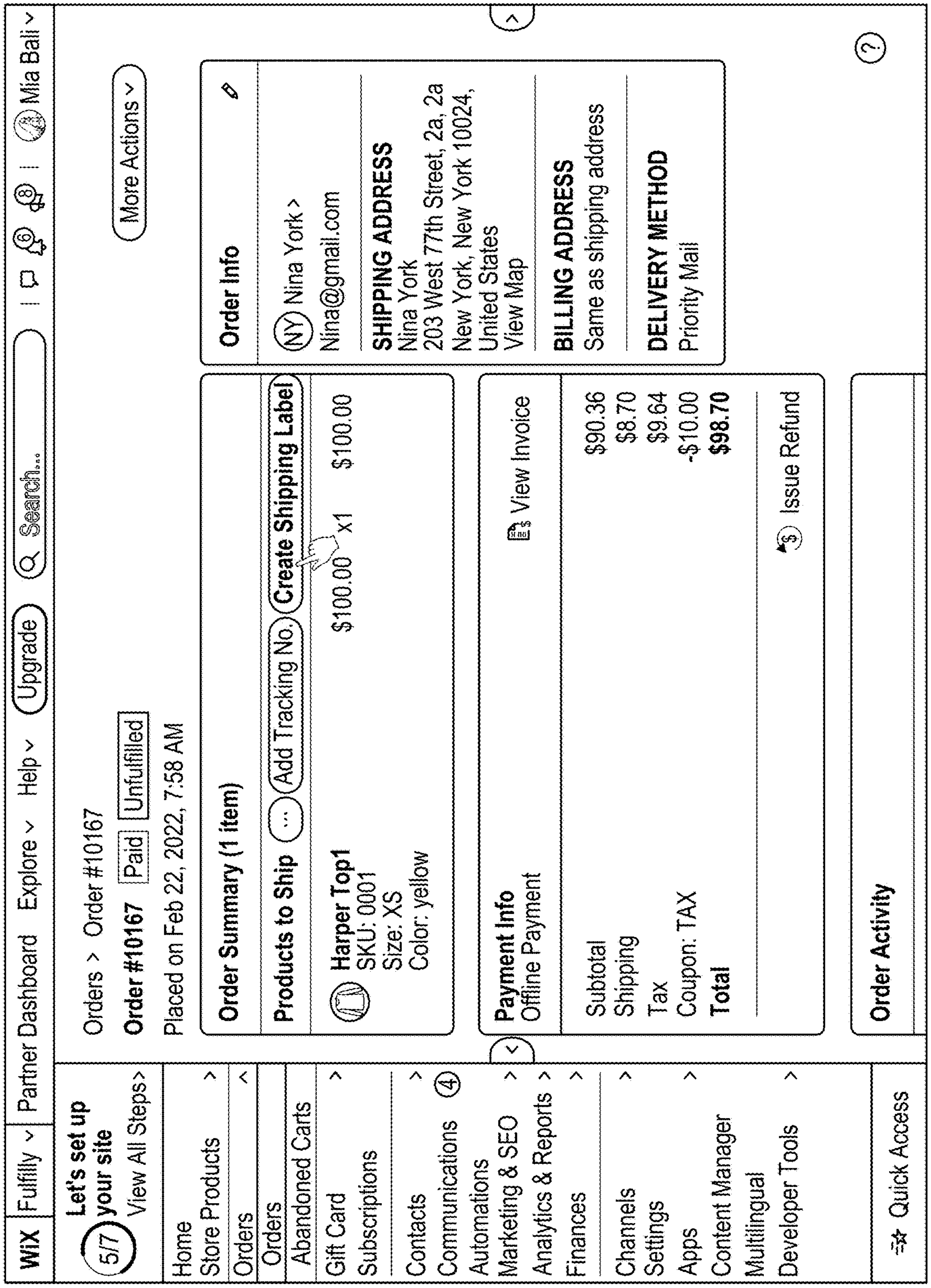

In the example of FIG. 3A, a merchant/user with an account on a site platform such as Wix has orders for goods requiring physical shipment, including an Order #10167. In FIG. 3B, the user selects Order #10167 and may assert a "Create Shipping Label" element to create a physical shipping label for physical goods. As referred to herein, a "shipping label" is a form of a physical contract/agreement between carrier (and intermediaries) and merchant (and intermediaries) that includes at least one of: a description of the physical goods, a level of service for the shipment, a physical address for origination and destination, and an estimated time of arrival.

Figure 3C:
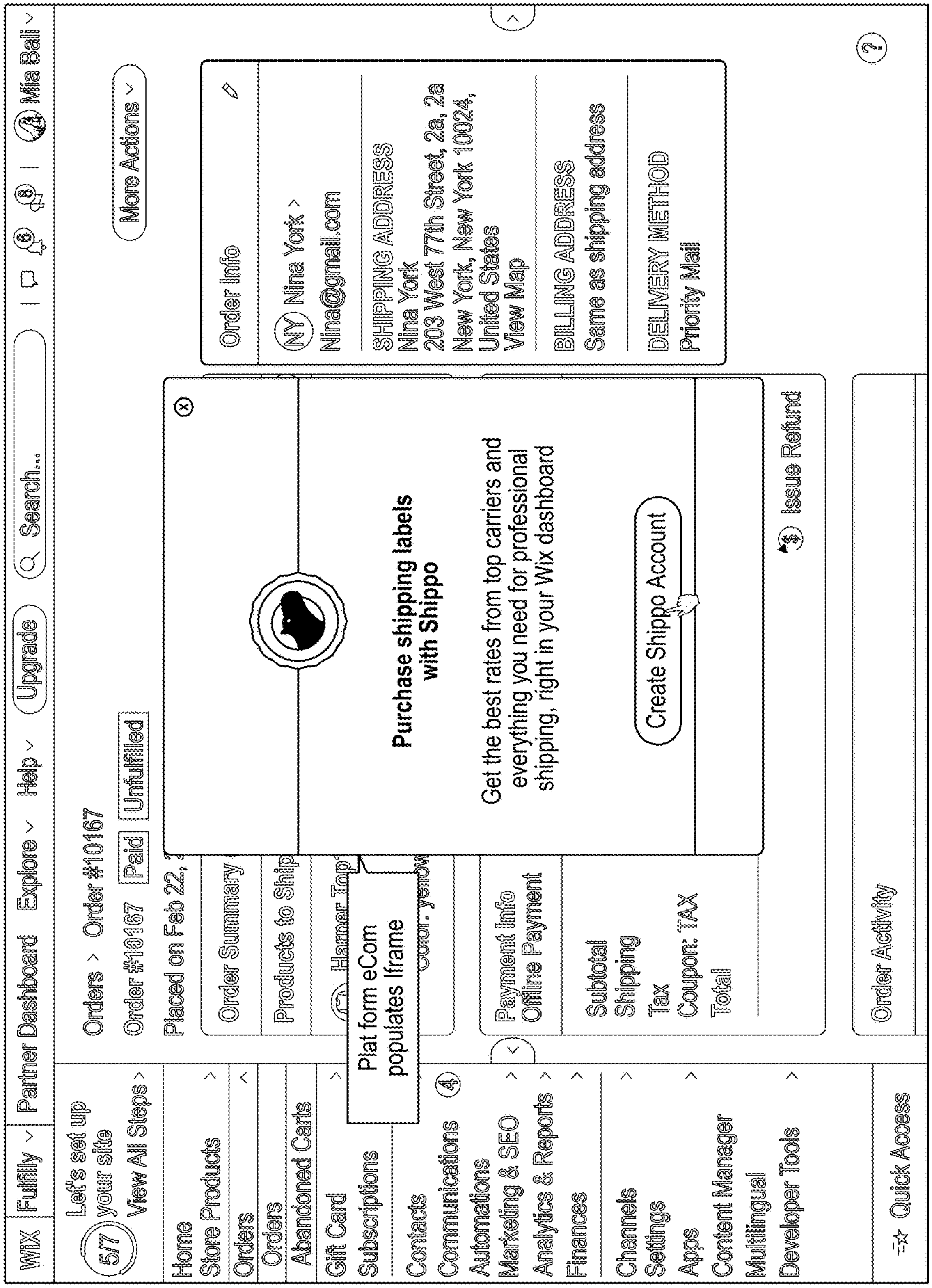
Figure 3D:
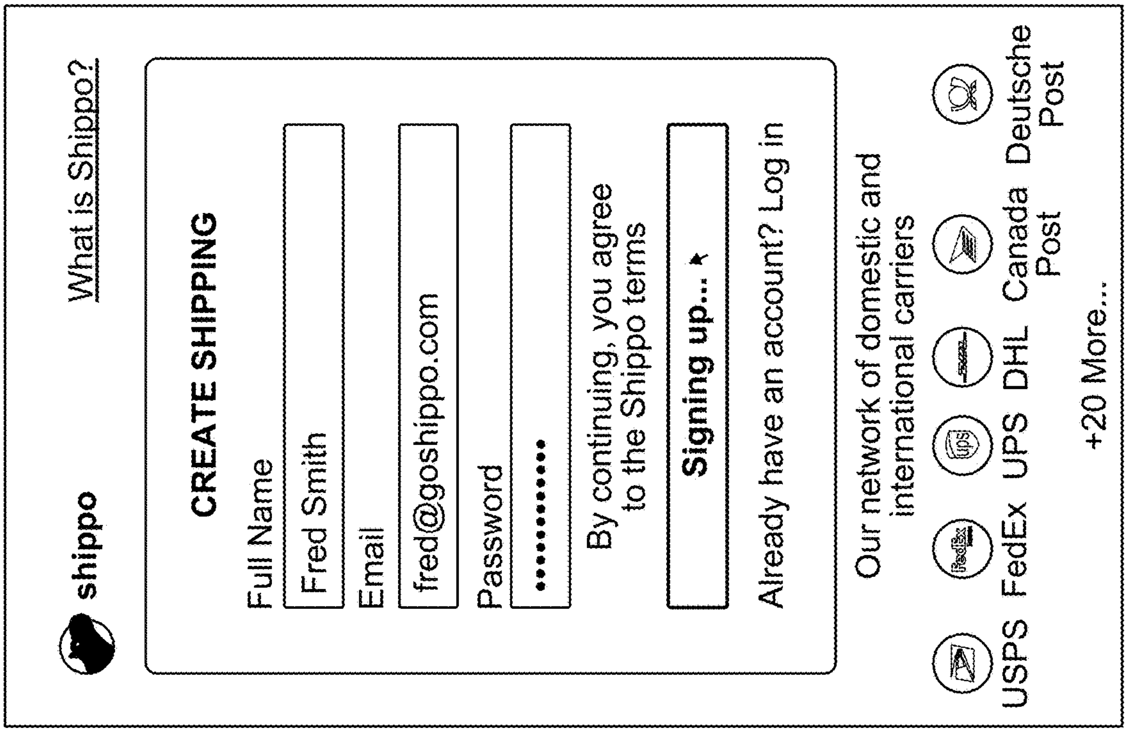
Figure 3E:
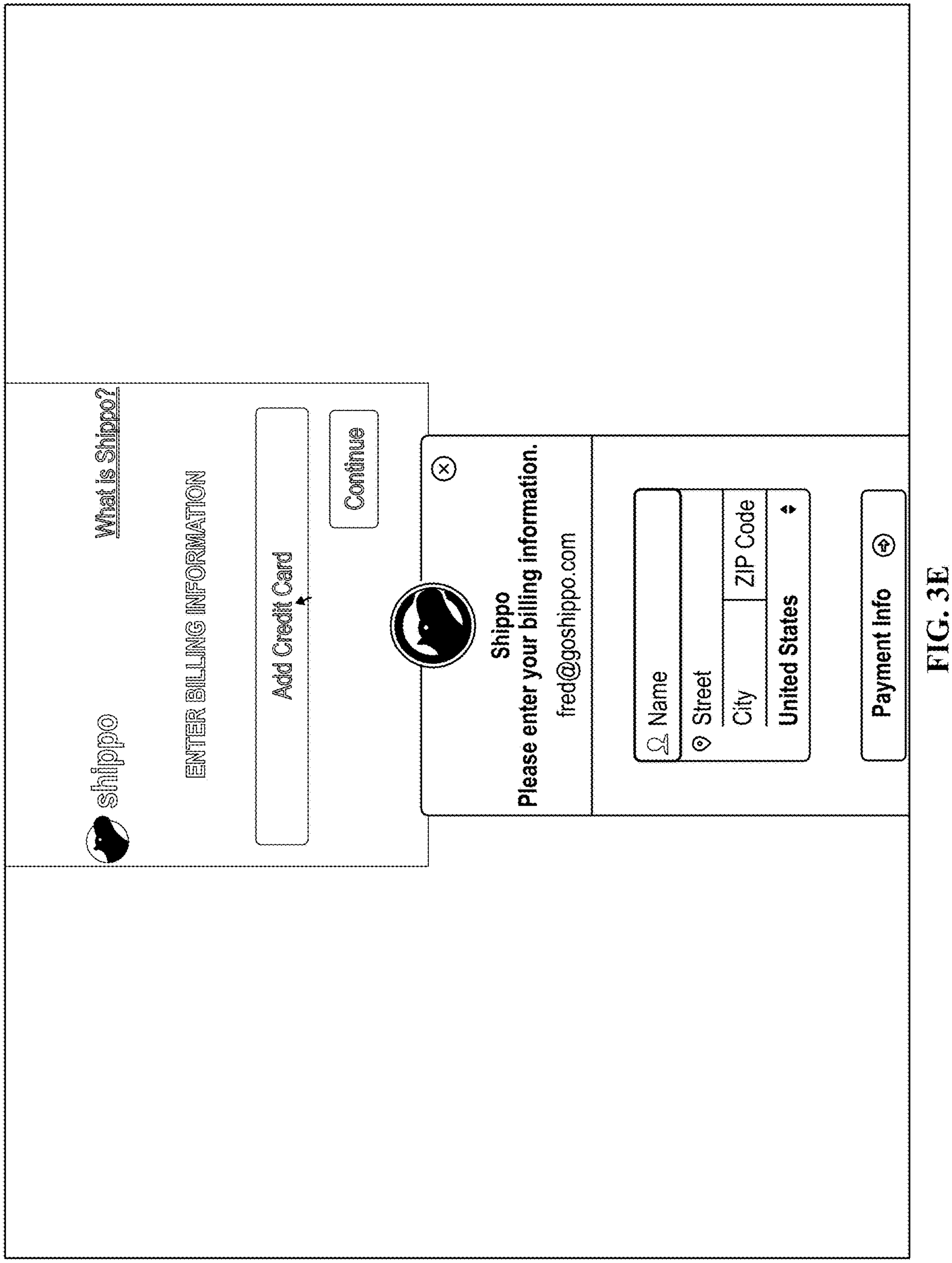
Figure 3F:
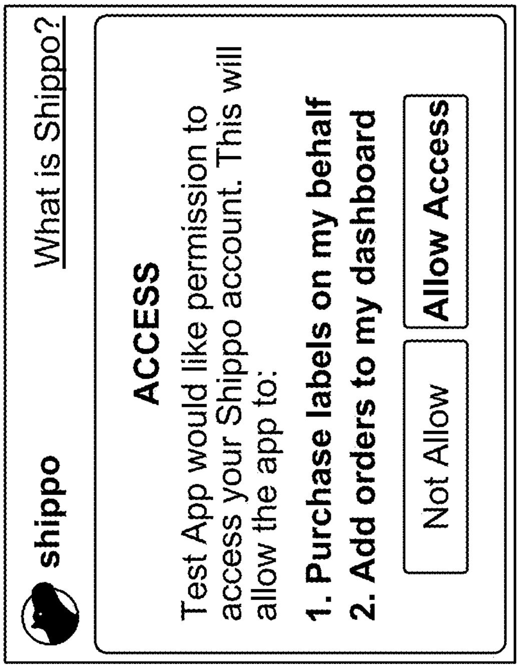

In FIG. 3C, the site platform may present one or more options for creation of a shipping label, for example using an iframe, embeddable element, interstitial, and/or modal window that directs them towards a shipping management service provider via the embeddable shipping label management element. In FIG. 3D, an account for the merchant/user associated with the shipping management service provider is established and/or maintained, including, as shown in FIG. 3E, billing/financial information and, as shown in FIG. 3F, permissions, compliance, and/or regulations to confirm.

Figure 3G:
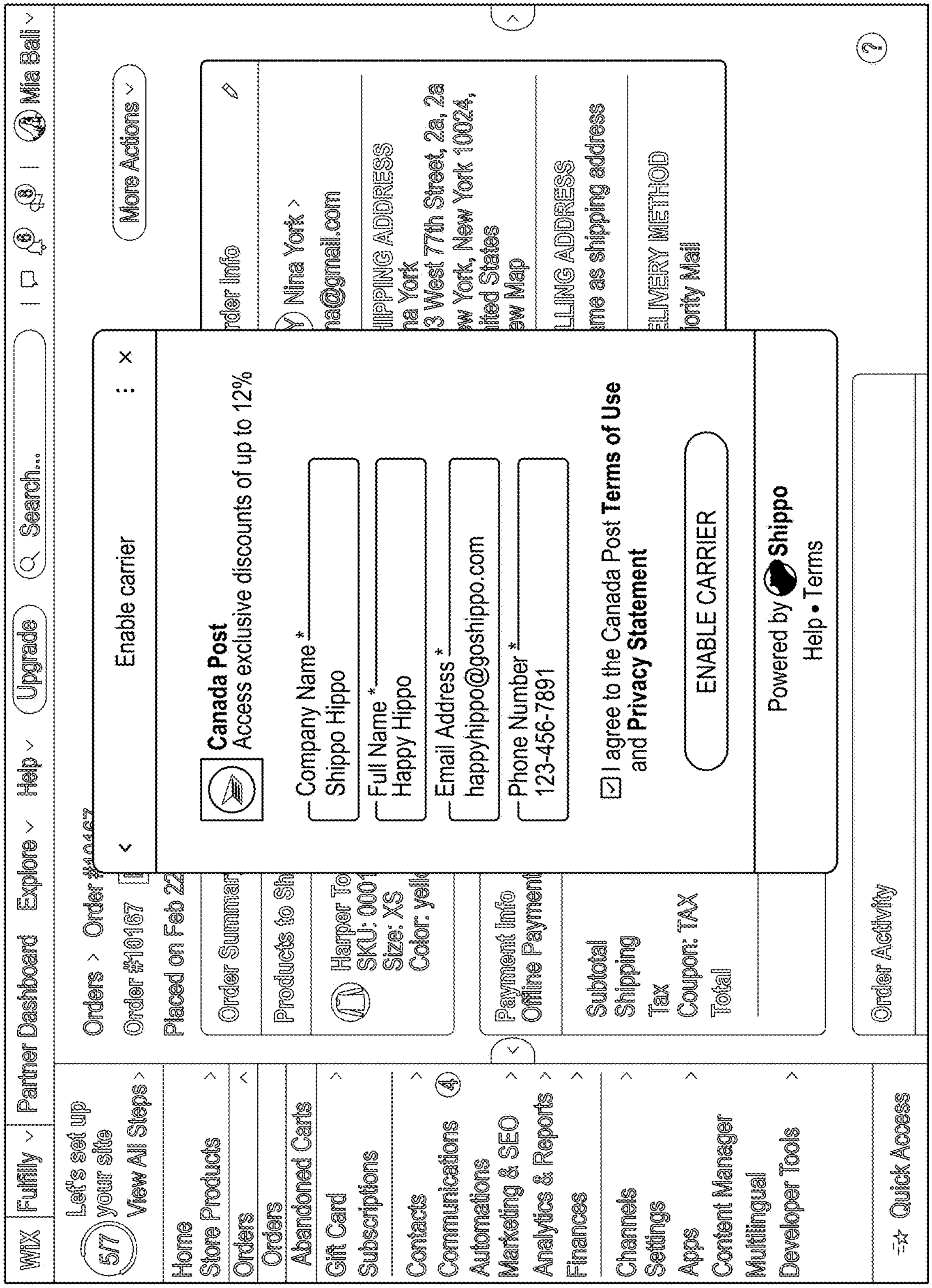

In FIG. 3G, an account for the merchant/user associated with a shipping carrier is established and/or maintained, including permissions, compliance, and/or regulations to review and execute. For example, in FIG. 3G, a "Terms of Use" or T&C and "Privacy Statement" are available for review and agreement. Billing information for the merchant/user may be established/maintained directly to the shipping carrier or may be established through the shipping management service provider, depending in part on volume discounts, past shipping history, credit rating, and so on.

Figure 3H:
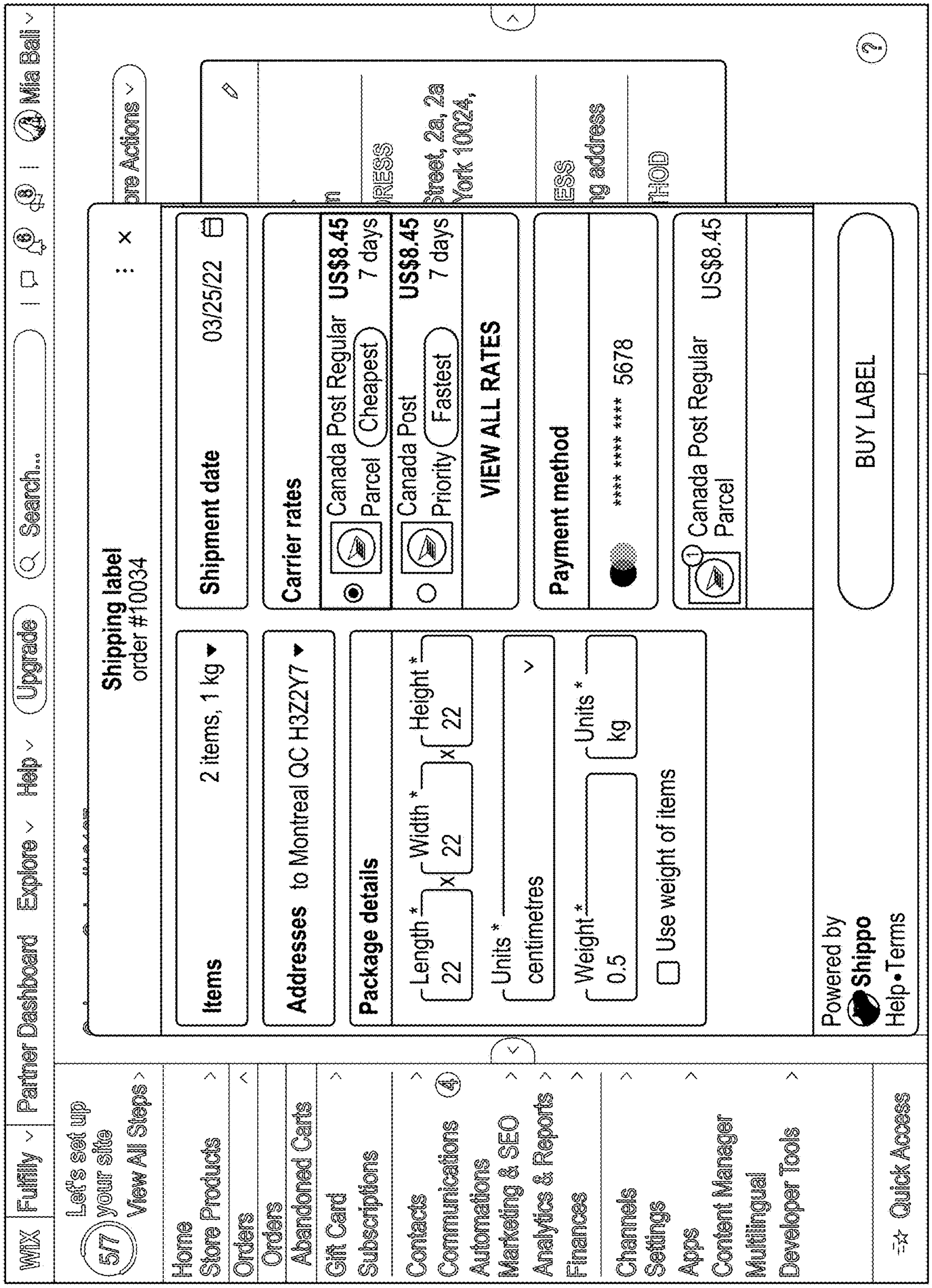

In FIG. 3H, focus of the embeddable shipping label management element returns to Order #10167, now that a relationship and/or account has been established between merchant/user and shipping management service provider, and one or more shipping carriers. As shown in FIG. 3H, a prospective shipping label is available for review using a shipping carrier, wherein the merchant/user may select one or more carrier rates based on costs and service level provided. Information for number of items, type of item, origination address, destination address, length, width, height, weight, and shipment date may be "prehydrated", meaning prefilled, from a site platform database. The site platform database for Order #10167 may have this data from a physical goods database as part of a shopping cart and/or eCommerce system on the site platform, and may also have data such as address that was entered by a customer of the order.

Figure 3I:
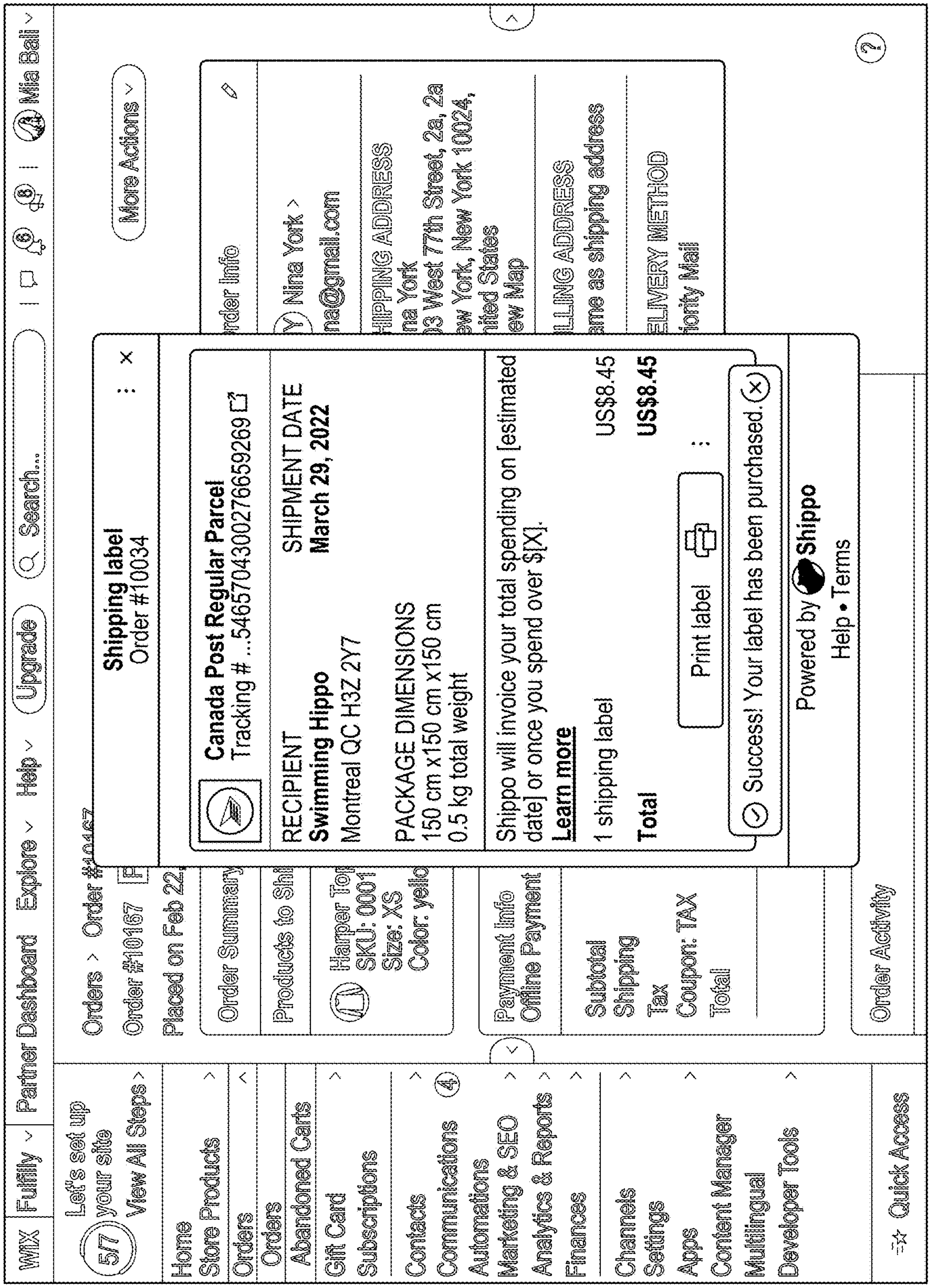
Figure 3J:
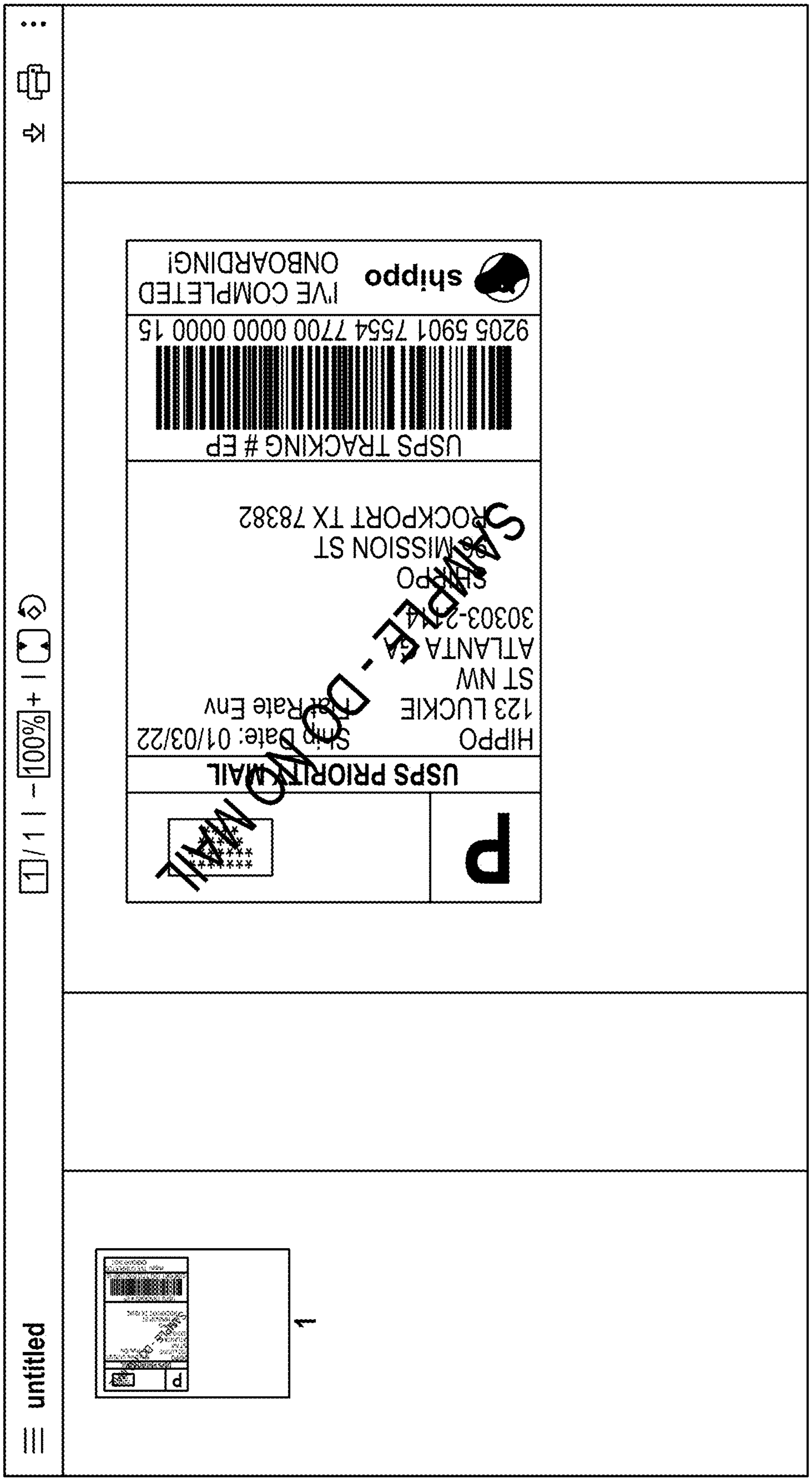
Figure 3K:
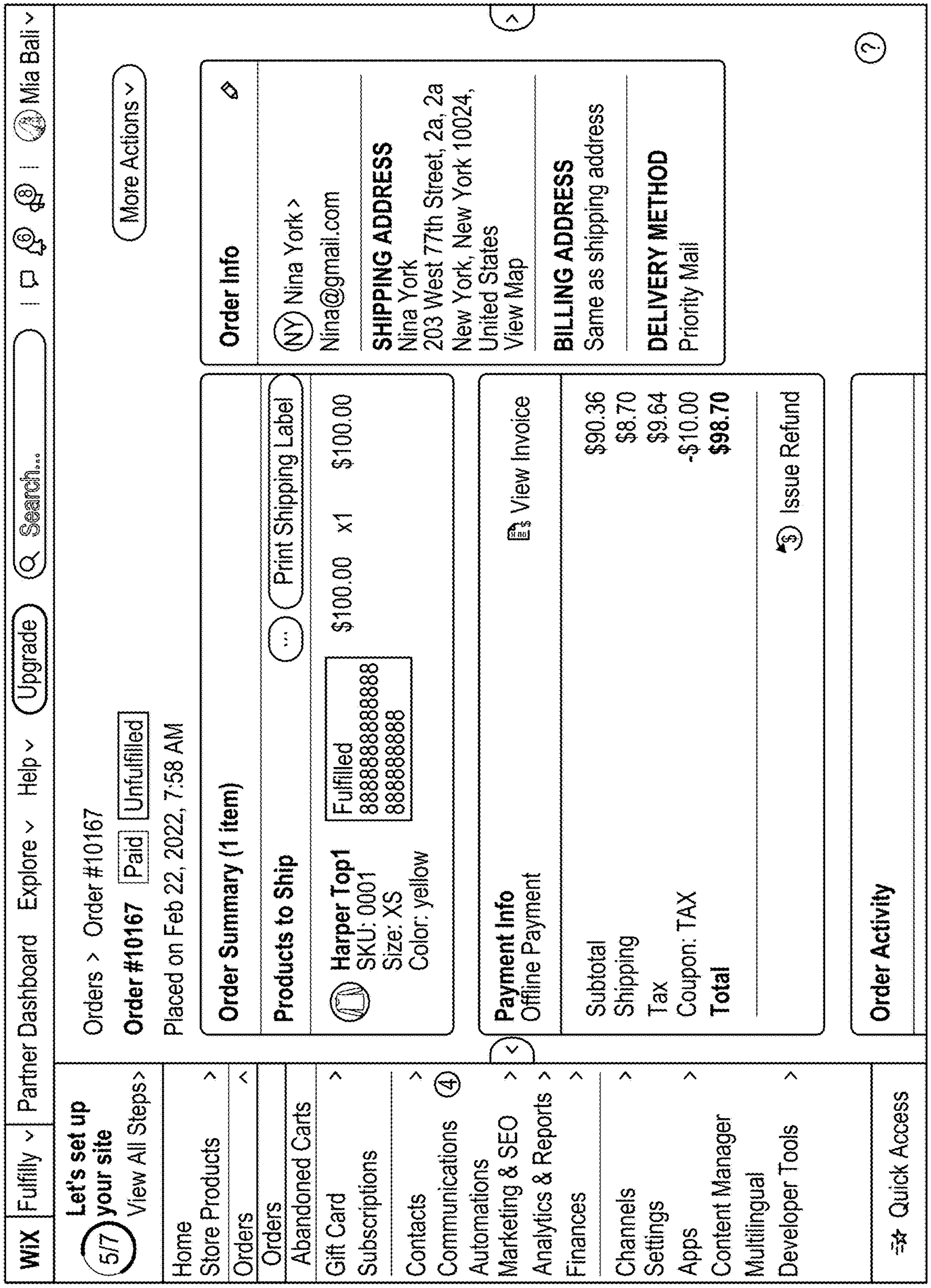

After the merchant/user manually selects options and/or has an automated segment to select options, for example using a bulk shipping module to select carrier rates is a semi-automated or fully automated way, a shipping label may be purchased as shown in FIG. 3I, where in this example a Canada Post Regular Parcel carrier rate is purchased. By asserting a "Print Label" element, a rendering of the physical print label is shown in FIG. 3J to be manifested physically and affixed to physical goods being shipped. In FIG. 3K, after the physical shipping label has been printed, the site platform is updated with a "Fulfilled" flag, and in some cases a shipping label tracking number is provided on the site platform to show Order #10167 has been completely fulfilled for shipping.

Figure 4:
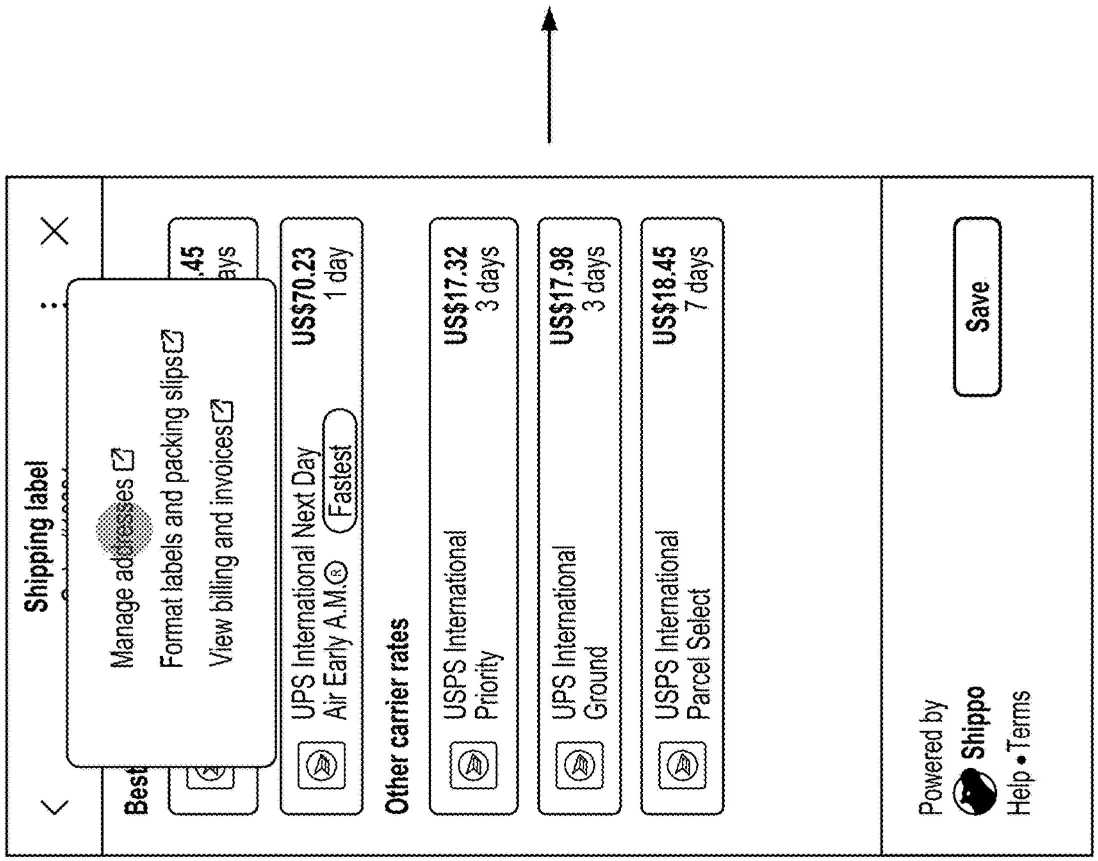

FIG. 4 is a screenshot illustrating an embodiment of shipping label settings using an embeddable shipping label management element. In one embodiment, the system of FIG. 1 is used to facilitate the embeddable shipping label management element.

As shown in FIG. 4, the embeddable shipping label management element may include settings to manage addresses, for example the default origination address, default return address, format labels and packing slips, for example for a given label printer, and view billing and invoices, for example from a particular shipping carrier and/or all shipping carriers. Review and/or changing settings may take place within the embeddable shipping label management element and/or on a separate site such as the shipping management service provider site as shown in FIG. 4.

In one embodiment, merchant settings may be stored on the shipping management service provider's side. Settings may include ones not shown in FIG. 4, such as:

Carriers;
Parcel Templates;
Addresses;
Tracking;
Branded Email Templates;
Branded Packing Slip Templates; and/or
Return Label Templates.

Overrides for settings may be prioritized, such as top priority to pass settings in the embeddable shipping label management element; then next priority to use merchant stored defaults; and at lower priority to use a shipping management service provider's zero-state and/or global default settings, which may have been adjusted in-line with an earlier shipment either via the embeddable shipping label management element and/or at another app provided by the shipping management service provider.

User Flow and Integration. In one embodiment, an outline of the user/merchant flow includes the following steps:

1. Initiate. A site platform enables the embeddable shipping label management element for merchants;
2. Authenticate. A site platform initiates connection to a shipping management service provider, for example using an OAuth flow. The merchant signs up with the shipping management service provider including payment information and is redirected back to site platform. The site platform may provide a response_type (such as "code"), client_id (a unique partner ID for the merchant), scope (such as "*" to allow full API access), and/or a state (random string generated by site platform which is verified later to prevent a CSRF (cross-site request forgery) attack). The shipping management service provider may receive an authentication token and/or shipping management service provider user id;
3. Render App. An embedded merchant selects an order on the site and the site platform launches embeddable shipping label management element. The site platform provides merchant information including: Sender Address; Return Address; Company Name; Compliance Information; Customs Information; Language; and/or Currency. The shipping management service provider receives user information and loads the fulfillment workflow;

4. Push Order Info. The embedded merchant sees order details provided by the site platform. Examples of order details include at least one of the following: Sender address; Return address; Recipient address; Fulfillment Location; Shipment date; Itemization (Item name; Item SKU; Item quantity; Item weight; Item price; Origin; Compliance information; Hazmat flag);
5. Manage Shipment. The embedded merchant reviews and adds necessary supplemental information to generate shipment such as sender address, return address, recipient address, itemization, compliance details, hazmat information, and/or package details. The site platform is not required to provide any action at this stage;
6. View Rates. The embedded merchant may sign up for a carrier, if necessary, and view rates for each service level without requiring action from the site platform;
7. Purchase. The embedded merchant may purchase a label without requiring action from the site platform;
8. Update Order. The embeddable shipping label management element may (bi-directionally) update a site platform's Order Status, for examples via calls to an orders API and/or transaction API. The site platform may receive an order update and the shipping management service provider may provide order details via the embeddable shipping label management element, with an example:

```
"object_id": "4f2bc588e4e5446cb3f9fdb7cd5e190b",
"object_owner": "shippotle@goshippo.com",
"order_number": "#1068",
"order_status": "PAID",
"placed_at": "2016-09-23T01:28:12Z",
"to_address"
"from_address": null,
"line_items": [ ],
"shipping_cost": "12.83",
"shipping_cost_currency": "USD",
"shipping_method": "USPS First Class Package",
"shop_app": "Shippo",
"subtotal_price": "12.10",
"total_price": "24.93",
"total_tax": "0.00",
"currency": "USD",
"transactions": [ ],
"weight": "0.40",
"weight_unit": "lb",
"notes": null
```

If the embedded merchant has split an order, this may include introducing a new/second order that remains unfulfilled;

9. Post Purchase. The embedded merchant may download a label without requiring action from the site platform;

10. Support. The embedded merchant may contact the shipping management service provider support team for their account, label purchase workflows, billing, and/or invoicing, without requiring action from the site platform;

11. Analytics. The shipping management service provider and/or site platform may receive data on interactions, such as the site platform provides write access to a data warehouse and the shipping management service provider may show analytics for a label purchased; and/or 12. Miscellaneous. The site platform may permit reauth on failure, the shipping management service provider may add customization for branding; configurations may be used for accepting deployments/versions; carrier configuration may be used for bulk purchasing and label printing; and return labels merchant settings may include: carrier management, package templates, address book, packing slip settings, and/or cross-border settings and parameters.

In one embodiment, embedded merchants add or edit itemization, or may do this in the site platform's order workflow. An embedded merchant may be able to save settings collected in the embeddable shipping label management element (for example, packing information or addresses) and may be able to retrieve stored settings (for example, default sender address.) An embedded merchant may login to the integrator web app to: view invoice (or they may be emailed and billed without a required action); manage billing; manage addresses; and/or update their profile/email address/password.

In one embodiment, the shipping management service provider may leverage store sync: The embeddable shipping label management element may communicate directly with a site platform's API to retrieve order info and supply fulfillment into; and/or an embedded merchant's orders managed within the embedded shipping app may be available in the shipping management service provider web app orders view. A merchant may not need to install a shipping management service provider app to use the embedded shipping app. Merchants may leverage integrator OAuth to authenticate with integrator. If a platform marketplace app is required, a site platform may install it by default for merchants that use the embeddable shipping label management element. The site platform or embedded element may provide address validation on merchant and recipient addresses stored on orders.

Figure 5A:
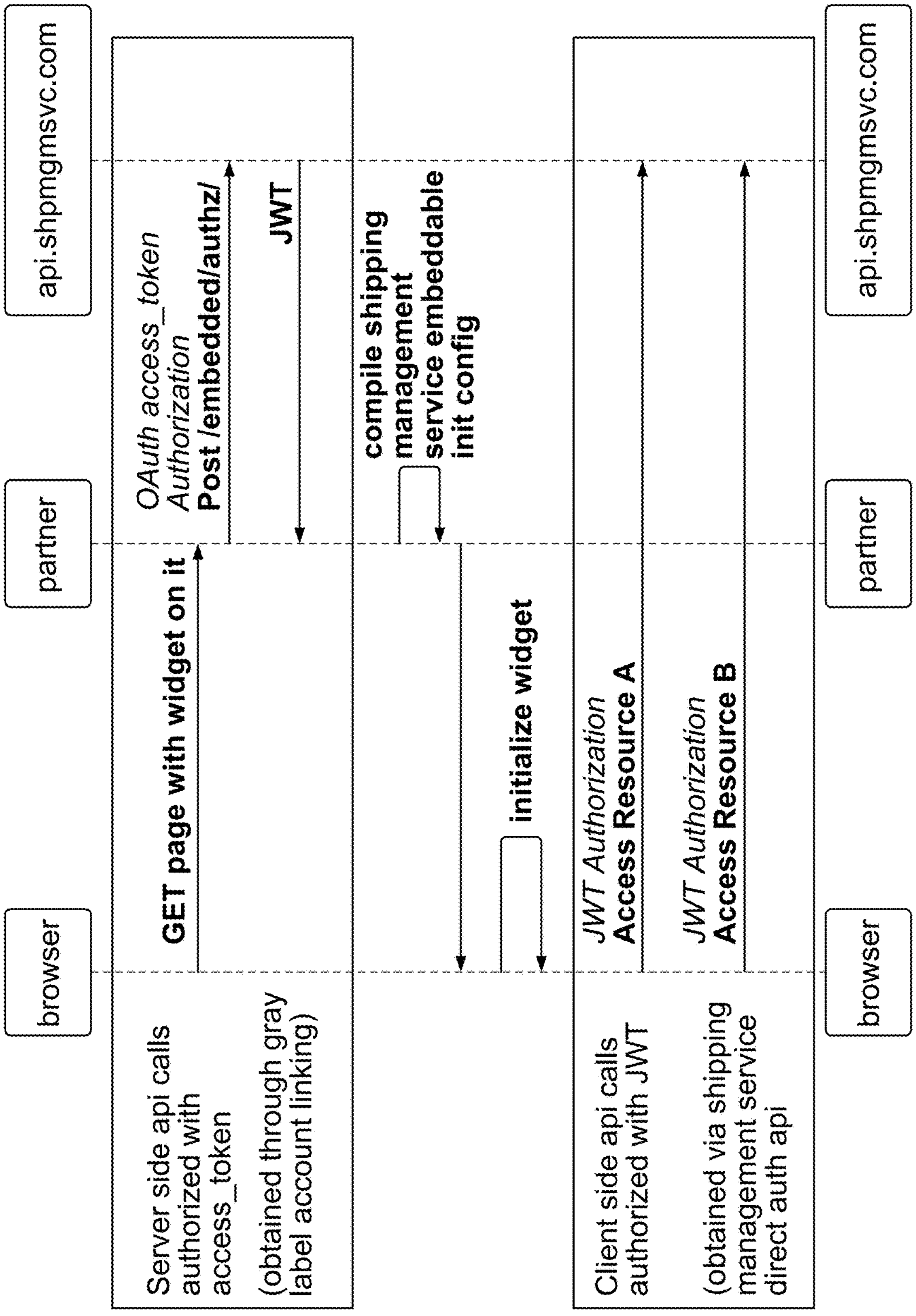
FIG. 5A is a flow diagram for authorizing the embeddable shipping label management element.
Figure 5B:
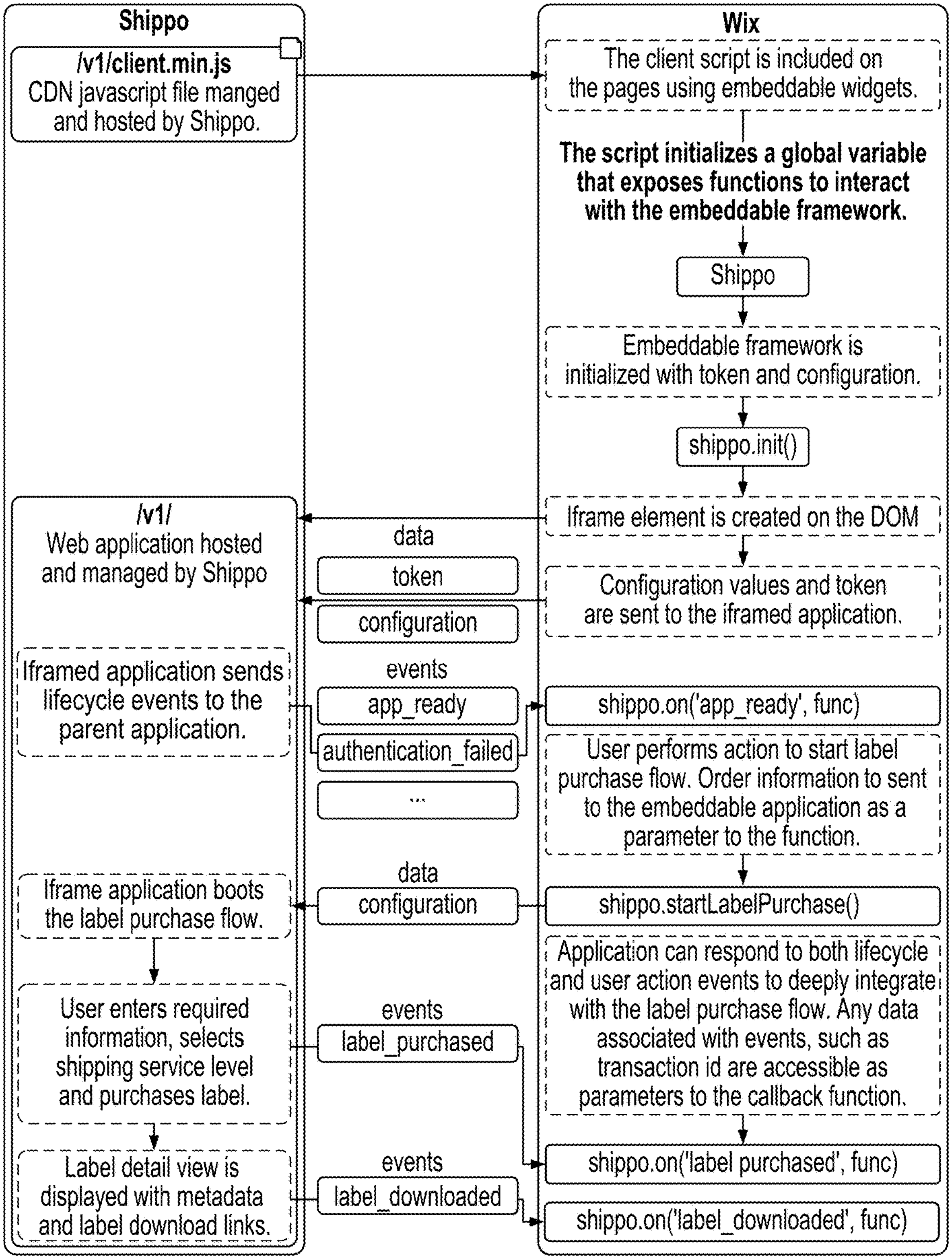
FIG. 5B is a flow diagram for a clientside integration flow.

FIGS. 5A and 5B are flow diagrams illustrating an embodiment of a technical architecture for an embeddable shipping label management element.

Embeddable shipping label management elements and/or widgets provide an improved functionality in site platform applications while minimizing the amount of integration code needed. In one embodiment, there are four components of the embeddable shipping label management elements:

- An API for obtaining a short lived JWT (JSON Web Token) to authorize the embedded application;
- A Javascript file hosted by the shipping management service provider, to be included on the page;
- A script to integrate with the embeddable application; and/or
- An iframed application hosted by the shipping management service provider that provides functionality.

FIG. 5A is a flow diagram for authorizing the embeddable shipping label management element. As shown in FIG. 5A, the flow follows a shipping management service provider's OAuth flow for linking accounts to obtain a long lived access token for each merchant account.

In one embodiment, an access_token is used and the flow includes obtaining a short lived JWT using the shipping management service's/embedded/authz API. This call may be made server-side as the OAuth access_token may not be suitable for client-side usage. In one embodiment, the access_token is obtained through grey label account linking and/or white label account linking. This JWT may securely be shared with the embeddable shipping label management element via an initialization configuration, for example a compiled shipping management service embeddable init config. The embeddable shipping label management element may be initialized. Following this, the embeddable shipping label management element/widget may make protected calls to the shipping management service's APIs.

FIG. 5B is a flow diagram for a clientside integration flow. The example of FIG. 5B shows without limitation an example with a shipping management service named "Shippo" and a site platform named "Wix".

As shown in the example in FIG. 5B, a hosted script file may be used. For example, the shipping management service may provide/host/manage a Javascript file, for example through a content delivery network, that may be included in a site platform application that sets up an embeddable shipping label management element/widget Javascript SDK:

```
<script type="text/javascript"
src="https://***.shipmgmtsvce.com/v1/client.js" />
```

This script may set up a variable representing the shipping management service on the window that provides functions and event listeners to interact with the embeddable widgets. As shown in FIG. 5B, the client script may be included on site platform pages using the embeddable widgets. The script may initialize a global variable that exposes functions to interact with the embeddable framework, which is shown for example in FIG. 5B by a global variable shippo.

As shown in the example in FIG. 5B, once the shippo script is loaded, the functions are available to be called in vanilla Javascript or using another framework of choice. These functions include hooks like init, labelPurchase, and destroy. Data may be passed to these functions to support use cases like "prehydrating" and/or prepopulating address and order information for label purchase.

As shown in the example in FIG. 5B, calling the init function may add an iframe element to the DOM and/or page of the hosted embeddable shipping label management element, https://***.shipmgmtsvce.com/vl/*. This hosted script file may be responsible for setting up communication between the platform application and the iframed application using the postMessage API and query parameters. Configuration values and token(s) may be sent to the inframed application. In general, configuration may be passed to methods such as init or labelPurchase, for example shippo.init( ) The init method allows for customizing the shipping parameters, account parameters, and/or the user experience/interface. In one embodiment, the iframed application sends lifecycle events to the parent application, such as app_ready and authentication_failed, for example shippo.on ('app_read', func).

As shown in the example in FIG. 5B, with the hook labelPurchase, for example shippo.label Purchase( ) a configuration may be passed such that the iframe application boots the label purchase flow. A user may enter required information, select shipping service level and/or purchase the label, sending events such as label_purchased to the parent application, for example shippo.on ('label_purchased', func) wherein the application may respond to both lifecycle and user action events to more deeply integrate with a label purchase flow. Any data associated with events, such as a transaction id, may be accessible as parameters to a callback function. As shown in FIG. 5B, a label detail view may be displayed with metadata and/or label download links, sending events such as label_downloaded to the parent application, for example shippo.on ('label_downloaded', func).

Embedded Label Purchase. An embedded label purchase as referred to herein is a label purchase and/or carrier agreement confirmation of physical shipment based at least in part on use of the embeddable shipping label management element/widget. The embedded label purchase allows merchants to sign up with a shipping management service, trigger an embedded shipping app via the embeddable shipping label management element on a site platform's website, load order details, provide shipment information, generate domestic rates with a carrier, purchase a label, download a label, and/or view/pay invoices.

Steps that a merchant and/or user may complete via the embeddable shipping app include steps to fulfill a site platform's order:

- Initiate: Site platform initiates connection to shipping management service.
- Onboard via OAuth: Merchant/user on site platform visits shipping management service's website, signs up or logs in, adds billing credentials and then is redirected back to site platform;
- Launch embedded shipping app via embeddable shipping label management element: Merchant triggers label purchase workflow. As referred to herein an "embedded merchant" is a user and/or merchant of the site platform using the embeddable shipping label management element;
- Order Info: Embedded merchant sees order details provided by site platform;
- Addresses: Embedded merchant may view or update sender address, return address, and recipient address;
- Packages: Embedded merchant may provide custom package details;
- Rates: Embedded merchant may enable one or more carriers, see domestic/international service levels, view rates, and/or delivery timelines;
- Purchase: Embedded merchant may purchase a label. Merchant may also purchase shipping insurance, ensure compliance, and/or settle taxes, duties, tariffs, and other fees; and/or
- Post Purchase: Embedded merchant may download label and view/pay invoices.

Figure 6A:
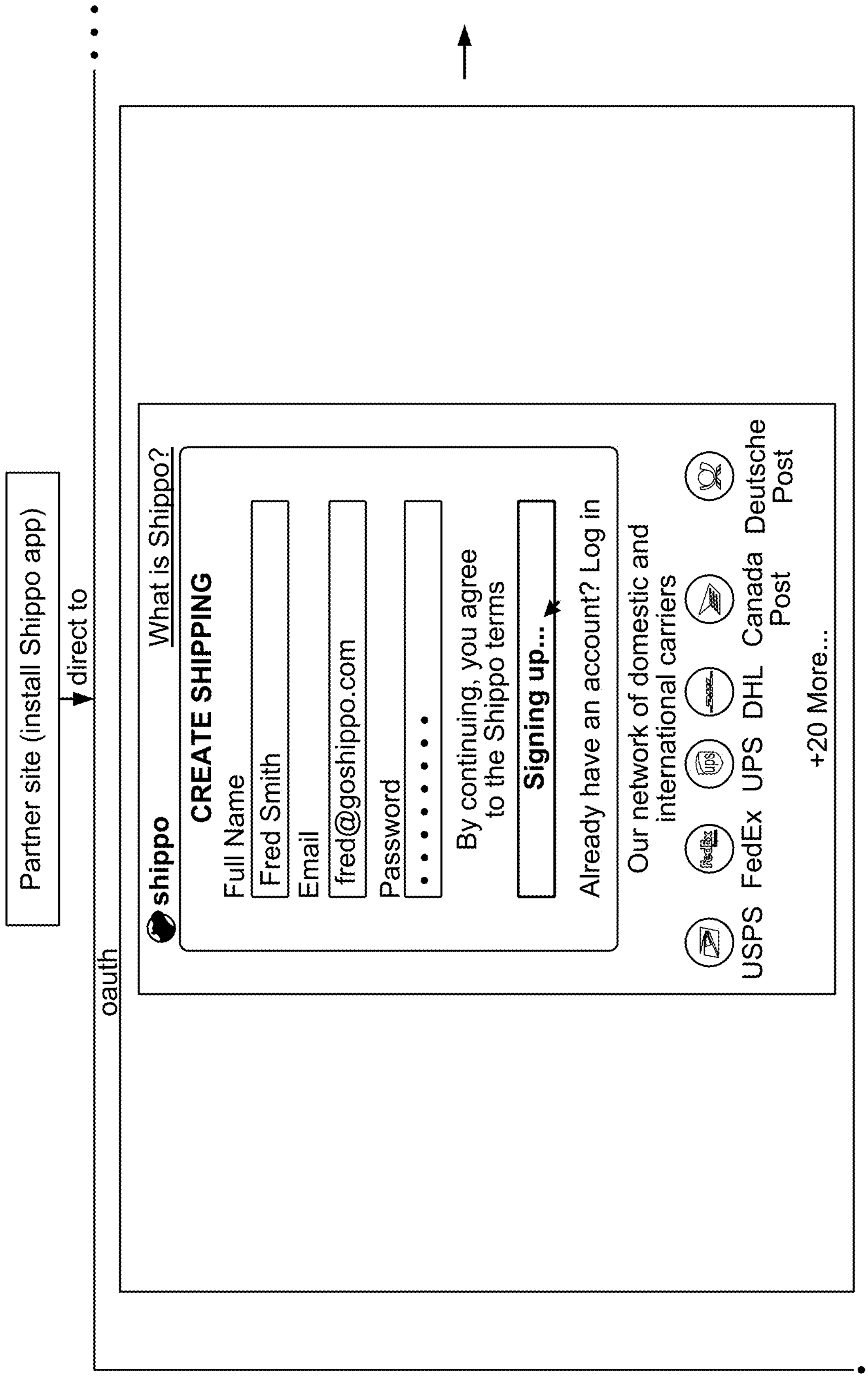
FIG. 6A is a flow diagram illustrating an embodiment of onboarding of a user or merchant.

FIG. 6A is a flow diagram illustrating an embodiment of onboarding of a user or merchant. In one embodiment, the system of FIG. 1 is used to facilitate the onboarding of a user or merchant.

As shown in FIG. 6A, a merchant for a site platform (referred to as a partner site on FIG. 6A) may sign up via a grey label OAuth and/or white label integration, confirm compliance via a compliance record, and/or provide their billing info, and after completion may be redirected to the site platform. In one embodiment, white label integrations are a secure token exchange, and/or a later exchange of the secure token for a session token to be used with an embeddable shipping label management element. In one embodiment, this includes installation of an app for the shipping management service. In one embodiment, this occurs within an iframe and/or embeddable shipping label management element/widget. As shown in FIG. 6A, this onboarding may include a user experience as described in further detail in FIGS. 3C, 3D, 3E, and 3F.

In one embodiment, a scenario table for FIG. 6A is:

| Function | Routine | Scenario | Details |
|---|---|---|---|
| Launch embedded shipping app | Parent | Initiate, Authenticate and Render App Embedded merchant stored shipping management service and site platform information loads. They natively may begin the fulfillment process in the embedded shipping app, to begin fulfillment of a single order. | |
| | Authenticate Load shipping management service merchant info | The embedded shipping app connects to the grey-label/white-label oAuth flow and retrieves a shipping management service account, authentication token and billing info which is necessary for fulfillment. The embedded shipping app sends an unauthorized event when the merchant is not authenticated. | Platform to renew/refresh the auth token which is valid for a 12 hr timeframe. This prevents the merchant from having to log back in to the widget. The client sends UNAUTHORIZED events if the token initially passed is invalid or if at any time 401 or unauthorized responses come back from the APIs (if a token expires, etc.) |
| | Render App Load platform settings | The embedded shipping app appears in a site platform defined placement. The embedded shipping app is fluid, and responsive to defined breakpoints. | |
| | Render App Load platform | The embedded shipping app may receive necessary information from the platform to determine eligibility and populate merchant info in label purchase workflow. | Platform API may provide address within shipmentDetails and may provide merchant language, country and name, business name, address. |
| | merchant info | Eligibility Rules 1. Check origin and destination for an order. They should be in compliance, for example regulatory compliance. 2. Show compliance disclaimers required to use embedded shipping app. Merchant info includes: Full name Company name Default sender address Default return address | Default to browser language. |
| | Render App Load & store merchant shared settings | The embedded shipping app can pull necessary information from shipping management service to generate the merchant's saved | |

-continued

| Function | Routine | Scenario | Details |
|---|---|---|---|
| | | settings.<br>The embedded shipping app may store information collected.<br>Shipping Management Service Settings include:<br>Preferred label size<br>Package templates<br>Default sender address<br>Default return address<br>Carrier settings<br>Language<br>Currency | |

Figure 6B:
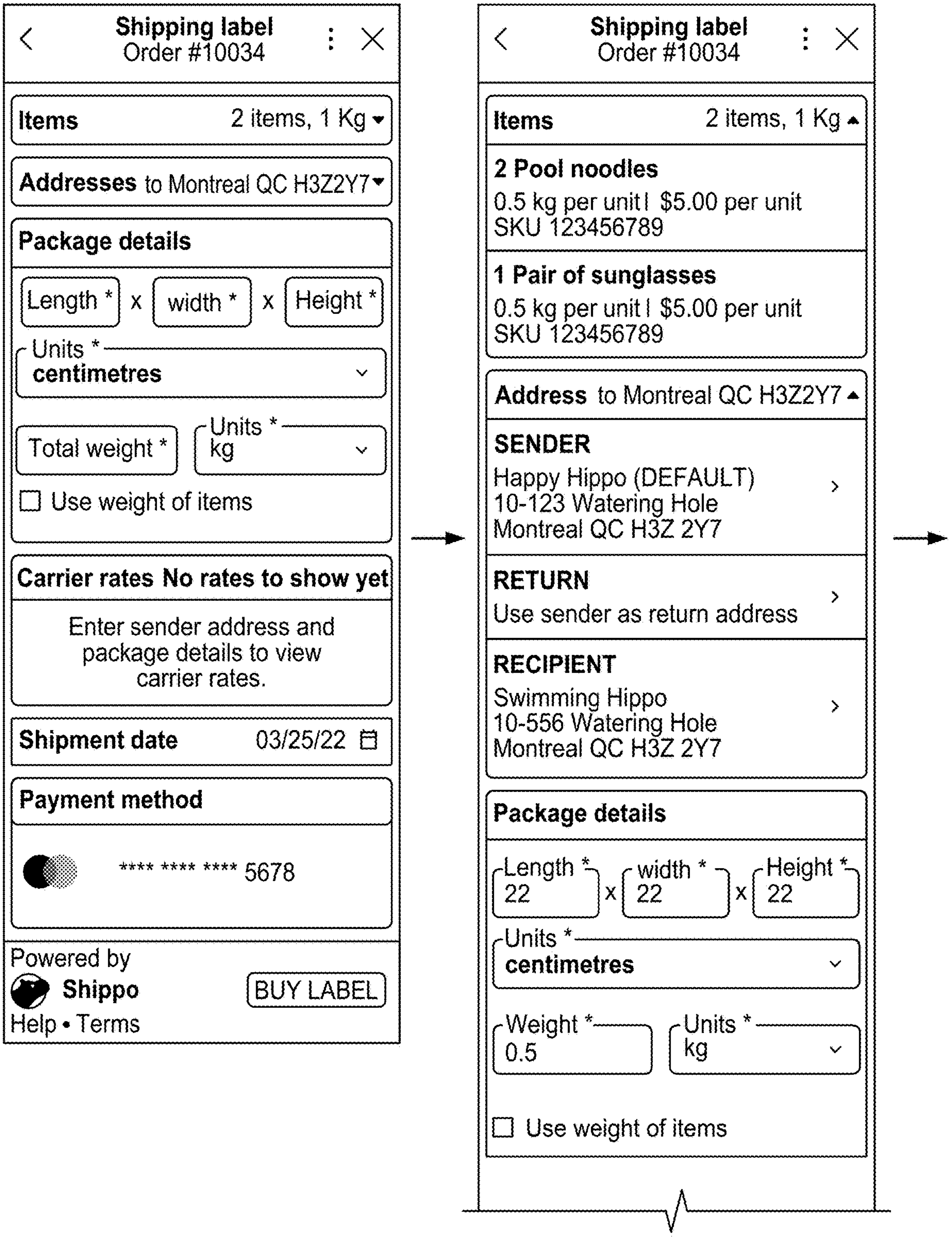
FIG. 6B is a flow diagram illustrating an embodiment of an embedded merchant label purchase.

FIG. 6B is a flow diagram illustrating an embodiment of an embedded merchant label purchase. In one embodiment, the system of FIG. 1 is used to facilitate the embedded merchant label purchase.

As shown in FIG. 6B, an embedded merchant may use the embeddable shipping label management element to facilitate the label purchase. In one embodiment, order information from the site platform automatically populates the shipment details in the embeddable shipping label management element via "prehydration". As shown in FIG. 6B, the merchant may edit info, add package details, and/or purchase a label within the embedded shipping app.

In one embodiment, a scenario table for FIG. 6B is:

| Function | Routine | Scenario | Details |
|---|---|---|---|
| Order Info | Parent | The embedded merchant may see details of their site platform store's orders, so they may fulfill them. | |
| | Push Order Info Load platform orders | The embedded shipping app receives necessary information from the platform to populate orders in the label purchase workflow. As referred to herein, this process is called "prehydration".<br>Order info includes:<br>Site platform order number (not necessarily shipping management service order number)<br>Sender address<br>Return address<br>Recipient address<br>Shipment date<br>Itemization<br>Item name<br>Item SKU<br>Item quantity<br>Item weight<br>Item price | |
| | Items | The embedded merchant automatically sees the count of items and aggregate weight within my order, so they may accurately fulfill the order.<br>They may view each item individually and see:<br>The item name<br>The weight per unit<br>The price per unit<br>Origin<br>SKU | Item weights are synced and added as a line item of the package weight's subtotal. |

-continued

| Function | Routine | Scenario | Details |
|---|---|---|---|
| | Order splitting | The embedded merchant may split an order to fulfill items differently. | |
| | Batch orders | The embedded merchant may fulfill multiple orders within a single workflow to increase fulfillment speed. | |

Batch Operations. In one embodiment, batch operations includes fulfilling a plurality of orders at once. In one embodiment, a quick selection system such as a checkbox to select multiple orders is used to allow batch fulfillment where certain options such as carrier selection are selected across the batch. For example, for a batch of five orders, a merchant may use the embedded shipping label management element to permit validation of to/from addresses, select one carrier for all five orders, purchase all labels as a single transaction, and/or print all five labels together. In one embodiment, bulk selection for batch operations includes a selection of one carrier for the batch and/or a quick selection of the package. For example, a merchant may use batch operations to fulfill five orders using USPS Ground Advantage and select "small box" for three of the five orders, select "medium box" for the remaining two of the five orders, and purchase them as a single transaction.

Figure 6C:
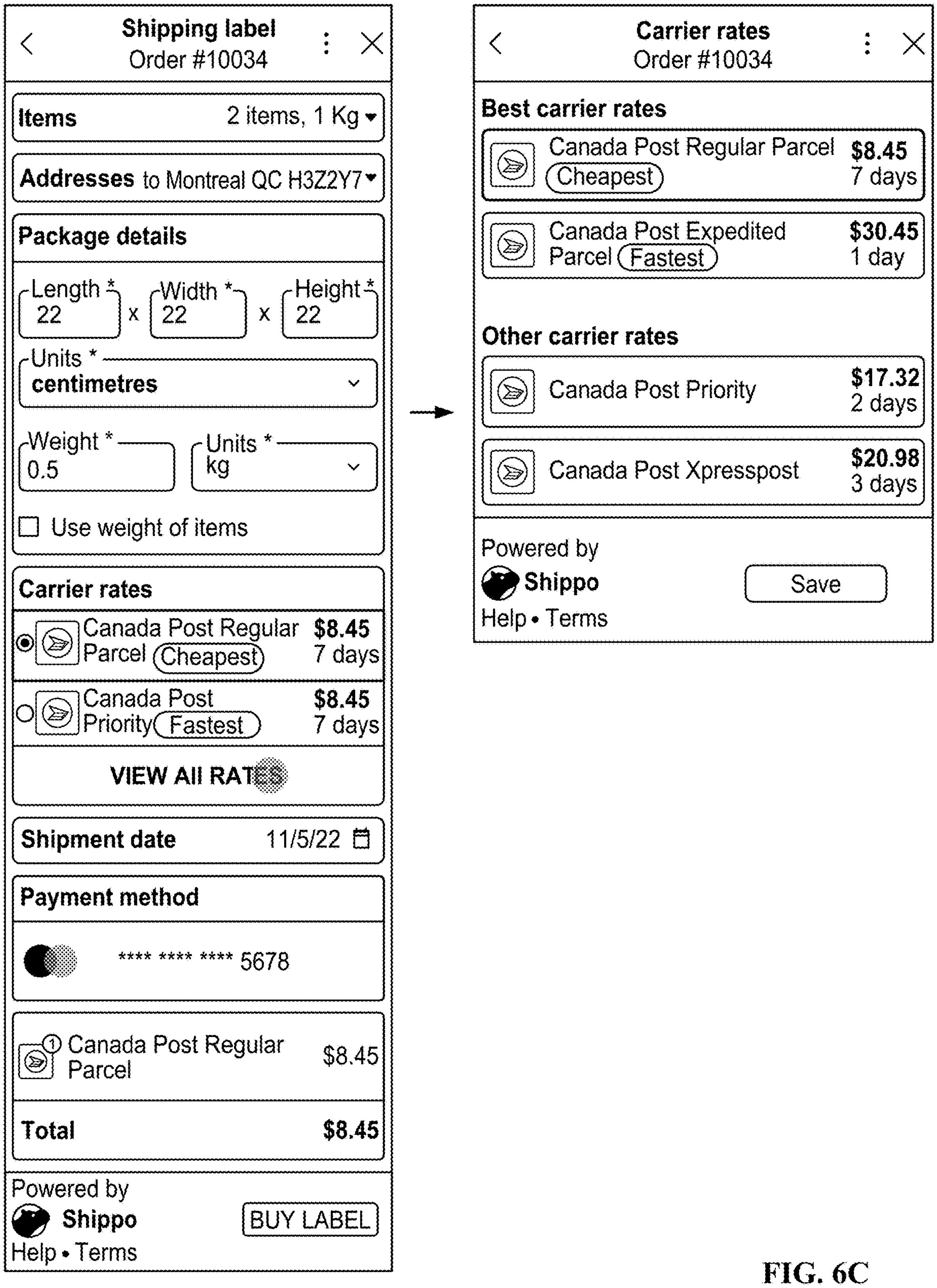
FIG. 6C is a flow diagram illustrating an embodiment of an embedded merchant label display of all rates.

FIG. 6C is a flow diagram illustrating an embodiment of an embedded merchant label display of all rates. In one embodiment, the system of FIG. 1 is used to facilitate the embedded merchant label display. As shown in FIG. 6C, embedded merchants may view and/or enable carrier and view rates for domestic/international service levels.

In one embodiment, a scenario table for FIG. 6C is:

| Function | Routine | Scenario | Details |
|---|---|---|---|
| Addresses | Parent | The embedded merchant may view and update a sender, return and recipient address so they can fulfill my order. | Rules for inheriting addresses:<br>1/ Take what the site platform provides<br>2/ Take what the shipping management service has available<br>3/ If nothing was collected from above sources, enable the merchant to input. |
| | Sender address | The embedded merchant may automatically see the platform's default addresses set as my sender address, so they may efficiently buy a label. | |
| | Return address | The embedded merchant may automatically see their sender address as return address, so they may efficiently buy a label.<br>When they add a new return address, they may fill it with a current sender address. | |
| | Recipient address | The embedded merchant may automatically see their recipient's address synced from the order, so they may efficiently buy a label. | |
| | Localization | The embedded merchant may see an address form that reflects the country and/or jurisdiction they are shipping from. | |
| | Add | The embedded merchant may add a new address to an order. | |
| | Update | The embedded merchant may update an existing address on an order. | |
| | Address bar states | When a merchant has not completed an address, a link is shown to add it.<br>Sender Address<br>Return Address<br>Recipient Address<br>When a merchant has added an address, a summary is shown.<br>City, Province, Zip | |
| | Validate | The embedded merchant's address should pass validation. If it fails, they may correct it. | This may be verified by the carrier for compliance. |
| | Default | The embedded merchant may set a default address for sender and return in the embedded shipping app. | |

-continued

| Function | Routine | Scenario | Details |
|---|---|---|---|
| | Auto complete | When entering an address, the embedded merchant may can select from a list of autocomplete options. | |
| | Manage | The embedded merchant may view and manage a list of addresses. | |
| Shipments | Parent | | |
| | Shipping options | The embedded merchant may include alcohol in the shipment. The embedded merchant may require signature for my shipment, and optionally require an adult. The embedded merchant may include dry ice in the shipment. | |
| | Returns | The embedded merchant may include a return label in an automated and/or non-automated way. | |
| | Label size | The embedded merchant may view and update the label size. | |
| Packages | Parent | The embedded merchant may add package information to fulfill the order. | |
| | Add custom dimensions | The embedded merchant may add package dimension and weight for the order. The embedded merchant may enter the length, width, height and weight. I can change the units from metric to standard. The embedded merchant may change my weight unit between lbs and oz. | Default to metric (cm & kg) for SI countries like Canada. |
| | Package templates | The embedded merchant may optionally save as a template and reuse. The embedded merchant may view all package templates. The embedded merchant may update existing package templates. The embedded merchant may delete a package template. The embedded merchant may create a new package template. | |
| | Package lists | The embedded merchant may see recently used packages and/or package templates. | |
| Rates | Parent | The embedded merchant with an order with a sender address, recipient address, and package details, may view a rate so they can buy a label. | |
| | Show rates | Once the embedded merchant has entered required information, they can see the cheapest and fastest rates and/or all rates. The embedded merchant may view rates in their language and currency. | Required info for generating a rate: Valid sender address Valid recipient address Package dimension set Show errors in the rate card as they are received from the carrier. |
| | View all rates | The embedded merchant may view all available rates, from all carriers. | |
| | Carrier Terms | The embedded merchant should view a link to carrier terms / T&C before they can view rates, for regulatory and/or business compliance. The embedded shipping app collects the embedded merchant information and stores it in a consent service, for example a consent service for the shipping management service. | |
| | Shipment date | The embedded merchant may set a future shipment date. | |
| | Error handling | The embedded merchant may user-friendly and/or clearly articulated errors that provide clear steps to resolve so the merchant may generate rates. | Carrier errors may be provided as they are returned in the API |
| | Sort rates | The embedded merchant may sort rates by fulfillment speed or price. | |
| | Carrier configuration | The embedded merchant may select which carriers and service levels they see rates for. | |

-continued

| Function | Routine | Scenario | Details |
|---|---|---|---|
| | Customs | The embedded merchant may provide customs info based on their shipping destination. | |
| Purchase | Parent | The embedded merchant may have an order with a generated rate, so they can purchase one or more labels. | |
| | View payment method | The embedded merchant may see their payment method, for example a last four digits of a credit card.<br>The embedded merchant may replace their card on the shipping management service billing page, which may be done via a popup modal / window. | |
| | Charge payment method, for example credit card | The embedded shipping app may charge the payment token collected during grey-label and/or white-label OAuth.<br>When unsuccessful, the merchant sees a message to add/update their card on the shipping management service billing page. | The payment method may be unsuccessfully charged for a number of reasons:<br>Fraud block<br>Payment Gateway issue<br>Card / Account issue |
| | Promo code | The embedded shipping app may permit input of a promo code to apply to the carrier for a promotional discount. | |
| | Label summary | The embedded merchant may see a summary of my purchase before completing it. | Summary includes: price, quantity, carrier, service level, payment credentials. |
| | Validation | Before the label is purchased, an address is validated. If invalid, the embedded merchant may edit it before purchasing. | The label button is deactivated until a rate has been selected. |
| Post Purchase | Parent | The embedded merchant who purchased a label may download or cancel the label. | |
| | Post purchase summary | The embedded merchant may see their recent label purchase.<br>Carrier<br>Tracking info<br>Recipient<br>Shipment date<br>Package dimension<br>Billing language<br>Print label | |
| | Download label | The embedded merchant may view a preview of their label, for example as a PDF. | Merchants can view orders and download mutiple times based on the current shipment state |
| | Update Platform Order | The embedded merchant's site platform receives the necessary fulfillment information so that they can update the embedded merchant's order. | |
| | Support | The embedded merchant may visit the shipping management services support page to submit a request. | Merchants may use this flow to cancel a label. The link is shown in the footer and in the top menu. |
| | Cancel label | After a purchase, the embedded merchant may cancel their label. The label is voided and/or refunded. | A voided label should be reflected on the post purchase order screen. |
| | Invoices | After purchase, the embedded merchant may view a link to an invoice. In a new tab, they can view all their invoices on the shipping management service's billing page. *<br>They may be emailed when their invoice is paid or overdue. | *Merchants may have to login if it's been less than a week since they had a session. |
| | Tracking link | The embedded merchant may view the shipment tracking link and click to view the carrier's tracking page.<br>The site platform receives the tracking information so they can provide it for the order. | |
| | Package Slips | The embedded merchant may view a preview of their packing slip for their order. | Customized formatting is available |
| | Tracking status | The embedded merchant may see which stage of the fulfillment journey their package is in. | |

-continued

| Function | Routine | Scenario | Details |
|---|---|---|---|
| | Send buyer tracking email | The embedded merchant may choose to send email notification to the recipient. | |
| | Analytics | In one embodiment, analytics available include one or more of the following: widget details, platform information, percentage of merchants who complete adding credit card, percentage of merchants who successfully pay an invoice, and percentage of successful transactions. | |
| Internation alization | Parent | The embedded merchant may pricing in a chosen currency across rates, billing, invoices. | |

Figure 6D:
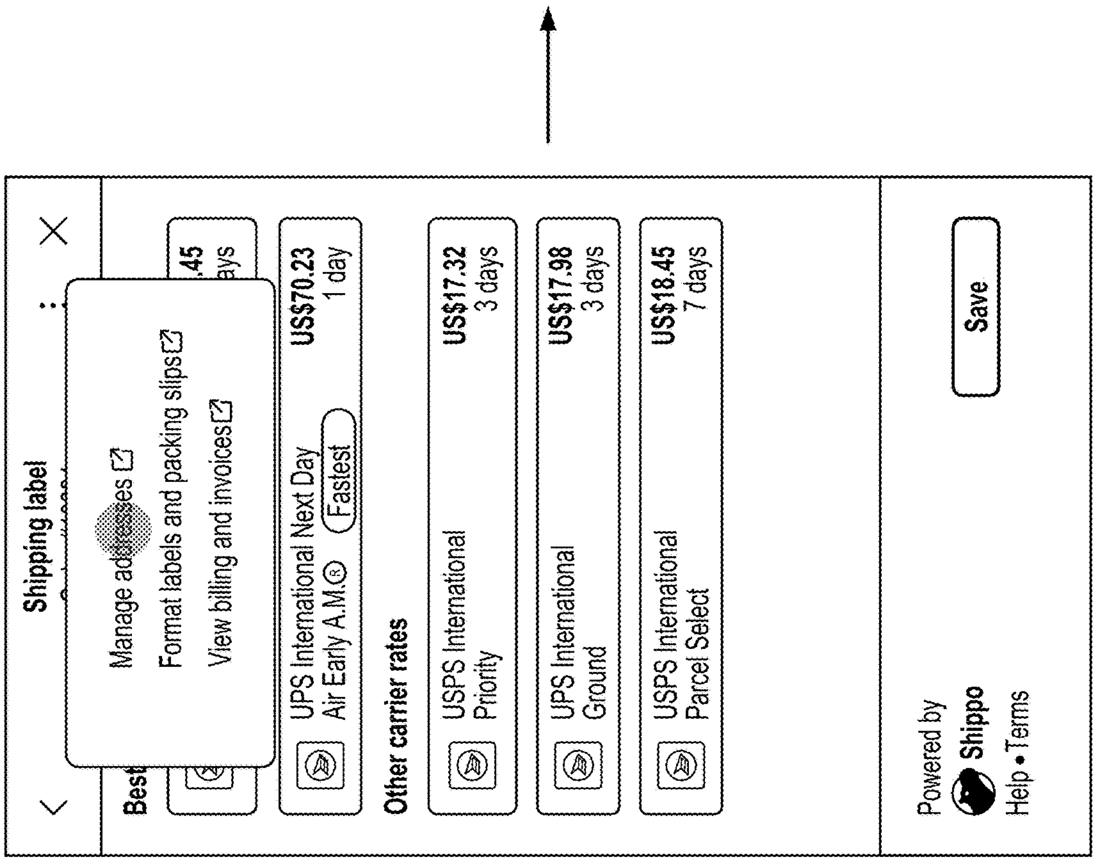
FIG. 6D is a flow diagram illustrating an embodiment of an embedded merchant settings configuration.

FIG. 6D is a flow diagram illustrating an embodiment of an embedded merchant settings configuration. In one embodiment, the system of FIG. 1 is used to facilitate the embedded merchant settings configuration. As shown in FIG. 6D, embedded merchants may manage settings, addresses, and/or label sizes in the web app. They may be logged in to view the web app settings. In one embodiment, this login may expire after 7 days of inactivity.

Asynchronous Synchronization. In one embodiment, a modular/reusable mechanism is created for synchronizing order and fulfillment information. As referred to herein, "channel sync" is for synchronizing order and fulfillment information through a site platform, and "non-channel sync" is for synchronizing order and fulfillment information outside channel sync. Both channel sync and non-channel sync may leverage an asynchronous synchronization. Enabling real-time syncing and/or reconciliation of order and fulfillment information is disclosed.

Asynchronous synchronization addresses user problems such as:

- duplicate labels being purchased, wherein users accidentally buy the same label multiple times on a web app and embeddable shipping label management element/widget without direct access to the shipping management service system;
- difficult onboarding, wherein channel sync and the embeddable shipping label management element/widget may have duplicate sign up/onboarding flows.

Leveraging both requires signing up on one and logging into the other, possibly creating duplicate accounts without direct access to the shipping management service system;

- channel sync is unreliable, wherein a "batch sync" of a plurality of orders on a site platform with the shipping management service is slow, fails, and/or does not recover well direct access to the shipping management service system. For example a network fault may occur between site platform and shipping management service.

An asynchronous synchronizer addresses problems with such as:

- Within an order model, the asynchronous synchronizer queries orders by shipment ID, wherein an external order ID may not easily fit in;
- For grey-label and/or white-label OAuth, the asynchronous synchronizer expands scope beyond being an only pattern for external authentication, which may be unsupported and/or hard to extend. For example, using channel sync the connection may be maintained by a site platform appstore rather than OAuth; and/or
- For batch orders, the asynchronous synchronizer permits fulfillment on multiple orders within the same workflow.

An asynchronous synchronizer has as improvements:

- Set up is simple for users and partners. For example, existing channel sync users may use the embeddable shipping label management element/widget without issues and non-channel sync partners may easily plug into widget;
- Embedded merchant orders may become available in the web app orders view; and/or
- Users may have channel sync and still use the embeddable shipping label management element/widget.

As a first example scenario, a site platform merchant uses both a shipping manager service's platform app for channel sync, and the embeddable shipping label management element. To improve an experience and reduce issues with onboarding/sign up, order sync, and fulfillment sync, an asynchronous synchronizer is used.

Figure 7:
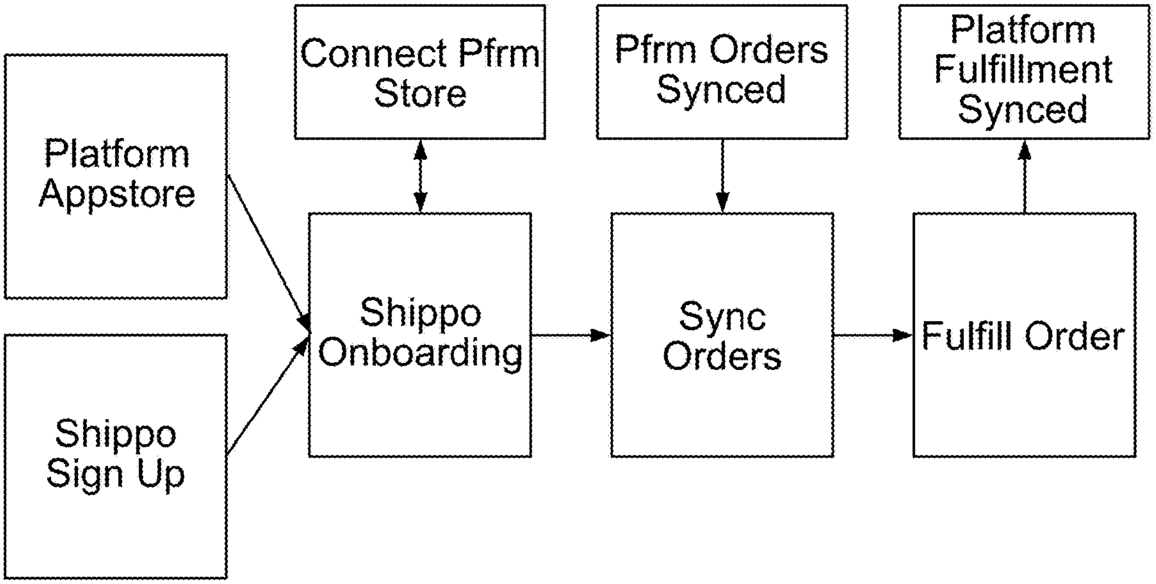
FIG. 7 is an illustration to compare flow between a channel sync and an embedded shipping app within the embeddable shipping label management element.
Figure 7:
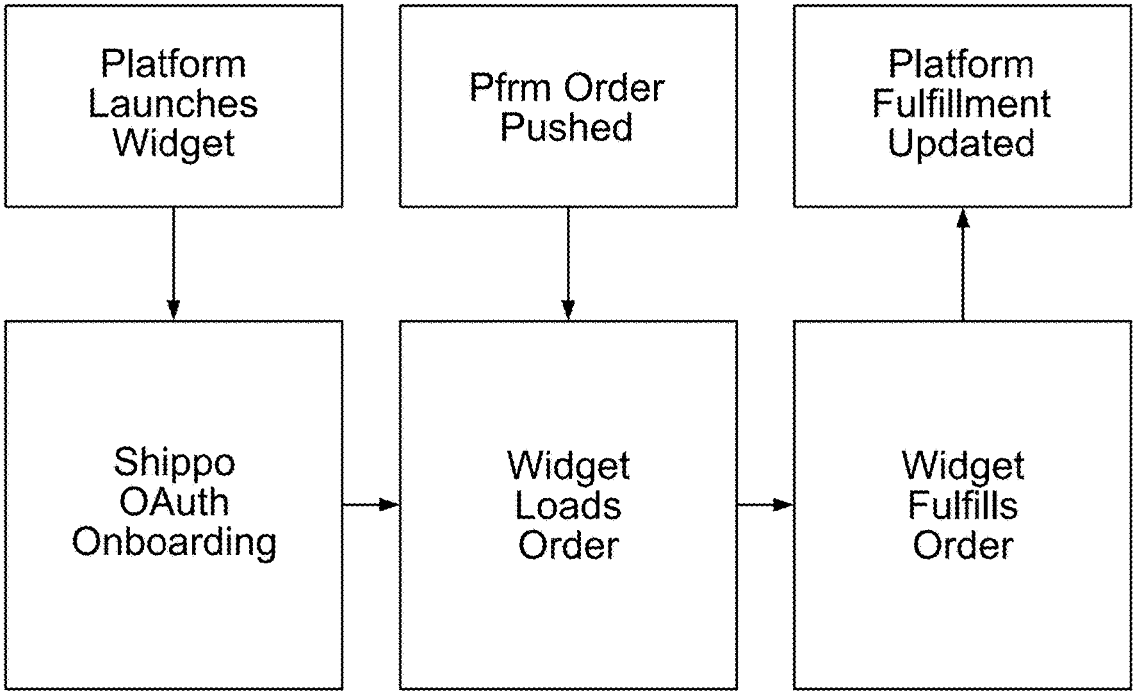

FIG. 7 is an illustration to compare flow between a channel sync and an embedded shipping app within the embeddable shipping label management element. In the example of FIG. 7, a shipping management service called "Shippo" is used with a site platform.

As shown in FIG. 7 (702), for channel sync a connection is established/onboarded, initiated by a user via a site platform appstore and/or the shipping management service onboarding flow. Channel sync API access is such that the shipping management service receives access to the site platform APIs and/or site platform user account. Channel sync order synchronization is server side, typically using a batch sync wherein the shipping management service pulls orders from the site platform on a fixed or dynamic frequency, for example every hour. Channel sync fulfillment synchronization is server side, wherein the shipping management service pushes updates to the site platform on a fixed or dynamic frequency, for example every few minutes.

As shown in FIG. 7 (704), for the embedded shipping app a connection is established/onboarded via OAuth, initiated by the site platform via exposing the embeddable shipping label management element/widget to the user. Embedded shipping app API access is such that the site platform and embeddable shipping label management element/widget receives access to shipping management service APIs and user account(s). Embedded shipping app order synchronization is client side, wherein a middle layer fetches order information from the site platform for the embeddable shipping label management element/widget if and/or when a user/merchant begins fulfillment for an order. As this is client side it may be synchronized in real-time. Embedded shipping app fulfillment synchronization is client side, wherein it can be pushed from the embeddable shipping label management element/widget to site platform once a user completes a label purchase. As this is client side it may be synchronized in real-time.

Asynchronous Synchronizer Fault Condition. In the event a user/merchant fulfills an order via the shipping management service channel app, and it has not synced yet with the site platform within its hour window, an experience on the embeddable shipping label management element/widget may not reflect the order and/or fulfillment. Thus, a fault condition and/or race condition may arise wherein the user is able to purchase an additional label on the embeddable shipping label management element/widget side, for a fulfilled order on the shipping management service, that has not yet synced with the site platform. An asynchronous synchronizer thus makes an order check before purchase, to reduce issues from this fault/race condition.

For example, a specific user orders a physical item from a given merchant on a specified site platform. An asynchronous process updates the shipping management service from the site platform as orders come in including the one from the specific user. At some future point in time, the given merchant looks on their order page, click on the associated order, and in the event the asynchronous process has already updated the shipping management service, sees shipping information such as to/from addresses and whether the physical item is hazmat within the embeddable shipping label management element. On the other hand, in a race condition scenario where the shipping management service has not yet been updated, for example because the given merchant is so aggressive that they attempt to fulfill an order right after the specific user places the order and before the asynchronous process has not yet synchronized the shipping management service with shipping information, then the embeddable shipping label management element/shipping management service is configured to make a live call to the site platform to retrieve the shipping information. In one embodiment, this shipping information is stored on the site platform side in a "shipping management database" and is stored on the shipping management service provider in a "local database", such as a database local to the shipping management service provider, and this process updates the local database from the shipping management database.

In three scenarios, Onboarding, Order Sync, and Fulfillment Sync, a summary of how the asynchronous synchronizer addresses the potential fault condition is:

| Scenario | Channel Sync Status | Embedded Widget Status | Expected Outcome |
|---|---|---|---|
| SIGN UP | | | |
| Sign Up via Platform App Store | Active | Inactive | Sign up is attributed to Platform App store<br>User activity is attributed to Platform Channel Sync. |
| Sign Up via Platform App Store then Widget | Active | Active | Sign up is attributed to Platform App store<br>User can log in during OAuth flow with same credentials.<br>User activity is attributed to both Platform Channel Sync and widget based on source.<br>As there is a potential for duplicate account creation, an asynchronous synchronizer makes an account check before final account creation. |
| Sign Up via Widget then Platform App Store | Active | Active | Sign up is attributed to Widget<br>User can log in to Shipping Mgmt Service to connect the Platform Channel Sync App<br>User activity is attributed to both Platform Channel Sync and widget based on source. |
| Sign Up via Widget | Inactive | Active | Sign up is attributed to Widget<br>User activity is attributed to Widget |
| ORDER SYNC | | | |
| Shipping Mgmt Service Web App syncs order from Platform | Active | Inactive | New orders and updates on Platform order are synced.<br>Lookback is 30 days. |
| Shipping Mgmt Service Web App syncs order originating from Platform | Active | Active | New orders and updates on Platform order are synced.<br>Lookback is 30 days.<br>Widget reflects updated/synced orders based on what Platform provides |
| Shipping Mgmt Service Web App syncs order originating from Widget | Active | Active | Platform order is updated based on user fulfillment in widget.<br>Shipping Mgmt Service Channel Sync reflects updated/synced orders based on what Platform provides |

-continued

| Scenario | Channel Sync Status | Embedded Widget Status | Expected Outcome |
|---|---|---|---|
| Shipping Mgmt Service Web App syncs order from Platform/Widget | Inactive | Active | Order may or may not be updated in Shipping Mgmt Service web app. |
| FULFILLMENT SYNC | | | |
| Shipping Mgmt Service Web App syncs fulfillment to Platform | Active | Inactive | Tracking and fulfilment status are updated at Platform. Shipments can be viewed in Web App. |
| Shipping Mgmt Service Web App syncs fulfillment to Platform, originating from Web App. | Active | Active | Tracking and fulfilment status are updated at Platform. Widget receives the status from Platform. Shipments may be viewed in Web App. |
| Shipping Mgmt Service Web App syncs fulfillment to Platform, originating from Widget | Active | Active | Tracking and fulfilment status are updated at Platform. Web App receives updated from Platform. Shipments may be viewed in Web App. Fulfillment sync occurs on the order of seconds or minutes, to reduce the chance a user purchases an additional label on the widget side, for a fulfilled order on the Shipping Mgmt Service, that has not yet synced with the Platform. |
| Widget syncs fulfillment to Platform | Inactive | Active | Tracking and fulfilment status are updated at Platform. Shipments may be viewed in Web App. |

Embedded Shipping Label Management Element Integration. For a site platform's user, the embedded shipping label management element is a feature that they may use to add shipping directly into their website without developing the user interface or the code behind it. When a merchant/user of the site platform presses a button created by the site platform, a popup window appears that supports the merchant/user in purchasing a shipping label.

Thus for a site platform, the embedded shipping label management element is developed functionality for shipping management service partners who want to offer shipping functionality to their users/merchants. Thus for a site platform with users who ship items to their customers, for example Wix or eBay, the site platform may use the embedded shipping label management element to integrate shipping directly into the site platform. This gives site platform users access to a shipping solution without leaving the site platform.

To integrate the embedded shipping label management element to a site platform, the site platform administrator sets up authentication and copies provided code onto the site platform. Site platform merchants/users may fulfill orders with the embedded shipping label management element from within the site platform. Before using the embedded shipping label management element, the merchant creates or logs in to the shipping management service account. The site platform administrator integrates with the shipping management service authentication method to authorize a site platform user.

On the site platform:

- The site platform merchant/user may trigger label purchase workflow within the widget;
- The site platform merchant/user may pass details of their order into the widget;
- The shipping management service displays their order within the widget;
- The site platform merchant/user may fulfill their order, adding details to generate, and compare rates among carriers;
- The site platform merchant/user may purchase and download their label; and/or
- The site platform merchant/user is notified of the purchase and fulfillment information.

An improvement of the embedded shipping label management element is that it helps to integrate with a shipping management service experience immediately. the embedded shipping label management element enables quickly and easily to integrate shipping management in a site platform application, in part to ensure all compliance for shipping for the site platform and its merchants/users.

Authorization. To create secure access to the embedded shipping label management element, the site platform different methods for securing access to the shipping management service API. In one embodiment, for each use case keys are long lived and suitable only for server-side communication where the key can be kept private. For secure access to shipping management service accounts using an embedded shipping label management element, one method is to obtain a short lived token, for example a JSON Web Token (JWT). In one embodiment, JWT expire after 12 hours. To generate a JWT, an OAuth key is requested and access to a Bearer Token is gained.

There are at least two ways to generate a JWT; via a direct authorization API and via a user server side remote procedure call. For a direct authorization API, the administrator calls an/embedded/authz/endpoint, sending the following request:

```
// Request
POST https://api.shippingmgmtservice.com/embedded/authz/
Authorization:
Bearer <BearerToken>
{
  "scope": "embedded:carriers"
}
```

with expected response

```
// response
{
  'token':
'eyJhbGciOiJIUzI1NiIsInR5cCI6IkpXVCJ9.eyJzdWIiOiIxMjM0NTY3ODkwIiwibmFtZSI6Ikp
vaG4gRG91IiwiaWF0Ijox
    jwt
    'expires_in': '43200' //12 hrs
}
```

For a user server side remote procedure call (RPC) to generate a JWT, this RPC may be used:

```
service user {
  rpc DirectAuthorization(DirectAuthorizationRequest) :
DirectAuthorizationResponse
}
message DirectAuthorizationRequest {
  context
  requestor: // integration user id
  requested_subject: // alice's id
  token_type: 'jwt'
}
```

with expected response

```
message DirectAuthorizationResponse { token: // encoded jwt
  expires: //seconds until expiration
}
```

Validation of the JWT token is similar to validation of an API token. To test a generated JWT, the list all carrier parcel templates endpoint may be used:

```
curl https://api.shippingmgmtservice.com/parcel-templates \
  -H "Authorization: ShippingMgmtServiceToken <JWT_TOKEN>" \
  -H "Content-Type: application/json"
```

If the JWT is functioning correctly, an expected response is

```
[
  {
  "name": "FedEx ® Small Box (S1)",
  "token": "FedEx_Box_Small_1",
  "carrier": "FedEx",
  "is_variable_dimensions": false,
  "length": "12.375",
  "width": "10.875"
  "height": "1.5",
  "distance_unit": "in"
  }
]
```

Figure 8:
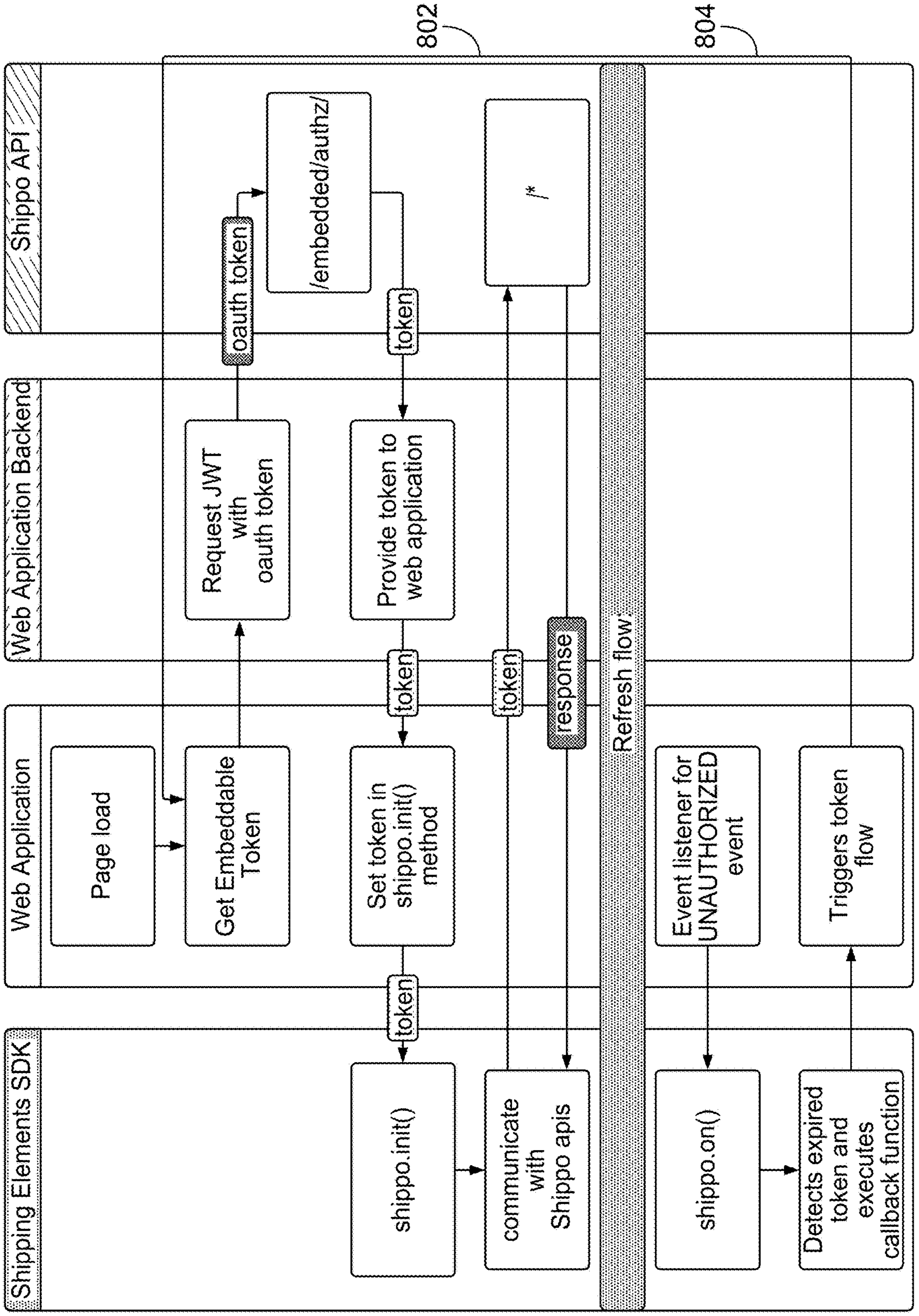
FIG. 8 is a flow diagram illustrating an embodiment of JWT generation and how to refresh an expired JWT.

FIG. 8 is a flow diagram illustrating an embodiment of JWT generation and how to refresh an expired JWT. As a generated JWT expires after 12 hours, the site platform integrator considers how to automatically generate this for a user/merchant. The flow of FIG. 8 is used to generate a JWT (802) and how to refresh an expired JWT for a user (804). The flow of FIG. 8 may be used with the embedded shipping label management element events to integrate token generation into the site platform.

Installation of the embedded shipping label management element SDK. In one embodiment, the embedded shipping label management element SDK is a client-side Javascript SDK that provides mechanisms for rendering and controlling the embedded shipping label management element shipping workflow.

Installation of the SDK may comprise including a Javascript, for example from a Content Delivery Network (CDN) https://js.shippingmgmtservice.com/embeddable-client.js on a site platform web application just before the closing </body> tag. For example:

```
<!doctype html>
  <html class="no-js" lang="">
  <head>
  <meta charset="utf-8">
  <title>Web Application</title>
  </head>
  <body>
  App content.
  <script type="module" src="https://js.
shippingmgmtservice.com/embeddable-client.js"></script>
  </body>
</html>
```

This script initializes a window variable that contains variables and methods for using the SDK.

In one embodiment, the SDK has two primary methods for setting up and rendering the embedded shipping label management element label purchase flow: init( ) and labelPurchase( ) The init( )method authenticates and configures embedded widgets and is typically called once per page. The labelPurchase( ) function renders the embedded widget and passes any required data to prepopulate shipment information such as address, order items, etc. The labelPurchase( )method may be called multiple times per page as the user is creating shipping labels for multiple orders.

As init( ) initializes the widget framework, examples of parameters of the init( ) function is taking an object of the following:

token: string (required)—a JWT-style authentication token derived from the/authz endpoint org: string (required)—an identifier for the site platform organization locale: string (optional, defaults to en-US)—The locale string in "IETF language tag" format used to translate the widget. Supported values: en, en-GB, ru, de, fr, tr, it, es, pl, uk, nl, en-au, and so on.

theme: Theme (optional)—Custom theme for the embedded shipping label management element.

A full example of the init( )method may be:

```
shippo.init({ token:
'eyJhbGciOiJIUzI1NiIsInR5cCI6IkpXVCJ9.eyJzdWIiOiIxMjM0NTY3ODkwIiwibmFtZSI6Ikp
vaG4gRG9lIiwiaWF0Ijox org: 'john-doe-industries',
locale: 'fr-CA', theme: {
width: '100%',
},
});
```

As labelPurchase( ) starts a label purchase flow, when the site platform is to render a widget (typically on a "Purchase Shipping Label" button click or equivalent), the labelPurchase( )method is called with the selector of the element to render the widget inside of and any shipment information to prepopulate/prehydrate. Examples of parameters of the labelPurchase( ) function is taking an object of the following:

element: string (required)—a document.querySelector-compatible selector for the element that the widget would be rendered inside of; and/or orderDetails: OrderDetails|OrderDetails[ ] (optional)—an identifier for the site platform organization, which may support an array of orders for bulk label purchase.

an example of orderDetails is:

```
export interface Address { name: string;
  company?: string; street_no?: string; street1: string; street2?:
string; street3?: string; city: string;
  state: string; zip: string; country: string; phone?: string; email?:
string;
  }
  export interface Item { id?: number;
  title: string; sku?: string;
  quantity: number;
  currency: string; // @TODO stronger type unit_amount: string;
  unit_weight: string; weight_unit: string; country_of_origin?: string;
  }
export interface OrderDetails {
  address_from?: Address ;
  address_to: Address;
  line_items: Item[ ];
  address_return?: Address;
  object_id?: string;
  order_number?: string;
  order_status?: string;
  placed_at?: string;
  notes?: string;
  shipments: Array<Shipment>;
  // end of order information
```

-continued

```
  shipment_date?: Date;
  extras?: {
    insurance?: { amount: string; currency: string; };
    signature_confirmation?: string;
  };
}
```

A full example of the label Purchase( )method may be:

```
shippo.labelPurchase('#shipWidget', { address_to: {
  name: 'William Faulkner', company: '',
  street1: '916 Old Taylor Rd', city: 'Oxford',
  state: 'MS',
  zip: '38655',
  country: 'US',
  phone: '662-234-3284',
  email: 'william@rowanoak.com',
  },
  line_items: [
  {
  title: 'Book',
  sku: 'TS-123',
  quantity: 1, currency: 'USD', unit_amount: '12',
  unit_weight: '0.40', weight_unit: 'lb', country_of_origin: 'US',
  }
  ]
]};
```

and a full example with install, init and label Purchase:

```
<!doctype html>
  <html class="no-js" lang="">
  <head>
  <meta charset="utf-8">
  <title>Web Application</title>
</head>
  <body>
  <button id="purchaseLabelButton">Purchase Label</button>
  <script type="module"
src="https://js.shippingmgmtservice.com/embeddable-client.js"></script>
  <script type="application/javascript"> if (shippo) {
  shippo.init({ token:
  'eyJhbGciOiJIUzI1NiIsInR5cCI6IkpXVCJ9.eyJzdWIiOiIxMjM0NTY3ODkwIiwibmFtZ
SI6IkpvaG4gRG9lIiwiaWF0Ijox org: 'john-doe-industries',
  locale: 'fr-CA', theme: {
  width: '100%',
  },
  });
  }
  document.getElementById('#purchaseLabelButton').addEventListener('click
```

-continued

```
', (event) => { event.preventDefault( );
   shippo.labelPurchase('#shipWidget', { address_to: {
   name: 'William Faulkner', company: '',
   street1: '916 Old Taylor Rd', city: 'Oxford',
   state: 'MS',
   zip: '38655',
   country: 'US',
   phone: '662-234-3284',
   email: 'william@rowanoak.com',
   },
   line_items: [
   {
   title: 'Book',
   sku: 'TS-123',
   quantity: 1, currency: 'USD', unit_amount: '12',
   unit_weight: '0.40', weight_unit: 'lb', country_of_origin: 'US',
   }
   ]
   });
   }, false);
   </script>
   </body>
</html>
```

In one embodiment, the embedded shipping label management element may be customized using a theme parameter when calling the init method. For example, here are supported theme values:

```
export interface Theme { elementId?: string; title?: string;
   style?: string; height?: string; width?: string;
   primaryColor?: string; container?: { backgroundColor?: string;
   };
   header?: { backgroundColor?: string; borderColor?: string; color?:
string; hasBoxShadow?: boolean;
   textAlign?: 'left' | 'right' | 'center';
   };
   footer?: { backgroundColor?: string; borderColor?: string;
hasBoxShadow?: boolean;
   };
   button?: { primary: {
   backgroundColor?: string; activeBackgroundColor?:
   string; hoverColor?:
string;
   color?: string; borderRadius?: string; borderColor?: string;
activeBorderColor?: string;
   textTransform?: 'lowercase' | 'uppercase' | 'capitalize';
disabledBackgroundColor?: string; disabledBorderColor?: string;
   disabledTextColor?: string;
   };
   secondary?: { backgroundColor?: string;
   activeBackgroundColor?: string; color?: string;
borderRadius?: string;
   borderColor?: string; activeBorderColor?: string;
```

-continued

```
   textTransform?: 'lowercase' | 'uppercase' | 'capitalize';
disabledBackgroundColor?: string; disabledBorderColor?: string;
   disabledTextColor?: string;
   };
```

-continued

```
   };
   cards?: { subHeaderColor?: string;
   backgroundColor?: string; borderRadius?: string; borderColor?: string;
borderStyle?: string; hoverBackgroundColor?: string;
activeBackgroundColor?:
string;
   };
   inputs?: { borderColor?: string; borderActive?: string; hoverColor?:
string;
   };
   menu?: { titleBackgroundColor?: string; hoverColor?: string;
   hoverBackgroundColor?: string;
   };
}
```

Events. The embedded shipping label management element supports events that can be used to integrate with a site platform and/or eCommerce site. The embedded shipping label management element framework emits lifecycle and action events as the user interacts with the widget. For example, event listeners may be added using an on( )method:

```
shippo.on('LABEL_PURCHASED_SUCCESS', (event) => {
   // do something when the user purchases a label
});
```

A sample event list is:

| EVENT | DESCRIPTION |
|---|---|
| APP_READY | The widget is rendered and ready to receive configuration or events. |
| CLOSE_BUTTON_CLICKED | The user clicked the close button to close the widget. |
| LABEL_PURCHASED_SUCCESS | A label was successfully purchased. |
| ERROR | Any error has occurred. |

Each event may have unique parameters to the callback function, for example:

LABEL_PURCHASED_SUCCESS—this event returns a transaction object as the parameter to the call function passed to the on( )method, for example:

```
interface Transaction {
commercial__invoice__url?: string;
eta?: string;
entry__point?: string;
label__url?: string;
messages?: any[ ];
metadata?: string;
object__created?: string;
object__updated?: string;
object__id?: string;
object__owner?: string;
object__state?: string;
object__status?: string;
packing__slip__url?: string;
rate?: WebRate;
refund__request__date?: string;
tracking__number?: string;
tracking__url__provider?: string;
was__test?: boolean;
}
```

with this event returning an error object as the parameter to the call function passed to the on( ) method:

```
interface Transaction { code:
  'UNAUTHORIZED' | 'LABEL__PURCHASE__ERROR' |
  'COUNTRY__NOT__SUPPORTED' | 'LOCALE__N
OT__SUPPORTED' | '
  detail: string;
}
```

ERROR—Errors coming from the widget may be accessed using an event listener on the ERROR event. For example:

```
shippo.on('ERROR', (error) => { switch (error.code) {
    case 'UNAUTHORIZED':
    // The authentication token is malformed, expired or otherwise
  invalid. break;
    case 'LABEL__PURCHASE__ERROR':
    // An error occurred during label purchase break;
    case 'COUNTRY__NOT__SUPPORTED':
    // To or from address country is not supported break;
    case 'LOCALE__NOT__SUPPORTED':
    // Locale passed in the init function is not supported break;
    case 'UNKNOWN':
    // An unknown error happened break;
    }
  });
```

Debugging the application may use various event handlers and may also include a special onAny( )method to handle any events from the embedded shipping label management element:

```
shippo.onAny((params) => {
  // Log any events thrown from Shippo Shipping Elements
console.log(params);
});
```

On every event, use of the embedded shipping label management element permits using events the answering of questions such as: identifying a merchant who took the action, which site platform the merchant belongs to, and which embedded shipping label management element version does the event belong to. In one embodiment, event properties include: user_id (for the shipping management service provider), order_id (for the shipping management service provider), platform_name (for the site platform), platform_type (for the site platform), platform_user_id (for the site platform), platform_instance_id (for the site platform), platfrom_order_id (for the site platform), embedded_element_origin (the location where the embedded shipping label management element is embedded), and/or embedded_element_version.

In one embodiment, when a user registers with the shipping management service provider, for example via the embedded shipping label management element, the following table shows events that answer questions such as: how many users start, complete and/or drop off during registration, and how many users sign up, but do not connect their store.

| Event | Event Property | Description |
|---|---|---|
| Registration Pageview | Store_referral = "Embeddable-platform" | Triggered when platform embedded user visits registration |
| Registration Button Click | Store_referral = "Embeddable-platform" | Triggered when platform embedded user attempts to complete registration |
| Signed Up | Store_referral = "Embeddable-platform" | Triggered when platform Embedded users successfully signs up |
| Store Connected | Store_referral = "Embeddable-platform" | Triggered when users successfully connects platform store |

In one embodiment, when a user logs into the embedded shipping label management element, the following table shows an event that answers questions such as: how many users opened the embedded widget, and/or how many of integrator logins were in the embedded widget.

| Event | Event Property | Description |
|---|---|---|
| Identify | user_id (for shipping management service provider) | Integer |
| | is_embeddable_user | Boolean |
| | embeddable_partner | String |
| | embedded_version | String |
| | embedded_origin | String |

In one embodiment, when a user buys one or more labels in the embedded shipping label management element, the following table shows an event that answers questions such as: how many embedded widget users bought a label in the widget, what did the embedded widget user buy, and what information can be looked up. For example, the transaction_id may be used, for example on the shipping management service provider side, to lookup: package (e.g. small box, medium box, user-supplied box), package unit, total weight, weight unit, and/or tracking number.

| Event Property | Description |
|---|---|
| transaction_id | generated transaction id for the shipment |
| rate_type | attributed value for speed (e.g. cheapest, fastest, other) |
| carrier | name of carrier company |
| currency | selected unit of currency |
| shipment_date | selected expected date of shipping for a shipment |
| shipment_price | generated cost of label for shipment |
| service_level | carrier named shipping speed (e.g. ground, expedited, overnight) |
| operation | ="attempt", "fail", "complete" |

Reporting, for example using reports that listen to events, may include:

- daily reports of sign ups, sign up rate, and/or order completion rate;
- monthly reports of merchant adoption, order fulfillment rate, label adoption, and/or shipping management service provider embeddable adoption; and/or
- totalling reports of total labels purchased, total GPV, and/or total switched platform users count.

FIG. 9A is an illustration of an onboarding interface design. In one embodiment, the system of FIG. 1 is used to facilitate the onboarding of a user/merchant. In one embodiment, FIG. 9A is part of the flow illustrated in FIG. 6A.

As shown in FIG. 9A, the general onboarding interface includes in part:

- An introductory widget/button for creating one or more shipping labels;
- If a shipping management service provider has not been onboarded, then an interface flow to onboard a shipping management service provider including compliance with service provider requirements, compliance with regulatory requirements, and/or compliance with associated carrier requirements;
- If a shipping management service provider session has not yet been established, then establishing the session, for example via registration and/or credential log in; and/or
- Determining the fulfillment statuses of the selected orders: having unfulfilled orders only, leading to (B) in FIG. 9B; having fulfilled orders only, leading to (B) in FIG. 9B; and having both fulfilled and unfilled selected orders, leading to (A) in FIG. 9B.

Improvements of the onboarding interface shown in FIG. 9A include:

- Enabling a user/merchant to get set up quick to fulfill their (first) order;
- Enabling a user/merchant to understand why information is required to increase comfort in sharing it;
- Enabling a user/merchant to set things up with low maintenance effort;
- Enabling a user/merchant to configure billing later when ready to purchase labels;
- Being responsive either to computer terminals or mobile terminals;
- Being personalized based on site platform acquisition source, for example with a custom logo and/or custom message;
- Being personalized based on country, for example having addresses, carriers, formats, and/or currency displayed based on location;
- Enabling a user/merchant to update their preferences by referring to a modified view of onboarding or using in-widget settings;
- Enabling a user/merchant to purchase simply; once the merchant is done with a fully completed onboarding, they only need to click an order, select a rate, and click "buy".

As shown generally in FIG. 9A and/or FIG. 6A, example workflows may include one or more of a:

- Site platform specific welcome message;
- A stage to accept a sign up/login, in some cases with a password reset option;
- A stage of enabling carriers, including enablement and T&C, and this stage may be made mandatory. Multiple carriers may be onboarded at one time;
- A stage to accept sender and return addresses, which may be made mandatory;
- A stage to set defaults, label size, package templates, preferences; language, units of measurement, and/or billing information.
- A stage to collect analytics on workflows, including one or more acquisition sources and site platform information;
- A stage to set onboarding preferences, in part to allow the merchant to edit anything they set up during onboarding without leaving the app;
- A stage to check destination address against supported carriers;
- A stage, for example in a direct-to-merchant environment, to provide options for upfront setup, in part to reduce the time it takes for a merchant to see rates by surfacing steps needed for label purchase in onboarding;
- A stage for merchant-relevant onboarding to cater to needs of varied merchant types, including SMBs, platforms, personal shippers, and API merchants;
- A guided experience to provide clarity on mandatory/optional steps, clear indications of progress/success, and more context around compliance information.

FIG. 9B is an illustration of order selection interface design. In one embodiment, the system of FIG. 1 is used to facilitate order selection of a user/merchant. In one embodiment, FIG. 9B is part of the flow illustrated in FIGS. 6B and 6C.

Figure 9C:
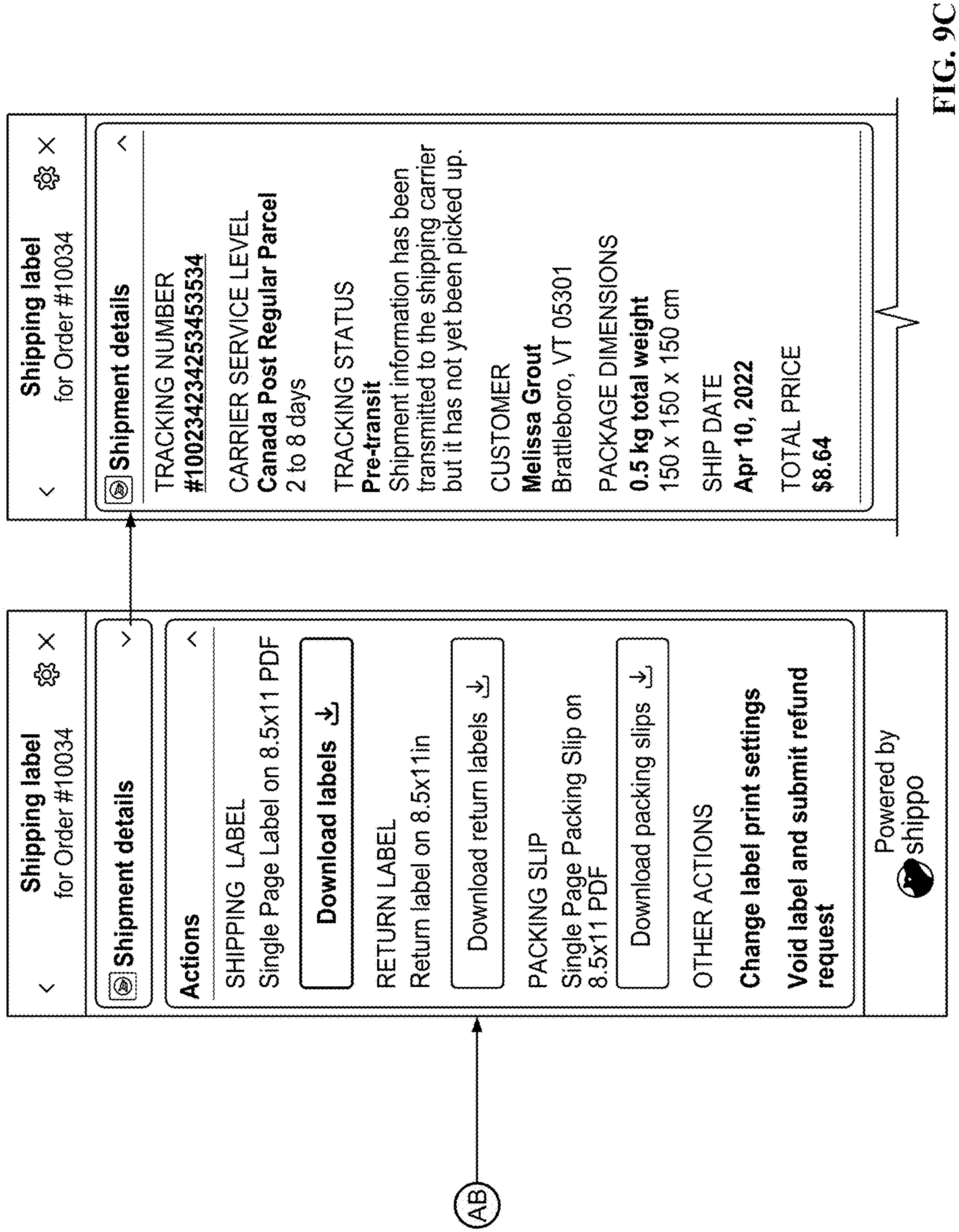
FIG. 9C is an illustration of a retrieve label interface design.
Figure 9C:
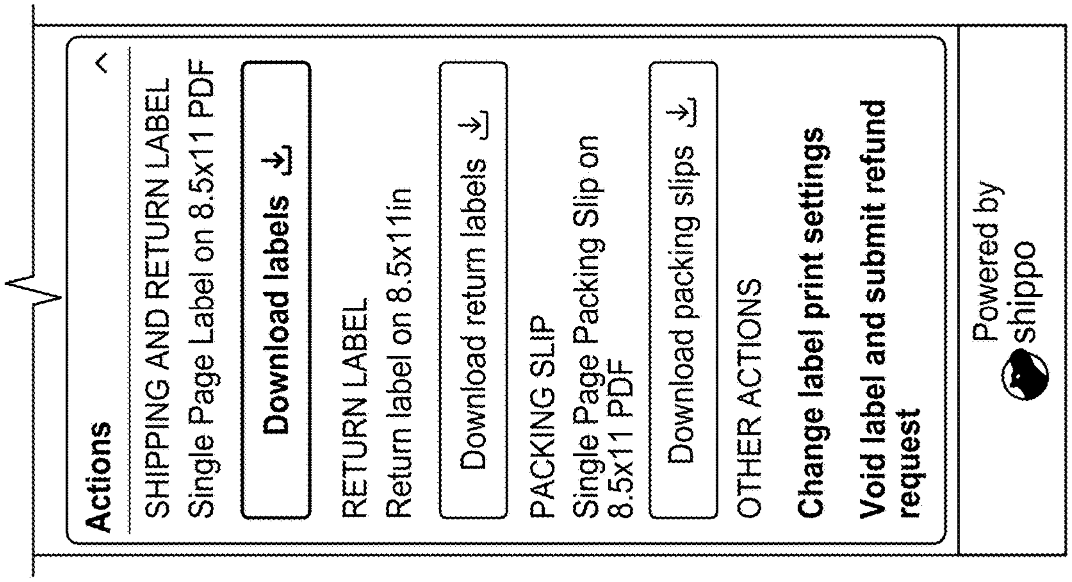

As shown in FIG. 9B, the general order interface includes in part:

- In the event of having both fulfilled and unfilled selected orders, from (A) in FIG. 9B:
  - For fulfilled orders, a stage for fulfilled orders may have a widget such as "Download Labels" for download and/or printing labels, return labels, and/or packing slips, leading to (C) in FIG. 9C; and
  - For unfilled orders, a stage for unfilled orders may have a widget such as "Create Labels" for creating one or more labels, either prompted one-by-one or in bulk. This leads to label creation including input/output on address information, package information, options, shipment date, carrier selection, compliance (not shown in FIG. 9B), and/or rates, leading to (C) in FIG. 9C;

In the event of having only unfilled orders, from (B) in FIG. 9B, a stage for the unfulfilled orders may have a widget such as "Create Labels" for creating one or more labels, either prompted one-by-one or in bulk. This leads to label creation including input/output on address information, package information, options, shipment date, carrier selection, compliance (not shown in FIG. 9B), and/or rates, leading to (C) in FIG. 9C; and In the event of having only fulfilled orders, from (B) in FIG. 9B, a stage for the fulfilled orders may have a widget such as "Download Labels" for download and/or printing labels, return labels, and/or packing slips, leading to (C) in FIG. 9C. For example, a displayed message may read "Here's the label that you purchased previously" or "Would you like to reprint your label rather than purchase a new one?"

FIG. 9C is an illustration of a retrieve label interface design. In one embodiment, the system of FIG. 1 is used to facilitate label retrieval of a user/merchant. In one embodiment, FIG. 9C is part of the flow illustrated in FIGS. 6B and 6C.

As shown in FIG. 9C, the general label interface includes in part, from (C) in FIG. 9B, a stage to download and/or print a shipping label/return label/packing slip for a given paper/label/media type, including showing shipment details and optionally an option to void labels and submit for refund.

FIG. 9D is an illustration of error states within an interface design. As shown in FIG. 9D, errors that may occur include those based on:

Origin and/or destination address incompatibilities and/or compliance issues with a carrier, for example a given carrier may not support cross-border shipping;

Package size and/or weight incompatibilities and/or compliance issues with a carrier, for example a package may be too heavy for a given carrier service level/rate;

(Not shown in FIG. 9D) Package details with a compliance issue, for example a lithium-based battery with a carrier that travels via air where certain lithium-based batteries are prohibited instead of ground where the same lithium-based batteries may not be prohibited;

Service level/rate incompatibilities and/or compliance issues, for example a ground service level may not support a return label; and/or Incomplete details and/or compliance issues, for example a ground service level may require a recipient phone number.

Hazmat Compliance. Compliance may include regulatory compliance associated with the shipping of hazardous materials ("hazmat"), for example one or more of the following; lithium-based batteries, e-cigarettes/vapes, explosives/fireworks, compressed gases, dry ice, flammable liquids/solids, radioactive materials, poisons, corrosives, and/or oxidizers. In one embodiment, a hazmat flag is used by a site platform and/or merchant to indicate one or more products are hazardous materials. Based at least in part on the hazmat flag, the embedded shipping label management element commences a compliance module for the given hazmat type to comply with hazmat regulatory requirements.

Carrier Compliance. Compliance may include carrier compliance associated with carrier terms of use, carrier T&C, carrier brand representation including logo representation, carrier telemetry requirements. The embedded shipping label management element is an improvement in computing resource efficiency by offloading a site platform and/or merchant from separately using processing, memory, storage, and/or network resources on carrier compliance, for example maintaining a logo within the display in conformity with the carrier logo representation requirements. In one embodiment, the site platform need not keep state/track of which carriers a merchant has onboarded for their particular site, reducing computing resources for the site platform as an improvement and consolidating compliance information with the shipping management service provider.

Compliance Updates. As the shipping management service provider hosts the embedded shipping label management element, the shipping management service provider may centrally manage regulatory and/or compliance updates as an improvement over having a site platform requirement to individually update their compliance. For example, regulatory rules regarding the shipment of e-cigarettes and/or vapes have changed more than once in the last twenty years. With each update, the shipping management service provider may update the embedded shipping label management element for all site providers, in one effort, minimizing computing resource requirements such as processing, memory, storage, and/or networking resources.

For example, a carrier may change their T&C to a version 2.1 from a version 2.0. In one embodiment, the site platform need not keep state/track of which versions of T&C a merchant has executed agreement with for a particular site, reducing computing resources for the site platform as an improvement and consolidating compliance information with the shipping management service provider.

Figure 10:
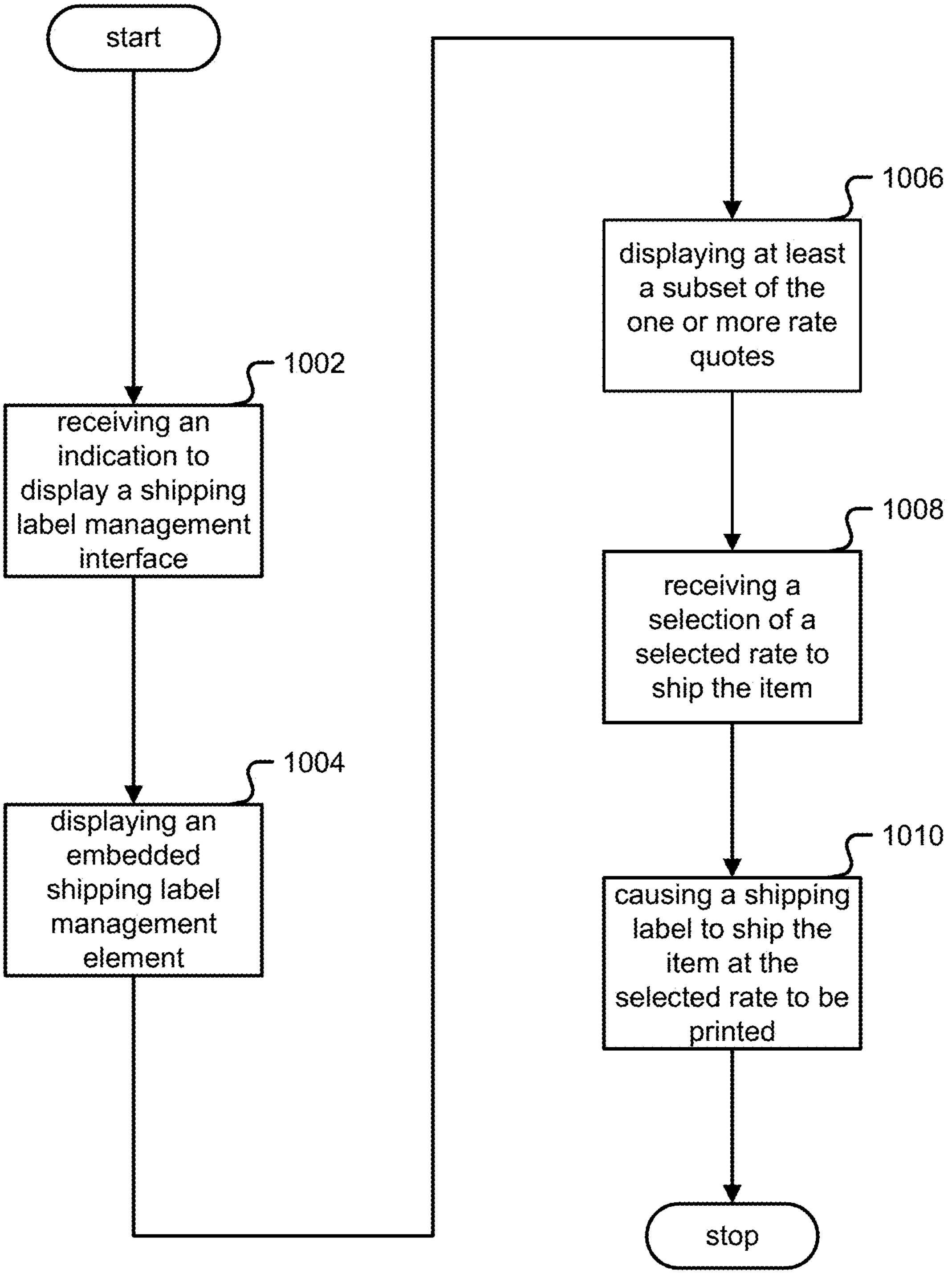
FIG. 10 is a flow diagram illustrating an embodiment of a process for shipping label management.

FIG. 10 is a flow diagram illustrating an embodiment of a process for shipping label management. In one embodiment, the flow diagram of FIG. 10 is carried out by the system of FIG. 1.

In step (1002), an indication to display, in the context of a display page associated with a site platform, a shipping label management interface is received. For example, as discussed in FIG. 3B, a UI widget describing "Create Shipping Label" may be asserted by a user. For example, as discussed in FIG. 9A, a UI widget describing "Manage Shipping Label" may be asserted by a user.

In step (1004), in response to the indication of step (1002), an embedded shipping label management element is displayed wherein the embedded shipping label management element is configured to obtain, via a front-end client call to a shipping management service provider with which the embedded shipping label management element is associated, one or more rate quotes to ship an item from a source location to a destination location.

For example, as discussed in FIG. 3C, the embedded shipping label management element includes an introductory/splash stage for the shipping management service provider. For example, as discussed in FIG. 3D, the embedded shipping label management element includes an account onboarding/sign-up/registration/log-in stage for the shipping management service provider. For example, as discussed in FIG. 3E, the embedded shipping label management element includes a billing information stage for the purchase of labels. For example, as discussed in FIG. 3G, the embedded shipping label management element includes a carrier enablement stage. For example, as discussed in FIG. 3H, the embedded shipping label management element includes a shipping label details and/or purchase stage. For example, as discussed in FIGS. 3I and 3J, the embedded shipping label management element includes a stage for saving and/or printing a shipping label. Further examples of the embedded shipping label management element are discussed in FIGS. 2A-2H, FIGS. 6A-6D, and FIGS. 9A-9D.

In one embodiment, the embedded shipping label management element is displayed at least in part by passing a JSON file to a client at which the display page associated with the site platform is displayed. In one embodiment, the front-end client call to the shipping management service provider includes an order identifier.

In one embodiment, the shipping management service provider ensures, via the embedded shipping label management element, compliance with carrier requirements. In one embodiment, the shipping management service provider ensures, via the embedded shipping label management element, compliance requirements relevant to shipping the items. In one embodiment, the shipping management service provider ensures, via the embedded shipping label management element, other compliance requirements relevant to shipping the items.

In one embodiment, the embedded shipping label management element is configured to display, if required for a given carrier, a T&C or other requirements required to be acknowledged to ship the item via the given carrier.

In one embodiment, the T&C of use are displayed via the embedded shipping label management element to onboard a first-time user of a given carrier. In one embodiment, the T&C of use are displayed via the embedded shipping label management element to update a user of a given carrier whose T&C have changed.

In one embodiment, the embedded shipping label management element is configured to generate and provide to an event listener associated with the site platform an event associated with a state of a processing by the embedded shipping label management element.

In one embodiment, the embedded shipping label management element is configured to generate and provide to an event listener associated with the display page associated with the site platform an event associated with a state of a processing by the embedded shipping label management element. In one embodiment, the state is associated with completion, wherein completion comprises a shipping label purchased and printed, for example an event property may be operation which can have values "attempt", "fail" and "complete".

In step (1006), within a display area associated with the embedded shipping label management element, at least a subset of the one or more rate quotes is displayed. For example, as discussed in FIG. 3H, the embedded shipping label management element includes the display area titled "Carrier rates". In one embodiment, the item is one or a plurality of sets of one or more items, each associated with a corresponding destination location, and wherein the embedded shipping label management element is configured to obtain bulk rate quotes simultaneously for the one or a plurality of sets of one or more items.

In step (1008), via a user input provided in the context of the embedded shipping label management element, a selection of a selected rate to ship the item is received. For example, as discussed in FIG. 3H, the embedded shipping label management element includes a radio button under "Carrier rates" to select between Canada Post Regular Parcel (as "Cheapest") or Canada Post Priority (as "Fastest.") In step (1010), the process causes a shipping label to ship the item at the selected rate to be printed. For example, as discussed in FIG. 3I, the embedded shipping label management element includes a stage to cause the shipping label for Canada Post Regular Parcel to be printed as shown in FIG. 3J.

In one embodiment, in an additional step not shown in FIG. 10, a look up, via a front-end client call to the shipping management service provider with which the embedded shipping label management element is associated, is used to analyze whether data has been synched, asynchronously, from the site platform.

In one embodiment, the look up value may be used to determine whether to hydrate the embedded shipping label management element in the event data has been synched, asynchronously, from the site platform, wherein to hydrate comprises to populate fields displayed within an element. For example, as discussed in FIG. 2E, the embedded shipping label management element includes an example of hydrated or prefilled shipping data (210) from the site platform, for example via JSON blob.

In one embodiment, the look up value may be used to hydrate an obtain quote element in the event data has been synched, asynchronously, from the site platform, wherein to hydrate comprises to populate fields displayed within an element.

In one embodiment, a series of steps not shown in FIG. 10, are carried out including one or more of the following:

- determining compliance, for example an origination compliance record and a destination compliance record, based at least in part on the source location and destination location, wherein compliance includes any compliance with requirements such as carrier requirements, legal requirements, customs requirements and/or government/regulatory requirements;
- determining one or more missing fields in the compliance record, for example whether a physical item is a hazmat item and/or an item for international export;
- receiving, via a second user input provided in the context of the embedded shipping label management element, a completion of each of the one or more missing fields; and/or
- preparing a compliance manifest based on a complete compliance record.

In one embodiment, a series of steps not shown in FIG. 10, are carried out including one or more of the following:

- handling a synchronous update via a shipping management database (for example, a database associated with the site platform) for a set of shipment records for a user;
- storing the set of shipment records in a local database (for example, a database associated with the shipping management service provider;)
- receiving from the user via a shipment record session a query for a missing shipment record not included in the set of shipment records for the user in the local database;
- asynchronously synchronizing the local database using an API for the shipping management service provider to directly query the shipping management database, to retrieve the missing shipment record;
- updating the shipment record session at least in part by using the missing shipment record in the local database that was asynchronously synchronized;
- prompting the user to complete the shipment record session if necessary; and/or
- preparing a manifest based at least in part on the completed shipment record session.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A system, comprising:

a communication interface; and a processor coupled to the communication interface and configured to:

receive via the communication interface an indication to display, in the context of a display page associated with a site platform, a shipping label management interface;

display, in response to the indication, an embedded shipping label management element configured to obtain, via a front-end client call to a shipping management service provider with which the embedded shipping label management element is associated, one or more rate quotes to ship an item from a source location to a destination location;

wherein the display page is hosted by the site platform and the embedded shipping label management element is hosted by the shipping management service provider;

wherein the front-end client call and the embedded shipping label management element enables a user client to interface to or from the shipping management service provider without requiring interface to or from the site platform;

display, within a display area associated with the embedded shipping label management element, at least a subset of the one or more rate quotes;

receive, via a user input provided in the context of the embedded shipping label management element, a selection of a selected rate to ship the item; and cause a shipping label to ship the item at the selected rate to be printed.

2. The system of claim 1, wherein the embedded shipping label management element is displayed at least in part by passing a JSON file to a client at which the display page associated with the site platform is displayed.

3. The system of claim 1, wherein the shipping management service provider ensures, via the embedded shipping label management element, compliance with carrier requirements.

4. The system of claim 1, wherein the shipping management service provider ensures, via the embedded shipping label management element, regulatory compliance requirements relevant to shipping the items.

5. The system of claim 1, wherein the shipping management service provider ensures, via the embedded shipping label management element, other compliance requirements relevant to shipping the items.

6. The system of claim 1, wherein the item is one or a plurality of sets of one or more items, each associated with a corresponding destination location, and wherein the embedded shipping label management element is configured to obtain bulk rate quotes simultaneously for the one or a plurality of sets of one or more items.

7. The system of claim 1, wherein the front-end client call to the shipping management service provider includes an order identifier.

8. The system of claim 1, wherein the processor is further configured to look up, via a front-end client call to the shipping management service provider with which the embedded shipping label management element is associated, to analyze whether data has been synched, asynchronously, from the site platform.

9. The system of claim 8, using look up value to hydrate the embedded shipping label management element in the event data has been synched, asynchronously, from the site platform, wherein to hydrate comprises to populate fields displayed within an element.

10. The system of claim 8, using look up value to hydrate an obtain quote element in the event data has been synched, asynchronously, from the site platform, wherein to hydrate comprises to populate fields displayed within an element.

11. The system of claim 1, wherein the embedded shipping label management element is further configured to display, if required for a given carrier, a terms of use or other requirements required to be acknowledged to ship the item via the given carrier.

12. The system of claim 11, wherein the processor is further configured to display the terms of use via the embedded shipping label management element to onboard a first-time user of a given carrier.

13. The system of claim 11, wherein the processor is further configured to display the terms of use via the embedded shipping label management element to update a user of a given carrier whose terms have changed.

14. The system of claim 1, wherein the embedded shipping label management element is further configured to generate and provide to an event listener associated with the site platform an event associated with a state of a processing by the embedded shipping label management element.

15. The system of claim 1, wherein the embedded shipping label management element is further configured to generate and provide to an event listener associated with the display page associated with the site platform an event associated with a state of a processing by the embedded shipping label management element.

16. The system of claim 15, wherein the state is completion, wherein completion comprises a shipping label purchased and printed.

17. The system of claim 1, wherein the processor is further configured to:

determine a compliance record, including an origination compliance record and a destination compliance record, based at least in part on the source location and destination location;

determine one or more missing fields in the compliance record;

receive, via a second user input provided in the context of the embedded shipping label management element, a completion of each of the one or more missing fields; and prepare a compliance manifest based on a complete compliance record.

18. The system of claim 1, wherein the processor is further configured to:

handle a synchronous update via a shipping management database for a set of shipment records for a user;

store the set of shipment records in a local database;

receive from the user via a shipment record session a query for a missing shipment record not included in the set of shipment records for the user in the local database;

asynchronously synchronize the local database using an application programming interface (API) for the shipping management service provider to directly query the shipping management database, to retrieve the missing shipment record;

update the shipment record session at least in part by using the missing shipment record in the local database that was asynchronously synchronized;

prompt the user to complete the shipment record session if necessary; and prepare a manifest based at least in part on the completed shipment record session.

19. A method, comprising:

receiving an indication to display, in the context of a display page associated with a site platform, a shipping label management interface;

displaying, in response to the indication, an embedded shipping label management element configured to obtain, via a front-end client call to a shipping management service provider with which the embedded shipping label management element is associated, one or more rate quotes to ship an item from a source location to a destination location;

wherein the display page is hosted by the site platform and the embedded shipping label management element is hosted by the shipping management service provider;

wherein the front-end client call and the embedded shipping label management element enables a user client to interface to or from the shipping management service provider without requiring interface to or from the site platform;

displaying, within a display area associated with the embedded shipping label management element, at least a subset of the one or more rate quotes;

receiving, via a user input provided in the context of the embedded shipping label management element, a selection of a selected rate to ship the item; and causing a shipping label to ship the item at the selected rate to be printed.

20. A computer program product embodied in a non-transitory computer readable medium and comprising computer instructions for:

receiving an indication to display, in the context of a display page associated with a site platform, a shipping label management interface;

displaying, in response to the indication, an embedded shipping label management element configured to obtain, via a front-end client call to a shipping management service provider with which the embedded shipping label management element is associated, one or more rate quotes to ship an item from a source location to a destination location;

wherein the display page is hosted by the site platform and the embedded shipping label management element is hosted by the shipping management service provider;

wherein the front-end client call and the embedded shipping label management element enables a user client to interface to or from the shipping management service provider without requiring interface to or from the site platform;

displaying, within a display area associated with the embedded shipping label management element, at least a subset of the one or more rate quotes;

receiving, via a user input provided in the context of the embedded shipping label management element, a selection of a selected rate to ship the item; and causing a shipping label to ship the item at the selected rate to be printed.

* * * * *